US010329501B2

(12) United States Patent
Bai et al.

(10) Patent No.: US 10,329,501 B2
(45) Date of Patent: *Jun. 25, 2019

(54) ENGINEERED FUEL FEED STOCK

(71) Applicant: Accordant Energy, LLC, Rutland, VT (US)

(72) Inventors: Dingrong Bai, Rutland, VT (US); Paula Calabrese, Rutland, VT (US)

(73) Assignee: ACCORDANT ENERGY, LLC, Rutland, VT (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/282,589

(22) Filed: Sep. 30, 2016

(65) Prior Publication Data

US 2017/0114292 A1 Apr. 27, 2017

Related U.S. Application Data

(60) Continuation of application No. 14/555,063, filed on Nov. 26, 2014, now Pat. No. 9,688,931, which is a (Continued)

(51) Int. Cl.
*C10J 3/72* (2006.01)
*C01B 3/02* (2006.01)
(Continued)

(52) U.S. Cl.
CPC .................. *C10J 3/72* (2013.01); *C01B 3/02* (2013.01); *C10J 3/463* (2013.01); *C10L 5/08* (2013.01);
(Continued)

(58) Field of Classification Search
CPC ........ C10J 3/72; C10J 3/463; C10J 2300/0906; C10J 2300/092; C10J 2300/0903;
(Continued)

(56) References Cited

U.S. PATENT DOCUMENTS 3,403,643 A 10/1968 Denig
3,642,458 A 2/1972 Hess et al.
(Continued)

FOREIGN PATENT DOCUMENTS

CH 552523 8/1974
CN 1224683 C 10/2005
(Continued)

OTHER PUBLICATIONS

Hasselriis, F., "Refuse-Derived Fuel Processing," Butterworth Publishers, 1984, pp. 275-298.
(Continued)

*Primary Examiner* — Pamela H Weiss
(74) *Attorney, Agent, or Firm* — Cooley LLP

(57) ABSTRACT

Disclosed are novel engineered fuel feed stocks, feed stocks produced by the described processes, and methods of making the fuel feed stocks. Components derived from processed MSW waste streams can be used to make such feed stocks which are substantially free of glass, metals, grit and noncombustibles. These feed stocks are useful for a variety of purposes including as gasification and combustion fuels.

23 Claims, 10 Drawing Sheets

Related U.S. Application Data continuation of application No. 13/087,108, filed on Apr. 14, 2011, now Pat. No. 8,906,119, which is a division of application No. 12/492,096, filed on Jun. 25, 2009, now abandoned.

(60) Provisional application No. 61/076,020, filed on Jun. 26, 2008, provisional application No. 61/076,025, filed on Jun. 26, 2008.

(51) Int. Cl.

| | | |
|---|---|---|
| *C10L 5/40* | (2006.01) | |
| *C10L 5/44* | (2006.01) | |
| *C10L 5/08* | (2006.01) | |
| *C10L 5/36* | (2006.01) | |
| *C10J 3/46* | (2006.01) | |
| *C10L 5/46* | (2006.01) | |

(52) U.S. Cl.
CPC ............... *C10L 5/36* (2013.01); *C10L 5/363* (2013.01); *C10L 5/366* (2013.01); *C10L 5/40* (2013.01); *C10L 5/403* (2013.01); *C10L 5/406* (2013.01); *C10L 5/445* (2013.01); *C10L 5/46* (2013.01); *C10J 2300/092* (2013.01); *C10J 2300/0903* (2013.01); *C10J 2300/0906* (2013.01); *C10J 2300/0909* (2013.01); *C10J 2300/0916* (2013.01); *C10J 2300/0946* (2013.01); *C10L 2200/0469* (2013.01); *C10L 2250/04* (2013.01); *C10L 2290/24* (2013.01); *C10L 2290/28* (2013.01); *C10L 2290/30* (2013.01); *Y02E 50/10* (2013.01); *Y02E 50/30* (2013.01); *Y02P 20/145* (2015.11)

(58) Field of Classification Search
CPC ........ C10J 2300/0909; C10J 2300/0916; C10J 2300/0946; C01B 3/02; C10L 5/40; C10L 5/403; C10L 5/445; C10L 5/406; C10L 5/08; C10L 5/36; C10L 5/363; C10L 5/46; C10L 5/366; C10L 2250/04; C10L 2290/24; C10L 2290/28; C10L 2200/0469; C10L 2290/30; Y02P 20/145; Y02E 50/10; Y02E 50/30
See application file for complete search history.

(56) References Cited

U.S. PATENT DOCUMENTS

| | | |
|---|---|---|
| 3,650,711 A | 3/1972 | Unick et al. |
| 3,759,196 A | 9/1973 | Spaite |
| 3,790,091 A | 2/1974 | Law et al. |
| 3,846,096 A | 11/1974 | Malian et al. |
| 3,910,775 A | 10/1975 | Jackman |
| 3,950,143 A | 4/1976 | Pyle |
| 3,961,913 A | 6/1976 | Brenneman et al. |
| 4,015,951 A | 4/1977 | Gunnerman |
| 4,026,678 A | 5/1977 | Livingston |
| 4,049,391 A | 9/1977 | Marsh |
| 4,052,173 A | 10/1977 | Schultz |
| 4,072,273 A | 2/1978 | Reiniger |
| 4,078,902 A | 3/1978 | Olson |
| 4,152,119 A | 5/1979 | Schulz |
| 4,153,514 A | 5/1979 | Garrett et al. |
| 4,193,206 A | 3/1980 | Maffet |
| 4,201,551 A | 5/1980 | Lvshkow et al. |
| 4,225,457 A | 9/1980 | Schulz |
| 4,229,183 A | 10/1980 | Eneroth et al. |
| 4,236,897 A | 12/1980 | Johnston |
| 4,249,471 A | 2/1981 | Gunnerman |
| 4,265,636 A | 5/1981 | Frankiewicz |
| 4,303,412 A | 12/1981 | Baikoff et al. |
| 4,308,033 A | 12/1981 | Gunnerman |
| 4,395,265 A | 7/1983 | Reilly et al. |
| 4,398,917 A | 8/1983 | Reilly |
| 4,405,331 A | 9/1983 | Blaustein et al. |
| 4,440,635 A | 4/1984 | Reiniger |
| 4,445,906 A | 5/1984 | Riemann et al. |
| 4,472,245 A | 9/1984 | Halm et al. |
| 4,515,601 A | 5/1985 | Charters |
| 4,529,407 A | 7/1985 | Johnston et al. |
| 4,588,568 A | 5/1986 | Pollmann et al. |
| 4,613,339 A | 9/1986 | Gunnerman et al. |
| 4,624,417 A | 11/1986 | Gangi et al. |
| 4,624,419 A | 11/1986 | Hevesi et al. |
| 4,758,244 A | 7/1988 | Harvey et al. |
| 4,787,917 A | 11/1988 | Leclerc de Bussy |
| 4,828,577 A | 5/1989 | Markham, Jr. et al. |
| 4,875,905 A | 10/1989 | Somerville et al. |
| 5,125,931 A | 6/1992 | Schulz |
| 5,250,080 A | 10/1993 | Michelena et al. |
| 5,342,418 A | 8/1994 | Jesse |
| 5,369,947 A | 12/1994 | Dummersdorf et al. |
| 5,387,267 A | 2/1995 | Warf et al. |
| 5,421,837 A | 6/1995 | Michelena et al. |
| 5,429,645 A | 7/1995 | Benson et al. |
| 5,431,702 A | 7/1995 | Schulz |
| 5,441,990 A | 8/1995 | Robin et al. |
| 5,470,361 A | 11/1995 | Linke et al. |
| 5,562,743 A | 10/1996 | Daugherty et al. |
| 5,591,417 A | 1/1997 | Buchanan et al. |
| 5,643,342 A | 7/1997 | Andrews |
| 5,707,417 A | 1/1998 | Yokoyama et al. |
| 5,711,771 A | 1/1998 | Brown |
| 5,755,836 A | 5/1998 | Beyer |
| 5,797,972 A | 8/1998 | Schulz |
| 5,888,256 A | 3/1999 | Morrison |
| 5,916,826 A | 6/1999 | White |
| 5,980,595 A | 11/1999 | Andrews |
| 6,000,639 A | 12/1999 | Ganguli |
| 6,001,143 A | 12/1999 | Rees et al. |
| 6,048,374 A | 4/2000 | Green |
| 6,149,694 A | 11/2000 | Redden, Jr. et al. |
| 6,152,306 A | 11/2000 | Miller |
| 6,152,974 A | 11/2000 | Delpiano et al. |
| 6,165,238 A | 12/2000 | Parkinson et al. |
| 6,214,064 B1 | 4/2001 | Boss et al. |
| 6,352,956 B1 | 3/2002 | Kienow et al. |
| 6,401,635 B1 | 6/2002 | Nieminen et al. |
| 6,409,798 B1 | 6/2002 | Nieminen et al. |
| 6,423,878 B2 | 7/2002 | Reverso |
| 6,506,223 B2 | 1/2003 | White |
| 6,522,994 B1 | 2/2003 | Lang |
| 6,582,486 B1 | 6/2003 | Delpiano et al. |
| 6,635,093 B1 | 10/2003 | Schoen et al. |
| 6,692,544 B1 | 2/2004 | Grillenzoni |
| 6,780,210 B2 | 8/2004 | Boss et al. |
| 6,790,383 B2 | 9/2004 | Kim et al. |
| 7,028,478 B2 | 4/2006 | Prentice, III |
| 7,252,691 B2 | 8/2007 | Philipson |
| 7,314,002 B2 | 1/2008 | Dupuis |
| 7,334,345 B2 | 2/2008 | Lasonde |
| 7,431,156 B2 | 10/2008 | Carlsson |
| 8,157,874 B2 | 4/2012 | Bohlig et al. |
| 8,157,875 B2 | 4/2012 | Bohlig et al. |
| 8,192,512 B2 * | 6/2012 | Bohlig ............... C10J 3/463 44/589 |
| 8,192,513 B2 | 6/2012 | Bohlig et al. |
| 8,349,034 B2 * | 1/2013 | Calabrese ............ C10J 3/482 241/14 |
| 8,382,862 B2 * | 2/2013 | Bohlig ............... C10L 5/46 44/589 |
| 8,382,863 B2 * | 2/2013 | Bohlig ............... C10J 3/463 44/589 |
| 8,444,721 B2 * | 5/2013 | Bai ............... C10L 5/36 44/605 |
| 8,523,962 B2 * | 9/2013 | Bohlig ............... C10J 3/463 44/605 |
| 8,585,787 B2 * | 11/2013 | Bai ............... C10L 10/00 44/589 |

(56) References Cited

U.S. PATENT DOCUMENTS

| | | | |
|---|---|---|---|
| 8,617,264 B2 * | 12/2013 | Bohlig | C10L 5/46 44/589 |
| 8,828,105 B2 * | 9/2014 | Calabrese | C10J 3/482 241/14 |
| 8,852,302 B2 | 10/2014 | Bai | |
| 8,906,119 B2 * | 12/2014 | Bohlig | C10J 3/463 44/605 |
| 8,999,014 B2 * | 4/2015 | Bai | C10L 9/08 44/589 |
| 9,062,268 B2 * | 6/2015 | Bai | C10L 5/36 |
| 9,126,204 B1 | 9/2015 | Toberman et al. | |
| 9,181,508 B2 | 11/2015 | Bohlig et al. | |
| 9,487,722 B2 | 11/2016 | Bai et al. | |
| 9,523,051 B2 * | 12/2016 | Bai | C10L 5/36 |
| 9,688,931 B2 * | 6/2017 | Bai | C10J 3/463 |
| 9,752,086 B2 * | 9/2017 | Bohlig | C10L 5/46 |
| 10,174,268 B2 | 1/2019 | Bai et al. | |
| 2002/0184816 A1 | 12/2002 | Philipson | |
| 2004/0050678 A1 | 3/2004 | Takahashi et al. | |
| 2004/0141891 A1 | 7/2004 | Abe et al. | |
| 2004/0237405 A1 | 12/2004 | Takeuchi et al. | |
| 2004/0244289 A1 | 12/2004 | Morozumi et al. | |
| 2005/0050799 A1 | 3/2005 | Buchanan et al. | |
| 2005/0074380 A1 | 4/2005 | Boren et al. | |
| 2006/0053791 A1 | 3/2006 | Prentice, III | |
| 2006/0096163 A1 | 5/2006 | Dickinson et al. | |
| 2006/0112616 A1 | 6/2006 | Noll et al. | |
| 2006/0120933 A1 | 6/2006 | Boardman et al. | |
| 2006/0123697 A1 | 6/2006 | Jansen | |
| 2006/0194990 A1 | 8/2006 | Miyoshi et al. | |
| 2006/0228294 A1 | 10/2006 | Davis et al. | |
| 2006/0254957 A1 | 11/2006 | Bohlig et al. | |
| 2006/0265954 A1 | 11/2006 | Dogru et al. | |
| 2007/0004809 A1 | 1/2007 | Lattner et al. | |
| 2007/0006526 A1 | 1/2007 | Cullen | |
| 2007/0173673 A1 | 7/2007 | Fujimoto et al. | |
| 2007/0204512 A1 | 9/2007 | Self et al. | |
| 2007/0261295 A1 | 11/2007 | Tolmie | |
| 2008/0014112 A1 | 1/2008 | Lee et al. | |
| 2008/0060519 A1 | 3/2008 | Maly et al. | |
| 2008/0110090 A1 | 5/2008 | Zawadzki et al. | |
| 2008/0193351 A9 | 8/2008 | Boardman et al. | |
| 2008/0233029 A1 | 9/2008 | Fan et al. | |
| 2008/0237093 A1 | 10/2008 | Bohlig et al. | |
| 2008/0290006 A1 | 11/2008 | Duffy et al. | |
| 2009/0056205 A1 | 3/2009 | Gauthier et al. | |
| 2009/0056206 A1 | 3/2009 | Gauthier et al. | |
| 2009/0099038 A1 | 4/2009 | Deisseroth et al. | |
| 2010/0018113 A1 | 1/2010 | Bohlig et al. | |
| 2010/0031560 A1 | 2/2010 | Calabrese et al. | |
| 2010/0144905 A1 | 6/2010 | Reaveley et al. | |
| 2010/0218419 A1 | 9/2010 | Bai | |
| 2010/0263577 A1 | 10/2010 | Nijhawan | |
| 2011/0099890 A1 | 5/2011 | Bohlig et al. | |
| 2011/0209393 A1 | 9/2011 | Bohlig et al. | |
| 2011/0209394 A1 | 9/2011 | Bohlig et al. | |
| 2011/0209395 A1 | 9/2011 | Bohlig et al. | |
| 2011/0209396 A1 | 9/2011 | Bohlig et al. | |
| 2011/0209397 A1 | 9/2011 | Bohlig et al. | |
| 2011/0209398 A1 | 9/2011 | Bohlig et al. | |
| 2011/0209399 A1 | 9/2011 | Bohlig et al. | |
| 2013/0097921 A1 | 4/2013 | Calabrese et al. | |
| 2013/0298454 A1 | 11/2013 | Bai | |
| 2014/0096441 A1 | 4/2014 | Bai et al. | |
| 2014/0157659 A1 | 6/2014 | Bohlig et al. | |
| 2015/0096222 A1 | 4/2015 | Calabrese et al. | |
| 2015/0197698 A1 | 7/2015 | Bohlig et al. | |
| 2016/0002546 A1 | 1/2016 | Bai | |
| 2016/0108328 A1 | 4/2016 | Bohlig et al. | |
| 2017/0073599 A1 | 3/2017 | Bai et al. | |
| 2017/0137729 A1 | 5/2017 | Bai et al. | |
| 2018/0086995 A1 | 3/2018 | Bohlig et al. | |

FOREIGN PATENT DOCUMENTS

| | | |
|---|---|---|
| CN | 101215490 | 7/2008 |
| EP | 0568345 | 2/1997 |
| EP | 1167494 | 1/2002 |
| EP | 1083212 B1 | 11/2004 |
| EP | 2134820 B1 | 9/2011 |
| EP | 2307531 B1 | 2/2012 |
| FR | 2818657 | 6/2002 |
| JP | S58-061181 | 4/1983 |
| JP | H05-132683 | 5/1993 |
| JP | H07-179871 | 7/1995 |
| JP | H10-235313 | 9/1998 |
| JP | H10-244237 | 9/1998 |
| JP | 2003-253037 | 9/2003 |
| JP | 2005-290129 | 10/2005 |
| JP | 2008-106270 | 5/2008 |
| JP | 2011-526323 | 10/2011 |
| WO | WO 2002/051969 | 7/2002 |
| WO | WO 2005/097684 | 10/2005 |
| WO | WO 2006/053020 | 5/2006 |
| WO | WO 2007/123510 | 11/2007 |
| WO | WO 2007/147244 | 12/2007 |
| WO | WO 2008/107042 | 9/2008 |
| WO | WO 2009/158539 | 12/2009 |
| WO | WO 2009/158540 | 12/2009 |
| WO | WO 2010/013202 | 2/2010 |
| WO | WO 2011/078928 | 6/2011 |
| WO | WO 2011/084730 | 7/2011 |
| WO | WO 2013/113026 | 8/2013 |

OTHER PUBLICATIONS

Even, J. C. et al., "Evaluation of the Ames Solid Waste Recovery System, Part I, Summary of Environmental Emissions: Equipment, Facilities, and Economic Evaluations," EPA-600/2-77-205 (Nov. 1977).

Fiscus, D. E. et al., "Evaluation of the Performance of the Disc Screens Installed at the City of Ames, Iowa Resource Recovery Facility," Proc. ASME National Waste Processing Conf., Washington, DC, 1980.

Fiscus, D. E. et al., "Study of Existing RDF-Cofiring Experience, vol. 3: Phase II Final Report," ANL/CNSV-TM-134, vol. 3, Oct. 31, 1983.

Refuse Derived Fuel, Current Practice and Perspectives (B4-3040/2000/306517/MAR/E3) Final Report No. CO 5087-4, Jul. 2003.

Garg, A. et al., "Wastes as Co-Fuels: the Policy Framework for Solid Recovered Fuel (SRF) in Europe, with UK Implications," Environ. Sci. Technol., 41(14):4868-4874 (2007).

Raghunathan, K. et al., "Prevention of PCDD/PCDF Formation by Coal Co-Firing," U.S. Environmental Protection Agency, Air Pollution Prevention and Control Division (1998), pp. 779-793.

Canova, J. H., "Testing and Evaluating the Combustion Characteristics of Waste Fuels," (1992), 120 pages.

Fritsky, K. J. et al., "Methodology for Modeling the Devolatilization of Refuse-Derived Fuel from Thermogravimetric Analysis of Municipal Solid Waste Components," J. Air & Waste Manage. Assoc. 44:9, 1116-1123 (1994).

U.S. Environmental Protection Agency, Cement Sector, Trends in Beneficial Use of Alternative Fuels and Raw Materials, Oct. 2008, 117 pages.

European Search Report and Search Opinion for European Application No. 17163242.5, dated Aug. 1, 2017, 8 pages.

Complaint for Patent Infringement filed by Accordant Energy, LLC, *Accordant Energy, LLC v. Vexor Technology, Inc. et al.*, In the United States District Court for the Northern District of Ohio Eastern Division, Civil Action No. 1:17-cv-411, filed Feb. 28, 2017, 21 pages.

Amended Answer and Counterclaims filed by Vexor Technology, Inc. and Vexor Technology, LLC, *Accordant Energy, LLC v. Vexor Technology, Inc. et al.*, In the United States District Court for the Northern District of Ohio Eastern Division, Civil Action No. 1:17-cv-411, filed May 18, 2017, 49 pages.

(56) References Cited

OTHER PUBLICATIONS

Ghani, "Co-combustion of biomass fuels with coal in a fluidised bed combustor," Diss. University of Sheffield, May 2005, 213 pages.

Psomopoulos, C. S. et al., "Waste to energy: A review of the status and benefits in U.S.A.", Proceedings of the International Conference on Environmental Management, Engineering, Planning and Economics, Skiathos, Greece, Jun. 24-28, 2007, pp. 1901-1906.

Psomopoulos, C. S. et al., "Residue derived fuels production in Greece: an alternative fuel for the power generation sector based in EU and international experience," Sixth Mediterranean Conference and Exhibition on Power Generation, Transmission and Distribution, IET Hellas (MedPower 2008), Thessaloniki. 2008.

Kilgroe, J., Municipal-waste combustion study: combustion control of organic emissions. Final report. No. PB-87-206090/XAB. Energy and Environmental Research Corp., Irvine, CA (USA), 1987.

Supplementary European Search Report for European Application No. 09771071.9, dated May 21, 2012, 7 pages.

International Search Report and Written Opinion for International Application No. PCT/US2009/048718, dated Aug. 13, 2009, 9 pages.

Supplementary European Search Report for European Application No. 09771072.7, dated May 21, 2012, 7 pages.

International Search Report and Written Opinion for International Application No. PCT/US2009/048719, dated Sep. 16, 2009, 9 pages.

International Search Report and Written Opinion for International Application No. PCT/US2010/061228, dated Feb. 22, 2011, 14 pages.

International Search Report and Written Opinion for International Application No. PCT/US2010/057351, dated Feb. 2, 2011.

Arena, U. et al., "Gasification of a Plastic Waste in a Pilot Fluidized Bed Reactor," 7 pages, 10th Conference on Process Integration, Modelling and Optimisation for Energy Saving and Pollution Reduction, Ischia Island, Gulf of Naples, Jun. 24-27, 2007.

Aznar et al., "Plastic waste elimination by co-gasification with coal and biomass in fluidized bed with air in pilot plant," Fuel Processing Technology 87(5):409-420 (2006).

Blasi, "Influence of physical properties on biomass devolitilization characteristics," Fuel, 76(10):957-964 (1997).

Bourgois et al., "Characterization and analysis of torrefied wood," Wood Sci. Technol., 22:143-155 (1988).

Buckley, T. J. et al., "Evaluation of data on higher-heating values and elemental analysis for refuse derived fuels," National Waste Processing Conf., PA, USA pp. 16-24 (1988), discussions and author's reply.

Buckley, T. J. et al., "Evaluation of data on higher-heating values and elemental analysis for refuse derived fuels," National Waste Processing Conf., PA, USA pp. 77-84 (1988).

Phyllis Database, "Elemental content," [online], URL: <http://www.ecn.nl/phyllis/>, See ECN Phyllis Classification Bagasse #1481, (1998), 6 pages.

Biobib, "paper," "waste, domestic organic waste from the municipal collection," "douglas fir," and "wood, sawdust," 12 pages, from BIOBIB a Data Base for Biofuels (www.vt.tuwien.ac.at/biobib/biobib.html information available online 2007 and earlier).

Frost, M., "Tires as a fuel supplement: feasibility study," 1992, pp. 1-120.

Prins, M. J. et al., "From coal to biomass gasification: Comparison of thermodynamic efficiency," Energy 32:1248-1259 (2007).

Ragland, K. W. et al., "Properties of wood for combustion analysis," Bioresource Technology, 37(2):161-168 (1991).

Monti, A. (ed.), Green Energy and Technology, Switchgrass: A Valuable Biomass Crop for Energy, pp. 170-171 (2012).

Sami, M., "Co-Firing of Coal and Biomass Fuel Blends," Progress in Energy and Combustion Science, 27(2):171-214 (2001).

Xie, Q. et al., Municipal Solid Waste Energy Utilization Technology, Chemical Industry Press, First Edition (2004), pp. 78-80.

European Search Report for European Application No. 17166365.1, dated Jun. 13, 2017, 8 pages.

Supplementary European Search Report for European Application No. 16206883.7, dated May 10, 2017, 6 pages.

Boavida, D. et al., "Co-combustion of coal and non-recyclable paper and plastic waste in a fluidised bed reactor," Fuel, 82 (2003) 1931-1938.

Cozzani, V. et al., "Devolatilization and pyrolysis of refuse derived fuels: characterization and kinetic modelling by a thermogravimetric and calorimetric approach," Fuel, 74(6):903-912 (1995).

Fisher, M. M. et al., "Processed engineered fuels derived from paper and plastic—Techno-economic factors and regulatory issues in a competitive market," Proceedings of Fifth Annual North American Waste-to-Energy Conference, Research Triangle Park, North Carolina, Apr. 22-25, 1997, pp. 475-488.

Hasselriis, F., "Refuse-Derived Fuel Processing," Butterworth Publishers, 1984, pp. 1-340.

Kreith, F. et al. (eds.), "The CRC Handbook of Mechanical Engineering," Second Edition, Jan. 2004, CRC Press, Chapter 7, p. 7-32.

Pinto, F. et al., "Pyrolysis of plastic wastes. 1. Effect of plastic waste composition on product yield," Journal of Analytical and Applied Pyrolysis, 51(1-2):39-55 (Jul. 1999).

Sorum, L. et al., "Pyrolysis characteristics and kinetics of municipal solid wastes," Fuel, 80(9):1217-1227 (Jul. 2001).

Tomczyk, L., "Engineered Fuel: Renewable Fuel of the Future?," Solid Waste Technologies, Jan./Feb. 1997, 10 pages.

Wu, C-H et al., "On the thermal treatment of plastic mixtures of MSW: Pyrolysis kinetics," Waste Management, vol. 13, Jan. 1993, pp. 221-235.

Opposition Against European Patent No. 2300575 filed by DREISS Patentanwalte PartGmbB, filed Jan. 23, 2018, 30 pages.

ASTM International, Designation: D3176-09, Standard Practice for Ultimate Analysis of Coal and Coke (2012), 4 pages.

ASTM International, Designation: D5373-08, Standard Test Methods for Instrumental Determination of Carbon, Hydrogen, and Nitrogen in Laboratory Samples of Coal (2012), 9 pages.

Bailie, R. C. et al., "Solid Waste" Chapter 10, 1999, 108 pages.

United States Environmental Protection Agency, "Characterization of Municipal Solid Waste in the United States: 1998 Update," (1999), 174 pages.

* cited by examiner

ENGINEERED FUEL FEED STOCK

CROSS REFERENCE TO RELATED APPLICATIONS

This application is a continuation of U.S. application Ser. No. 14/555,063, filed on Nov. 26, 2014, now U.S. Pat. No. 9,688,931, entitled "ENGINEERED FUEL FEED STOCK," which is a continuation of U.S. application Ser. No. 13/087,108, filed on Apr. 14, 2011, now U.S. Pat. No. 8,906,119, entitled 'ENGINEERED FUEL FEED STOCK," which is a division of U.S. application Ser. No. 12/492,096, filed on Jun. 25, 2009, entitled "ENGINEERED FUEL FEED STOCK," which claims the benefit of priority under 35 U.S.C. 119(e) to U.S. application Ser. No. 61/076,025, filed on Jun. 26, 2008, and entitled "ENGINEERED FUEL PELLET," and U.S. application Ser. No. 61/076,020, filed Jun. 26, 2008, and entitled "ENGINEERED INERT FUEL PELLET," the contents of each of which are hereby incorporated by reference in their entireties.

FIELD OF THE INVENTION

The present invention relates to alternative fuels. In particular, the invention relates to engineering engineered fuel feed stock suited for specific applications including as a fossil fuel substitute for combustion, as well as feed stock for gasification to produce high quality synthesis gas. Feed stock can be engineered to control air emission profiles upon combustion or gasification (such as dioxins, sulfur emitted, as well as others pollutants) as well as to avoid slagging. The feed stock described herein comprises at least one component of processed municipal solid waste, and optionally other components.

BACKGROUND OF THE INVENTION

Sources of fossil fuels useful for heating, transportation, and the production of chemicals as well as petrochemicals are becoming increasingly more scarce and costly. Industries such as those producing energy and petrochemicals are actively searching for cost effective engineered fuel feed stock alternatives for use in generating those products and many others. Additionally, due to the ever increasing costs of fossil fuels, transportation costs for moving engineered fuel feed stocks for production of energy and petrochemicals is rapidly escalating.

These energy and petrochemical producing industries, and others, have relied on the use of fossil fuels, such as coal and oil and natural gas, for use in combustion and gasification processes for the production of energy, for heating and electricity, and the generation of synthesis gas used for the downstream production of chemicals and liquid fuels, as well as an energy source for turbines.

Combustion and gasification are thermochemical processes that are used to release the energy stored within the fuel source. Combustion takes place in a reactor in the presence of excess air, or excess oxygen. Combustion is generally used for generating steam which is used to power turbines for producing electricity. However, the brute force nature of the combustion of fuel causes significant amounts of pollutants to be generated in the gas produced. For example, combustion in an oxidizing atmosphere of, for example, fossil fuels such as coal, oil and natural gas, releases nitrogen oxides, a precursor to ground level ozone which can stimulate asthma attacks. Combustion is also the largest source of sulfur dioxide which in turn produces sulfates that are very fine particulates. Fine particle pollution from U.S. power plants cuts short the lives of over 30,000 people each year. Hundreds of thousands of Americans suffer from asthma attacks, cardiac problems and upper and lower respiratory problems associated with fine particles from power plants.

Gasification also takes place in a reactor, although in the absence of air, or in the presence of substochiometric amounts of oxygen. The thermochemical reactions that take place in the absence of oxygen or under substochiometric amounts of oxygen do not result in the formation of nitrogen oxides or sulfur oxides. Therefore, gasification can eliminate much of the pollutants formed during the firing of fuel.

Gasification generates a gaseous, fuel rich product known as synthesis gas (syngas). During gasification, two processes take place that convert the fuel source into a useable fuel gas. In the first stage, pyrolysis releases the volatile components of the fuel at temperatures below 600° C. (1112° F.), a process known as devolatization. The pyrolysis also produces char that consists mainly of carbon or charcoal and ash. In the second gasification stage, the carbon remaining after pyrolysis is either reacted with steam, hydrogen, or pure oxygen. Gasification with pure oxygen results in a high quality mixture of carbon monoxide and hydrogen due to no dilution of nitrogen from air.

A variety of gasifier types have been developed. They can be grouped into four major classifications: fixed-bed updraft, fixed-bed downdraft, bubbling fluidized-bed and circulating fluidized bed. Differentiation is based on the means of supporting the fuel source in the reactor vessel, the direction of flow of both the fuel and oxidant, and the way heat is supplied to the reactor. The advantages and disadvantages of these gasifier designs have been well documented in literature, for example, Rezaiyan, J. and Nicholas P. Cheremisinoff, *Gasification Technology, A Primer for Engineers and Scientists*. Boca Raton: CRC Press, 2005, the contents of which are hereby incorporated by reference.

The updraft gasifier, also known as counterflow gasification, is the oldest and simplest form of gasifier; it is still used for coal gasification. The fuel is introduced at the top of the reactor, and a grate at the bottom of the reactor supports the reacting bed. The oxidant in the form of air or oxygen and/or steam are introduced below the grate and flow up through the bed of fuel and char. Complete combustion of char takes place at the bottom of the bed, liberating $CO_2$ and $H_2O$. These hot gases (~1000° C.) pass through the bed above, where they are reduced to $H_2$ and CO and cooled to about 750° C. Continuing up the reactor, the reducing gases ($H_2$ and CO) pyrolyse the descending dry fuel and finally dry any incoming wet fuel, leaving the reactor at a low temperature (~500° C.). Updraft gasification is a simple, low cost process that is able to handle fuel with a high moisture and high inorganic content. The primary disadvantage of updraft gasification is that the synthesis gas contains 10-20% tar by weight, requiring extensive syngas cleanup before engine, turbine or synthesis applications.

Downdraft gasification, also known as concurrent-flow gasification, has the same mechanical configuration as the updraft gasifier except that the oxidant and product gases flow down the reactor, in the same direction as the fuel, and can combust up to 99.9% of the tars formed. Low moisture fuel (<20%) and air or oxygen are ignited in the reaction zone at the top of the reactor, generating pyrolysis gas/vapor, which burns intensely leaving 5 to 15% char and hot combustion gas. These gases flow downward and react with the char at 800 to 1200° C., generating more CO and $H_2$ while being cooled to below 800° C. Finally, unconverted char and ash pass through the bottom of the grate and are sent to disposal. The advantages of downdraft gasification are that up to 99.9% of the tar formed is consumed, requiring minimal or no tar cleanup. Minerals remain with the char/ash, reducing the need for a cyclone. The disadvantages of downdraft gasification are that it requires feed drying to a low moisture content (<20%). The syngas exiting the reactor is at high temperature, requiring a secondary heat recovery system; and 4-7% of the carbon remains unconverted.

The bubbling fluidized bed consists of fine, inert particles of sand or alumina, which have been selected for size, density, and thermal characteristics. As gas (oxygen, air or steam) is forced through the inert particles, a point is reached when the frictional force between the particles and the gas counterbalances the weight of the solids. At this gas velocity (minimum fluidization), the solid particles become suspended, and bubbling and channeling of gas through the media may occur, such that the particles remain in the reactor and appear to be in a "boiling state". The minimum fluidization velocity is not equal to the minimum bubbling velocity and channeling velocity. For coarse particles, the minimum bubbling velocity and channeling velocity are close or almost equal, but the channeling velocity may be quite different, due to the gas distribution problem. The fluidized particles tend to break up the fuel fed to the bed and ensure good heat transfer throughout the reactor. The advantages of bubbling fluidized-bed gasification are that it yields a uniform product gas and exhibits a nearly uniform temperature distribution throughout the reactor. It is also able to accept a wide range of fuel particle sizes, including fines; provides high rates of heat transfer between inert material, fuel and gas.

The circulating fluidized bed gasifies operate at gas velocities higher than the so-called transport velocity or onset velocity of circulating fluidization at which the entrainment of the bed particles dramatically increases so that continuous feeding or recycling back the entrained particles to the bed is required to maintain a stable gas-solid system in the bed.—The circulating fluidized-bed gasification is suitable for rapid reactions offering high heat transport rates due to high heat capacity of the bed material. High conversion rates are possible with low tar and unconverted carbon.

Normally these gasifiers use a homogeneous source of fuel. A constant unchanging fuel source allows the gasifier to be calibrated to consistently form the desired product. Each type of gasifier will operate satisfactorily with respect to stability, gas quality, efficiency and pressure losses only within certain ranges of the fuel properties. Some of the properties of fuel to consider are energy content, moisture content volatile matter, ash content and ash chemical composition, reactivity, size and size distribution, bulk density, and charring properties. Before choosing a gasifier for any individual fuel it is important to ensure that the fuel meets the requirements of the gasifier or that it can be treated to meet these requirements. Practical tests are needed if the fuel has not previously been successfully gasified.

Normally, gasifiers use a homogeneous source of fuel for producing synthesis gas. A constant unchanging fuel source allows the gasifier to be calibrated to consistently form the desired product. Each type of gasifier will operate satisfactorily with respect to stability, gas quality, efficiency and pressure losses only within certain ranges of the fuel properties. Some of the properties of fuel to consider for combustion and gasification are high heating value (HHV) content, carbon (C), hydrogen (H), and oxygen (O) content, BTU value, moisture content, volatile matter content, ash content and ash chemical composition, sulfur content, chlorine content, reactivity, size and size distribution, and bulk density. Before choosing a gasifier for any individual fuel it is important to ensure that the fuel meets the requirements of the gasifier or that it can be treated to meet these requirements. Practical tests are needed if the fuel has not previously been successfully gasified.

One potential source for a large amount of feed stock for gasification is waste. Waste, such as municipal solid waste (MSW), is typically disposed of or used in combustion processes to generate heat and/or steam for use in turbines. The drawbacks accompanying combustion have been described above, and include the production of pollutants such as nitrogen oxides, sulfur oxide, particulates and products of chlorine that damage the environment.

One of the most significant threats facing the environment today is the release of pollutants and greenhouse gases (GHGs) into the atmosphere through the combustion of fuels. GHGs such as carbon dioxide, methane, nitrous oxide, water vapor, carbon monoxide, nitrogen oxide, nitrogen dioxide, and ozone, absorb heat from incoming solar radiation but do not allow long-wave radiation to reflect back into space. GHGs in the atmosphere result in the trapping of absorbed heat and warming of the earth's surface. In the U.S., GHG emissions come mostly from energy use driven largely by economic growth, fuel used for electricity generation, and weather patterns affecting heating and cooling needs. Energy-related carbon dioxide emissions, resulting from petroleum and natural gas, represent 82 percent of total U.S. human-made GHG emissions. Another greenhouse gas, methane, comes from landfills, coal mines, oil and gas operations, and agriculture; it represents nine percent of total emissions. Nitrous oxide (5 percent of total emissions), meanwhile, is emitted from burning fossil fuels and through the use of certain fertilizers and industrial processes. World carbon dioxide emissions are expected to increase by 1.9 percent annually between 2001 and 2025. Much of the increase in these emissions is expected to occur in the developing world where emerging economies, such as China and India, fuel economic development with fossil energy. Developing countries' emissions are expected to grow above the world average at 2.7 percent annually between 2001 and 2025; and surpass emissions of industrialized countries near 2018.

Waste landfills are also significant sources of GHG emissions, mostly because of methane released during decomposition of waste, such as, for example, MSW. Compared with carbon dioxide, methane is twenty-times stronger than carbon, dioxide as a GHG, and landfills are responsible for about 4% of the anthropogenic emissions. Considerable reductions in methane emissions can be achieved by combustion of waste and by collecting methane from landfills. The methane collected from the landfill can either be used directly in energy production or flared off, i.e., eliminated through combustion without energy production (*Combustion Of Waste May Reduce Greenhouse Gas Emissions*, ScienceDaily, Dec. 8, 2007).

One measure of the impact human activities have on the environment in terms of the amount of green house gases produced is the carbon footprint, measured in units of carbon dioxide ($CO_2$). The carbon footprint can be seen as the total amount of carbon dioxide and other GHGs emitted over the full life cycle of a product or service. Normally, a carbon footprint is usually expressed as a $CO_2$ equivalent (usually in kilograms or tons), which accounts for the same global warming effects of different GHGs. Carbon footprints can be calculated using a Life Cycle Assessment method, or can be restricted to the immediately attributable emissions from energy use of fossil fuels.

An alternative definition of carbon footprint is the total amount of $CO_2$ attributable to the actions of an individual (mainly through their energy use) over a period of one year. This definition underlies the personal carbon calculators. The term owes its origins to the idea that a footprint is what has been left behind as a result of the individual's activities. Carbon footprints can either consider only direct emissions (typically from energy used in the home and in transport, including travel by cars, airplanes, rail and other public transport), or can also include indirect emissions which include $CO_2$ emissions as a result of goods and services consumed, along with the concomitant waste produced.

The carbon footprint can be efficiently and effectively reduced by applying the following steps: (i) life cycle assessment to accurately determine the current carbon footprint; (ii) identification of hot-spots in terms of energy consumption and associated $CO_2$-emissions; (iii) optimization of energy efficiency and, thus, reduction of $CO_2$-emissions and reduction of other GHG emissions contributed from production processes; and (iv) identification of solutions to neutralize the $CO_2$ emissions that cannot be eliminated by energy saving measures. The last step includes carbon offsetting, and investment in projects that aim at the reducing $CO_2$ emissions.

The purchase of carbon offsets is another way to reduce a carbon footprint. One carbon offset represents the reduction of one ton of $CO_2$-eq. Companies that sell carbon offsets invest in projects such as renewable energy research, agricultural and landfill gas capture, and tree-planting.

Purchase and withdrawal of emissions trading credits also occur, which creates a connection between the voluntary and regulated carbon markets. Emissions trading schemes provide a financial incentive for organizations and corporations to reduce their carbon footprint. Such schemes exist under cap-and-trade systems, where the total carbon emissions for a particular country, region, or sector are capped at a certain value, and organizations are issued permits to emit a fraction of the total emissions. Organizations that emit less carbon than their emission target can then sell their "excess" carbon emissions.

For many wastes, the disposed materials represent what is left over after a long series of steps including: (i) extraction and processing of raw materials; (ii) manufacture of products; (iii) transportation of materials and products to markets; (iv) use by consumers; and (v) waste management. At virtually every step along this "life cycle," the potential exists for greenhouse gas (GHG) impacts. Waste management affects GHGs by affecting energy consumption (specifically, combustion of fossil fuels) associated with making, transporting, using, and disposing the product or material that becomes a waste and emissions from the waste in landfills where the waste is disposed.

Incineration typically reduces the volume of the MSW by about 90% with the remaining 10% of the volume of the original MSW still needing to be land filled. This incineration process produces large quantities of the GHG $CO_2$. Typically, the amount of energy produced per equivalents $CO_2$ expelled during incineration are very low, thus making incineration of MSW for energy production one of the worst offenders in producing GHG released into the atmosphere. Therefore, if GHGs are to be avoided, new solutions for the disposal of wastes, such as MSW, other than landfilling and incineration, are needed.

Each material disposed of as waste has a different GHG impact depending on how it is made and disposed. The most important GHGs for waste management options are carbon dioxide, methane, nitrous oxide, and perfluorocarbons. Of these, carbon dioxide ($CO_2$) is by far the most common GHG emitted in the US. Most carbon dioxide emissions result from energy use, particularly fossil fuel combustion. Carbon dioxide is the reference gas for measurement of the heat-trapping potential (also known as global warming potential or GWP). By definition, the GWP of one kilogram (kg) of carbon dioxide is 1. Methane has a GWP of 21, meaning that one kg of methane has the same heat-trapping potential as 21 kg of $CO_2$. Nitrous oxide has a GWP of 310. Perfluorocarbons are the most potent GHGs with GWPs of 6,500 for $CF_4$ and 9,200 for $C_2F_6$. Emissions of carbon dioxide, methane, nitrous oxide, and perfluorocarbons are usually expressed in "carbon equivalents." Because $CO_2$ is 12/44 carbon by weight, one metric ton of $CO_2$ is equal to 12/44 or 0.27 metric tons of carbon equivalent (MTCE). The MTCE value for one metric ton of each of the other gases is determined by multiplying its GWP by a factor of 12/44 (The Intergovernmental Panel on Climate Change (IPCC), *Climate Change* 1995: *The Science of Climate Change*, 1996, p. 121). Methane ($CH_4$), a more potent GHG, is produced when organic waste decomposes in an oxygen free (anaerobic) environment, such as a landfill. Methane from landfills is the largest source of methane in the US.

The greater GHG emission reductions are usually obtained when recycled waste materials are processed and used to replace fossil fuels. If the replaced material is biogenic (material derived from living organisms), it is not always possible to obtain reductions of emissions. Even other factors, such as the treatment of the waste material and the fate of the products after the use, affect the emissions balance. For example, the recycling of oil-absorbing sheets made of recycled textiles lead to emission reductions compared with the use of virgin plastic. In another example, the use of recycled plastic as raw material for construction material was found to be better than the use of impregnated wood. This is because the combustion of plastic causes more emissions than impregnated wood for reducing emissions. If the replaced material had been fossil fuel-based, or concrete, or steel, the result would probably have been more favorable to the recycling of plastic.

Given the effect of GHGs on the environment, different levels of government are considering, and in some instances have initiated, programs aimed at reducing the GHGs released into the atmosphere during the conversion of fuels into energy. One such initiative is the Regional Greenhouse Gas Initiative (RGGI). RGGI is a market-based program designed to reduce global warming pollution from electric power plants in the Northeast. Other such initiatives are being considered in different sections of the U.S. and on the federal level. RGGI is a government mandated GHG trading system in the Northeastern U.S. This program will require, for example, that coal-fired power plants aggressively reduce their GHG emissions by on average 2.5% per year. One way to do this is by changing the fuel source used or scrubbing the emissions to remove the pollutants. An alternative is to purchase carbon credits generated by others which can offset their emissions into the atmosphere.

Other emissions to be avoided are sulfur emissions as well as chlorine emissions. Fuels and waste containing significant amounts of sulfur or chlorine should be avoided for combustion and gasification reactions. Significant amounts are defined as an amount that when added to a final fuel feed stock causes the final feed stock to have more than 2% sulfur or more than 1% of chlorine. Materials such as coal, used tires, carpet, and rubber, when combusted, release unacceptable amounts of harmful sulfur- and chlorine-based gases.

Thus, there is a need for alternative fuels that burn efficiently and cleanly and that can be used for the production of energy and/or chemicals. There is at the same time a need for waste management systems that implement methods for reducing GHG emissions of waste by utilizing such wastes. In particular, there is a need for reducing the carbon foot print of materials by affecting their end-stage life cycle management. By harnessing and using the energy content contained in waste, it is possible to reduce GHG emissions generated during the processing of wastes and effectively use the waste generated by commercial and residential consumers.

It is an object of the present invention to provide an engineered fuel feed stock (EF) containing specified chemical molecular characteristics, such as carbon content, hydrogen content, oxygen content, sulfur content, ash content, moisture content, and HHV for thermal-conversion of carbon-containing materials. The engineered fuel feed stock is useful for many purposes including, but not limited to, production of synthesis gas. Synthesis gas, in turn, is useful for a variety of purposes including for production of liquid fuels by Fischer-Tropsch technology.

SUMMARY OF THE INVENTION

The present disclosure describes an engineered fuel feed stock comprising at least one component derived from a processed MSW waste stream, the feed stock possessing a range of chemical molecular characteristics which make it useful for a variety of combustion and gasification purposes. Purposes such as generating energy when used as a substitute for coal or as a supplement to coal is described, as well as a source feed stock for use in gasification and production of synthesis gas. The feed stock can be in the form of loose material, densified cubes, briquettes, pellets, or other suitable shapes and forms. A process of producing engineered fuel feed stock is described which comprises the process in which a plurality of waste streams, including solid and liquid wastes, are processed and, where necessary, separated in a materials recovery center so as to inventory the components which comprise the waste streams. In some embodiments, the materials comprising the waste stream in the materials recovery facility are inventoried for chemical molecular characteristics, without separation, and this inventoried material can be stored for subsequent use when producing a desired engineered fuel feed stock having a particular chemical molecular profile. In other embodiments, the materials comprising the waste stream entering the materials recovery facility are separated according to their chemical molecular characteristics and inventoried separately for use in producing an engineered fuel feed stock. These materials comprising the waste stream entering the materials recovery facility, when undergoing separation, can be positively or negatively selected for, based on, for example, BTU fuel content, carbon content, hydrogen content, ash content, chlorine content, or any other suitable characteristics, for gasification or combustion. Methods for making the engineered fuel feed stock described herein are also described.

Algorithms for engineering HHV fuels are disclosed. HHV fuels can be designed, for example, to have the highest possible heat content with a tolerable ash content in order to prevent slagging. These fuels have comparable energy density (BTU/lb) to coal, but without the problems of slagging, fusion and sulfur pollution, and can serve as a substitute for coal or a supplement to coal. Also, engineered fuel feed stocks can be designed, for example, to produce high quality syngas by optimizing the content of C, H, and O in the feed stock prior to gasification. Such engineered fuel feed stocks produce high qualify syngas in terms of HHV if the syngas is to be used for power generation applications or $H_2/CO$ ratios, amounts of CO and $H_2$ present in the product syngas in the event that the syngas is to be used in chemical synthetic applications. Also, engineered fuel feed stocks can be engineered so as to minimize harmful emissions, for example, engineered feed stocks comprising less than 2% sulfur content. Various waste stream components, including recyclable materials and recycling residue, can be used to produce the desired engineered fuel feed stock. Although at any given time during the life cycle of the waste entering the materials recovery facility, it may be determined that the highest and best use for some or all of the components of the waste streams is for them to be recycled.

Accordingly, in one aspect the present invention provides an engineered fuel feed stock, comprising a component derived from a processed MSW waste stream, the feed stock having a carbon content of between about 30% and about 80%, a hydrogen content of between about 3% and about 10%, an ash content of less than about 10%, a sulfur content of less than 2%, and a chlorine content of less than about 1%. In some embodiments, the feed stock has a HHV of between about 3,000 BTU/lb and about 15,000 BTU/lb. In some embodiments, the feed stock has a volatile matter content of about 40% to about 80%. In some embodiments, the feed stock has a moisture content of less than about 30%. In some embodiments, the feed stock has a moisture content of between about 10% and about 30%. In other embodiments, the feed stock has a moisture content of between about 10% and about 20%. In still further embodiments, the feed stock has a moisture content of about 1% and about 10%. The engineered fuel feed stock contains substantially no glass, metal, grit and noncombustibles (other than those necessary to cause the engineered fuel feed stock to be inert).

In some embodiments, the feed stock has a carbon content of between about 40% and about 70%. In some embodiments, the feed stock has a carbon content of between about 50% and about 60%. In some embodiments, the feed stock has a carbon content of between about 30% and about 40%. In some embodiments, the feed stock has a carbon content of between about 40% and about 50%. In some embodiments, the feed stock has a carbon content of between about 60% and about 70%. In some embodiments, the feed stock has a carbon content of between about 70% and about 80%. In some embodiments, the feed stock has a carbon content of about 35%. In some embodiments, the feed stock has a carbon content of about 45%. In some embodiments, the feed stock has a carbon content of about 55%. In some embodiments, the feed stock has a carbon content of about 65%. In some embodiments, the feed stock has a carbon content of about 75%.

In some embodiments, the feed stock has a hydrogen content of between about 4% and about 9%. In some embodiments, the feed stock has a hydrogen content of between about 5% and about 8%. In some embodiments, the feed stock has a hydrogen content of between about 6% and about 7%.

In some embodiments, the feed stock has a moisture content of between about 12% and about 28%. In some embodiments, the feed stock has a moisture content of between about 14% and about 24%. In some embodiments, the feed stock has a moisture content of between about 16% and about 22%. In some embodiments, the feed stock has a moisture content of between about 18% and about 20%.

In some embodiments, the feed stock has an ash content of less than about 10%. In some embodiments, the feed stock has an ash content of less than about 9%. In some embodiments, the feed stock has an ash content of less than about 8%. In some embodiments, the feed stock has an ash content of less than about 7%. In some embodiments, the feed stock has an ash content of less than about 6%. In some embodiments, the feed stock has an ash content of less than about 5%. In some embodiments, the feed stock has an ash content of less than about 4%. In some embodiments, the feed stock has an ash content of less than about 3%.

In some embodiments, the feed stock has a HHV of between about 3,000 BTU/lb and about 15,000 BTU/lb. In some embodiments, the feed stock has a HHV of between about 4,000 BTU/lb and about 14,000 BTU/lb. In some embodiments, the feed stock has a HHV of between about 5,000 BTU/lb and about 13,000 BTU/lb. In some embodiments, the feed stock has a HHV of between about 6,000 BTU/lb and about 12,000 BTU/lb. In some embodiments, the feed stock has a HHV of between about 7,000 BTU/lb and about 11,000 BTU/lb. In some embodiments, the feed stock has a HHV of between about 8,000 BTU/lb and about 10,000 BTU/lb. In some embodiments, the feed stock has a HHV of about 9,000 BTU/lb.

In some embodiments, the feed stock has a volatile matter content of about 50% to about 70%. In some embodiments, the feed stock has a volatile matter content of about 60%.

In some embodiments, the engineered fuel feed stock has a ratio of H/C from about 0.025 to about 0.20. In some embodiments, the engineered fuel feed stock has a ratio of H/C from about 0.05 to about 0.18. In some embodiments, the engineered fuel feed stock has a ratio of H/C from about 0.07 to about 0.16. In some embodiments, the engineered fuel feed stock has a ratio of H/C from about 0.09 to about 0.14. In some embodiments, the engineered fuel feed stock has a ratio of H/C from about 0.10 to about 0.13. In some embodiments, the engineered fuel feed stock has a ratio of H/C from about 0.11 to about 0.12. In some embodiments, the engineered fuel feed stock has a ratio of H/C of about 0.13. In some embodiments, the engineered fuel feed stock has a ratio of H/C of about 0.08.

In some embodiments, the engineered fuel feed stock has an O/C ratio from about 0.01 to about 1.0. In some embodiments, the engineered fuel feed stock has an O/C ratio from about 0.1 to about 0.8. In some embodiments, the engineered fuel feed stock has an O/C ratio from about 0.2 to about 0.7. In some embodiments, the engineered fuel feed stock has an O/C ratio from about 0.3 to about 0.6. In some embodiments, the engineered fuel feed stock has an O/C ratio from about 0.4 to about 0.5. In some embodiments, the engineered fuel feed stock has an O/C ratio of about 0.9. In some embodiments, the engineered fuel feed stock has an O/C ratio of about 0.01.

In some embodiments, the engineered fuel feed stock upon gasification at 850° C. and an ER of 0.34 produces synthesis gas comprising $H_2$ in an amount from about 6 vol. % to about 30 vol. %; CO in an amount from about 14 vol. % to about 25 vol. %, $CH_4$ in an amount from about 0.3 vol. % to about 6.5 vol. %, $CO_2$ in an amount from about 6.5 vol. % to about 13.5% vol. %; and $N_2$ in an amount from about 44 vol. % to about 68 vol. %.

In some embodiments, the engineered fuel feed stock upon gasification at 850° C. and an ER of 0.34 produces synthesis gas having an $H_2$/CO ratio from about 0.3 to about 2.0. In some embodiments, the engineered fuel feed stock upon gasification at 850° C. and an ER of 0.34 produces synthesis gas having an $H_2$/CO ratio from about 0.5 to about 1.5. In some embodiments, the engineered fuel feed stock upon gasification at 850° C. and an ER of 0.34 produces synthesis gas having an $H_2$/CO ratio from about 0.8 to about 1.2. In some embodiments, the engineered fuel feed stock upon gasification at 850° C. and an ER of 0.34 produces synthesis gas having an $H_2$/CO ratio of about 1.0.

In some embodiments, the engineered fuel feed stock upon gasification at 850° C. and an ER of 0.34 produces synthesis gas having $H_2$ in an amount of about 20 vol. %; $N_2$ in an amount of about 46 vol. %; CO in an amount of about 25 vol. %; $CH_4$ in an amount of about 1 vol. %; $CO_2$ in an amount of about 8 vol. %; and a BTU/scf of about 160.

In some embodiments, the engineered fuel feed stock when combusted produces less harmful emissions as compared to the combustion of coal. In some embodiments, the engineered fuel feed stock when combusted produces less sulfur emission as compared to the combustion of coal. In some embodiments, the engineered fuel feed stock when combusted produces less HCl emission as compared to the combustion of coal. In some embodiments, the engineered fuel feed stock when combusted produces less heavy metal emissions such as for example mercury as compared to the combustion of coal. In some embodiments, the engineered fuel feed stock is designed to avoid the emission of particulate matters, NOx, CO, CO2, volatile organic compounds (VOCs), and halogen gases.

In some embodiments, the engineered fuel feed stock is designed to have reduced emission profiles with respect to GHGs as compared to the GHGs emitted from combusted coal. In some embodiments, the engineered fuel feed stock is designed to have reduced emission profiles with respect to GHGs emitted from the combustion of biomasses such as for example, wood, switch grass and the like.

In some embodiments, the feed stock is in a loose, non-densified form. In other embodiments, the engineered fuel feed stock is in a densified form. In some embodiments, the densified form is a cube. In some embodiments, the densified form is rectangular. In other embodiments, the densified form is cylindrical. In some embodiments, the densified form is spherical. In some embodiments, the densified form is a briquette. In other embodiments, the densified form is a pellet. In some embodiments, the densified fuel is sliced into sheets of different thickness. In some embodiments, the thickness is between about 3/16 inches to about 3/4 inches. In some embodiments, the engineered fuel feed stock further comprises at least one waste material in addition to the component derived from a processed MSW waste stream that enhances the gasification of the fuel pellet. In some embodiments, the engineered fuel feed stock further comprises at least one waste material in addition to the component derived from a processed MSW waste stream that enhances the gasification of the fuel pellet. In some embodiments, the enhancement is a reduction in ash. In other embodiments, the enhancement aids in the control of temperature. In still other embodiments, the enhancement is a reduction in the amount of sulfur emissions produced. In still other embodiments, the enhancement is the reduction of chlorine emissions produced. In still other embodiments, the enhancement is the reduction of heavy metal emissions produced.

In some embodiments, the engineered fuel feed stock is rendered inert. In some embodiments, the engineered fuel feed stock comprises at least one additive that renders the feed stock inert. In some embodiments, an additive can be blended into the processed MSW waste stream that can render the resulting pellet inert. Some types of wet MSW contain a relatively high number of viable bacterial cells that can generate heat and hydrogen gas during fermentation under wet conditions, for example during prolonged storage or transportation. For example, an additive such as calcium hydroxide can be added to the MSW for the prevention of the rotting of food wastes and for the acceleration of drying of solid wastes. In some embodiments, the additive that renders the feed stock inert is CaO. Other non limiting examples of additives are calcium sulfoaluminate and other sulfate compounds, as long as they do not interfere with the downstream processes in which the pellet are used.

Alternatively, the MSW can be tendered biologically inert through any known method for inactivating biological material. For example, X-rays can be used to deactivate the MSW before processing, or after processing. Drying can be used to remove the water necessary for organisms such as microbes to grow. Treatment of the MSW with high heat and optionally also high heat under pressure (autoclaving) will also render the MSW biologically inert. In one embodiment, the excess heat generated by the reciprocating engines or turbines fueled by the engineered pellets can be redirected through the system and used to render the MSW inert. In other embodiments, the feed stock is rendered inert through means such as microwave radiation.

In some embodiments, the densified form of the engineered fuel feed stock has a diameter of between about 0.25 inches to about 1.5 inches. In some embodiments, the densified form of the engineered fuel feed stock has a length of between about 0.5 inches to about 6 inches. In some embodiments, the densified form of the engineered fuel feed stock has a surface to volume ratio of between about 20:1 to about 3:1. In some embodiments, the densified form of the engineered fuel feed stock has a bulk density of about 10 lb/ft$^3$ to about 75 lb/ft$^3$. In some embodiments, the densified form of the engineered fuel feed stock has a porosity of between about 0.2 and about 0.6. In some embodiments, the densified form of the engineered fuel feed stock has an aspect ratio of between about 1 to about 10. In some embodiments, the densified form of the engineered fuel feed stock has a thermal conductivity of between about 0.023 BTU/(ft·hr·° F.) and about 0.578 BTU/(ft·hr·° F.). In some embodiments, the densified form of the engineered fuel feed stock has a specific heat capacity of between about $4.78 \times 10^{-5}$ BTU/(lb·° F.) to $4.78 \times 10^{-4}$ BTU/(lb·° F.). In some embodiments, the densified form of the engineered fuel feed stock has a thermal diffusivity of between about $1.08 \times 10^{-5}$ ft$^2$/s to $2.16 \times 10^{-5}$ ft$^2$/s.

In some embodiments, the at least one waste material that enhances the gasification of the fuel pellet is selected from fats, oils and grease (FOG). In some embodiments, the at least one waste material that enhances the gasification of the fuel pellet is sludge. In some embodiments, the densified form of the engineered fuel feed stock is substantially encapsulated within the FOG component. In some of the embodiments, the encapsulation layer is scored. In still further embodiments, the scoring of the encapsulated densified form of the engineered fuel feed stock causes the fuel to devolatize more efficiently during gasification process than the fuel without the scoring.

In another aspect, an engineered fuel feed stock having a carbon content of between about 30% and about 80%, a hydrogen content of between about 3% and about 10%, a moisture content of between about 10% and about 30%, an ash content of less than about 10%, a sulfur content of less than 2%, and a chlorine content of less than about 1% is described that is produced by a process comprising:

a) receiving a plurality of MSW waste feeds at a material recovery facility;
b) inventorying the components of the plurality of MSW waste feeds of step a) as they pass through a material recovery facility based on the chemical molecular characteristics of the components;
c) comparing the chemical molecular characteristics of the components of the plurality of MSW waste feeds inventoried in step b) with the chemical molecular characteristics of the engineered fuel feed stock;
d) optionally adding additional engineered fuel feed stock components which contain chemical molecular characteristics, whose sum together with the inventoried components of step b) equal the chemical molecular characteristics of the engineered fuel feed stock. In some embodiments, the feed stock has a HHV of between about 3,000 BTU/lb and about 15,000 BTU/lb. In some embodiments, the feed stock has a volatile matter content of about 40% to about 80%. In some embodiments, the engineered fuel feed stock is reduced in size in order to homogenize the feed stock. In some embodiments, the engineered fuel feed stock is densified. In some embodiments, the densified feed stock is in the form of a briquette. In some embodiments, the densified feed stock is in the form of a pellet. In some embodiments, the densified feed stock is in the form of a cube.

In another aspect, an engineered fuel feed stock is described that is produced by a process comprising:

a) separating a plurality of MSW waste feeds at a material recovery facility into a plurality of MSW waste components based on chemical molecular characteristics;
b) selecting chemical molecular characteristics for the engineered fuel feed stock comprising a carbon content of between about 30% and about 80%, a hydrogen content of between about 3% and about 10%, a moisture content of between about 10% and about 30%, an ash content of less than about 10%, a sulfur content of less than 2%, and a chlorine content of less than about 1% for the engineered fuel feed stock;
c) selecting MSW waste components from step a) whose sum of chemical molecular characteristics equals the chemical molecular characteristics selected in step by;
d) optionally adding other fuel components to the selections of step c) if the chemical molecular characteristics of the MSW waste components selected in step c) do not equal the chemical molecular characteristics of the selection of step b); and
e) mixing the components of step c) and optionally of step d).

In some embodiments, the size of the mixture of step e) is reduced to help homogenize the engineered fuel feed stock. In some embodiments, a size and shape is determined for a densified form of the mixture of step e) or the size-reduced mixture of step e). In some embodiments, the mixture of step e) is densified. In other embodiments, the size-reduced mixture of step e) is densified. In some embodiments, the engineered fuel feed stock has a HHV of between about 3,000 BTU/lb and about 15,000 BTU/lb. In some embodiments, the feed stock has a volatile matter content of about 40% to about 80%.

In another aspect, a method of producing an engineered fuel feed stock from a processed MSW waste stream is described which comprises the steps of:

a) selecting a plurality components from a processed MSW waste stream which components in combination have chemical molecular characteristics comprising a carbon content of between about 30% and about 80%, a hydrogen content of between about 3% and about 10%, a moisture content of between about 10% and about 30%, an ash content of less than 10%, and a sulfur content of less than 2%;

b) combining and mixing together the selected components of step a) to form a feed stock;

c) comparing the resulting chemical molecular characteristics of the feed stock of step b) with the chemical molecular characteristics of step a);

d) optionally adding other fuel components to the selected components of step b) if the chemical molecular characteristics of the MSW waste components selected in step b) do not equal the chemical molecular characteristics of step a).

In some embodiments, the size of the mixture of step b) or step d) is reduced to help homogenize the engineered fuel feed stock. In some embodiments, a size and shape is determined for a densified form of the mixture of step b) or the size-reduced mixtures of steps b) or d). In some embodiments, the mixture of step b) is densified. In other embodiments, the size-reduced mixture of step e) is densified to a density of about 10 lbs/ft$^3$ to about 75 lbs/ft$^3$. In some embodiments, the engineered fuel feed stock has a HHV of between about 3,000 BTU/lb and about 15,000 BTU/lb. In some embodiments, the feed stock has a volatile matter content of about 40% to about 80%.

In another aspect, a method of producing a engineered fuel feed stock is described, the method comprising:

a) receiving a plurality of MSW waste streams;

b) selecting for the engineered fuel feed stock chemical molecular characteristics comprising a carbon content of between about 30% and about 80%, a hydrogen content of between about 3% and about 10%, a moisture content of between about 10% and about 30%, an ash content of less than 10%, and a sulfur content of less than 2%;

c) inventorying the components of the plurality of MSW waste streams based on the chemical molecular characteristics of the components;

d) comparing the chemical molecular characteristics of the inventoried components of the plurality of MSW waste streams of step c) with the selected chemical molecular characteristics of step b); and e) optionally adding additional fuel components with the required chemical molecular characteristics to inventoried components of step c) to meet the desired chemical molecular characteristics of step b) for the engineered fuel feed stock. In some embodiments, the engineered fuel feed stock of steps c) or e) is mixed. In some embodiments, the engineered fuel feed stock of steps c) or e) is reduced in size. In some embodiments, the engineered fuel feed stock of steps c) or e) are densified. In some embodiments, the size-reduced engineered fuel feed stock of steps c) or c) are densified. In some embodiments, the engineered fuel feed stock is densified to about 10 lbs/ft$^3$ to about 75 lbs/ft$^3$.

In some embodiments, the engineered fuel feed stock is densified to form a briquette. In other embodiments, the engineered fuel feed stock is densified to form of a pellet.

BRIEF DESCRIPTION OF THE DRAWINGS

The present invention is illustrated by the embodiments shown in the drawings, in which.

DETAILED DESCRIPTION OF THE INVENTION

Figure 1:
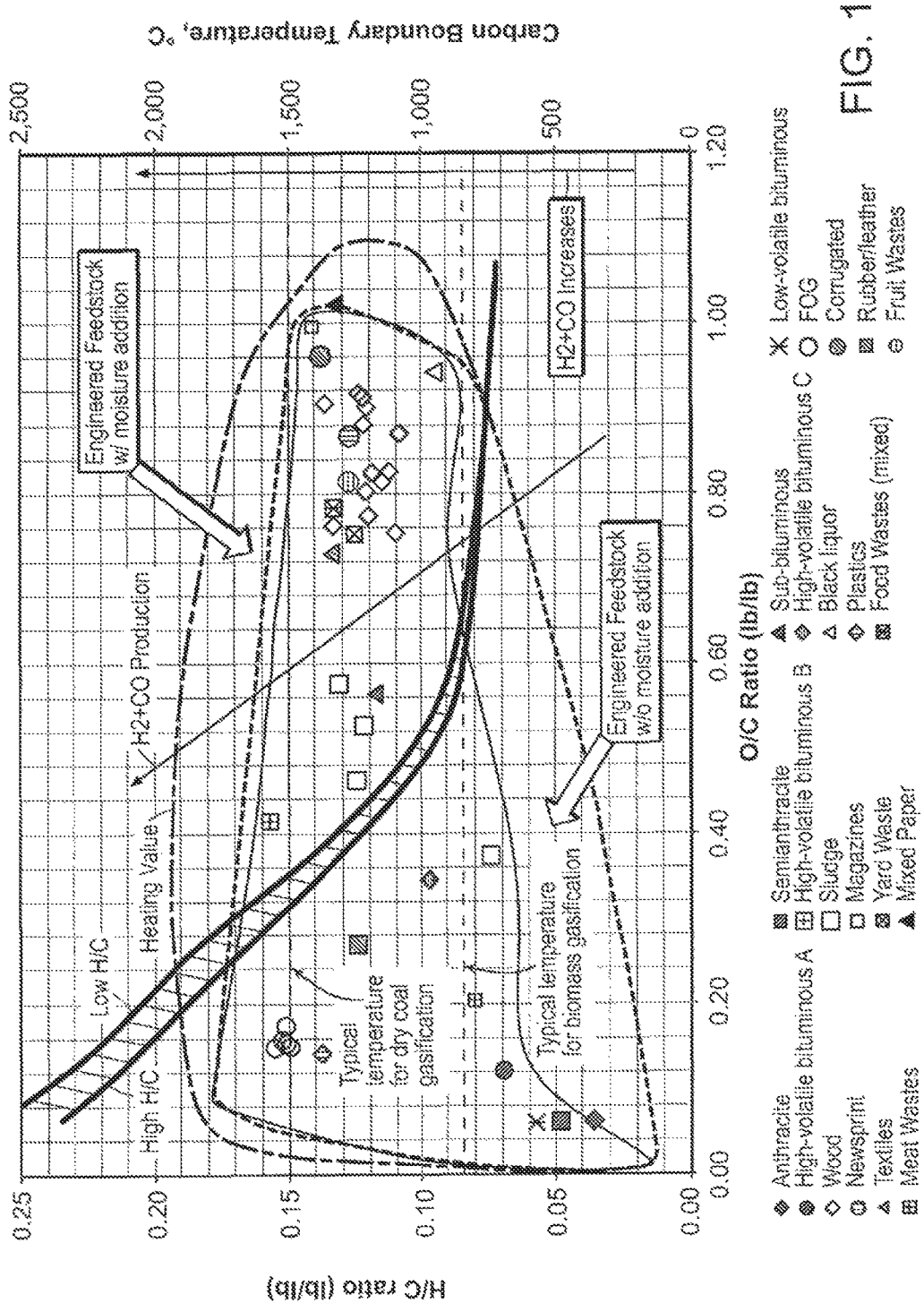
FIG. 1 shows commonly available feed stock materials, such as, for example, coal, FOGs, wood, sludge, black liquor, rubber and MSW streams, positioned in terms of their hydrogen content to carbon content ratio (H/C) (lb/lb) and oxygen content to carbon content (O/C) (lb/lb) ratio.

Novel engineered fuel feed stocks are provided that comprise at least one waste stream component derived from MSW, such as recycling residue which is the non-recoverable portion of recyclable materials, and which are engineered to have predetermined chemical molecular characteristics. These feed stocks can possess the chemical molecular characteristics of biomass fuels such as, for example, wood and switch grass, and, can also have the positive characteristics of high BTU containing fuels such as, for example, coal, without the negative attributes of coal such as deleterious sulfur emissions. Also described are novel engineered fuel feed stocks that comprise chemical molecular characteristics not observed in natural fuels such as, for example, biomass, coal, or petroleum fuels. These novel fuels contain, for example, unique ratios of carbon, hydrogen, sulfur, and ash, such that, when compared to known fuels, they provide a different combustion or gasification profile. Since these novel feed stocks have different combustion or gasification profiles, they provide novel fuels for many different types of combustors and gasifiers which, while functioning adequately due to the uniformity of the natural fuel, do not function optimally due to the less than optimized chemical molecular characteristics of natural fuels. Engineered fuel feed stocks such as those useful for the production of thermal energy, power, biofuels, petroleum, and chemicals can be engineered and synthesized according to the methods disclosed herein.

Highly variable and heterogeneous streams of waste can now be processed in a controlled manner and a plurality of the resulting components therefrom recombined into an engineered fuel feed stock which behaves as a constant and homogeneous fuel for use in subsequent conversion processes. Included among these processes are pyrolysis, gasification and combustion. The engineered fuel feed stock can be used alone to produce thermal energy, power, biofuels, or chemicals, or it can be used as a supplement along with other fuels for these and other purposes. Methods and processes for engineering homogeneous engineered fuel feed stock from naturally heterogeneous and variable waste streams which possess a variety of optimal physical and chemical characteristics for different conversion processes are described, as well as different feed stocks themselves.

Chemical properties can be engineered into the resulting engineered fuel feed stocks based on the type of conversion process for which the fuel will be used. Feed stocks can be engineered for use as fuels including synthetic fuels, high BTU containing fuels (HHV fuels) and fuels useful to produce high quality syngas, among other types of useful fuels. For example, engineered fuels can be designed to have the same or similar chemical molecular compositions as known solid fuels, such as, for example, wood, coal, coke, etc. and function as a substitute for, or supplemental to, fuel for combustion and gasification. Other fuels can be designed and synthesized which have chemical molecular characteristics that are different than naturally occurring fuel. For example, High BTU Fuels can be designed to have the highest possible heat content with a tolerable ash content in order to prevent slagging. These fuels have comparable energy density (such as carbon content, hydrogen content) as coal, but without the problems of slagging, fusion and sulfur pollution (ash content, sulfur content, and chlorine content) and can serve as a substitute for coal, or a supplement to coal. Fuels can be designed to produce high quality syngas by optimizing, for example, the content of C, H, O, moisture, and ash in the engineered fuel feed stock. Such fuels produce high quality syngas in terms of, for example, syngas caloric value, $H_2/CO$ ratios, and amounts of CO, $H_2$, $CO_2$, and $CH_4$. These fuels that produce high quality syngas enable the stable operation of gasifiers due to no, or minimal, slag formation and the lowest tar formation (at the appropriate gasifier temperatures). Thermal conversion devices are described in the art which are designed to suit specific fuels found in the nature and in these cases operational problems often occur or modifications are needed to the devices when fuels other than the designed for fuels are co-fired. The present invention provides for an optimal fuel to be engineered that will best suit known thermal conversion devices and no modifications to the device will be needed.

The engineered fuel feed stock described herein provides an efficient way to moderate the operating conditions of thermal conversion devices such as for example by lower the operating temperature, by reducing the need for oxygen supply or steam supply, by allowing for the relaxing of emission controls. The methods described herein provide a powerful means for upgrading low-grade fuels such as sludge, yardwastes, food wastes and the like to be transformed into a high quality fuel.

The following specification describes the invention in greater detail.

DEFINITIONS

The term "air equivalence ratio" (ER) means the ratio of the amount of air supplied to the gasifier divided by the amount of air required for complete fuel combustion. Air equivalence ratio, "ER," can be represented by the following equation:

$$ER = \frac{\text{Air supplied to the gasifier}}{\text{Air required for complete fuel combustion}}$$

The term "British Thermal Unit" (BTU) means the amount of heat energy needed to raise the temperature of one pound of water by one degree F.

The term "carbon boundary" means the temperature obtained when exactly enough oxygen is added to achieve complete gasification, or carbon conversion. Above this temperature there is no solid carbon present.

The term "carbon content" means all carbon contained in the fixed carbon (see definition below) as well as in all the volatile matters in the feed stock.

The term "carbon conversion" means to convert solid carbon in fuel feed stock into carbon-containing gases, such as CO, CO2 and CH4 in most gasification operations.

The term "commercial waste" means solid waste generated by stores, offices, restaurants, warehouses, and other non-manufacturing, non-processing activities. Commercial waste does not include household, process, industrial or special wastes.

The term "construction and demolition debris" (C&D) means uncontaminated solid waste resulting from the construction, remodeling, repair and demolition of utilities, structures and roads; and uncontaminated solid waste resulting from land clearing. Such waste includes, but is not limited to bricks, concrete and other masonry materials, soil, rock, wood (including painted, treated and coated wood and wood products), land clearing debris, wall coverings, plaster, dry wall, plumbing fixtures, nonasbestos insulation, roofing shingles and other roof coverings, asphaltic pavement, glass, plastics that are not sealed in a manner that conceals other wastes, empty buckets ten gallons or less in size and having no more than one inch of residue remaining on the bottom, electrical wiring and components containing no hazardous liquids, and pipe and metals that are incidental to any of the above. Solid waste that is not C&D debris (even if resulting from the construction, remodeling, repair and demolition of utilities, structures and roads and land clearing) includes, but is not limited to asbestos waste, garbage, corrugated container board, electrical fixtures containing hazardous liquids such as fluorescent light ballasts or transformers, fluorescent lights, carpeting, furniture, appliances, tires, drums, containers greater than ten gallons in size, any containers having more than one inch of residue remaining on the bottom and fuel tanks. Specifically excluded from the definition of construction and demolition debris is solid waste (including what otherwise would be construction and demolition debris) resulting from any processing technique, that renders individual waste components unrecognizable, such as pulverizing or shredding.

The term "devolatization" means a process that removes the volatile material in a engineered fuel feed stock thus increasing the relative amount of carbon in the engineered fuel feed stock.

The term "fixed carbon" is the balance of material after moisture, ash, volatile mater determined by proximate analysis.

The term "garbage" means putrescible solid waste including animal and vegetable waste resulting from the handling, storage, sale, preparation, cooking or serving of foods. Garbage originates primarily in home kitchens, stores, markets, restaurants and other places where food is stored, prepared or served.

The term "gasification" means a technology that uses a noncombustion thermal process to convert solid waste to a clean burning fuel for the purpose of generating for example, electricity, liquid fuels, and diesel distillates. Noncombustion means the use of no air or oxygen or substoichiometric amounts of oxygen in the thermal process.

The term "hazardous waste" means solid waste that exhibits one of the four characteristics of a hazardous waste (reactivity, corrosivity, ignitability, and/or toxicity) or is specifically designated as such by the Environmental Protection Agency (EPA) as specified in 40 CFR part 262.

The term "Heating Value" is defined as the amount of energy released when a fuel is burned completely in a steady-flow process and the products are returned to the state of the reactants. The heating value is dependent on the phase of water in the combustion products. If $H_2O$ is in liquid form, heating value is called HHV (Higher Heating Value). When $H_2O$ is in vapor form, heating value is called LHV (Lower Heating Value).

The term "higher heating value" (HHV) means the caloric value released with complete fuel combustion with product water in liquid state. On a moisture free basis, the HHV of any fuel can be calculated using the following equation:

$$HHV_{Fuel}=146.58C+568.78H+29.4S-6.58A-51.53(O+N).$$

wherein C, H, S, A, O and N are carbon content, hydrogen content, sulfur content, ash content, oxygen content and nitrogen content, respectively, all in weight percentage.

The term "municipal solid waste" (MSW) means solid waste generated at residences, commercial or industrial establishments, and institutions, and includes all processable wastes along with all components of construction and demolition debris that are processable, but excluding hazardous waste, automobile scrap and other motor vehicle waste, infectious waste, asbestos waste, contaminated soil and other absorbent media and ash other than ash from household stoves. Used tires are excluded from the definition of MSW. Components of municipal solid waste include without limitation plastics, fibers, paper, yard waste, rubber, leather, wood, and also recycling residue, a residual component containing the non-recoverable portion of recyclable materials remaining after municipal solid waste has been processed with a plurality of components being sorted from the municipal solid waste.

The term "nonprocessable waste" (also known as noncombustible waste) means waste that does not readily gasify in gasification systems and does not give off any meaningful contribution of carbon or hydrogen into the synthesis gas generated during gasification. Unprocessable wastes include but are not limited to: batteries, such as dry cell batteries, mercury batteries and vehicle batteries; refrigerators; stoves; freezers; washers; dryers; bedsprings; vehicle frame parts; crankcases; transmissions; engines; lawn mowers; snow blowers; bicycles; file cabinets; air conditioners; hot water heaters; water storage tanks; water softeners; furnaces; oil storage tanks; metal furniture; propane tanks; and yard waste.

The term "processed MSW waste stream" means that MSW has been processed at, for example, a materials recovery facility, by having been sorted according to types of MSW components. Types of MSW components include, but are not limited to, plastics, fibers, paper, yard waste, rubber, leather, wood, and also recycling residue, a residual component containing the non-recoverable portion of recyclable materials remaining after municipal solid waste has been processed with a plurality of components being sorted from the municipal solid waste. Processed MSW contains substantially no glass, metals, grit, or non-combustibles. Grit includes dirt, dust, granular wastes such as coffee grounds and sand, and as such the processed MSW contains substantially no coffee grounds.

The term "processable waste" means wastes that readily gasify in gasification systems and give off meaningful contribution of carbon or hydrogen into the synthesis gas generated during gasification. Processable waste includes, but is not limited to, newspaper, junk mail, corrugated cardboard, office paper, magazines, books, paperboard, other paper, rubber, textiles, and leather from residential, commercial, and institutional sources only, wood, food wastes, and other combustible portions of the MSW stream.

The term "pyrolysis" means a process using applied heat in an oxygen-deficient or oxygen-free environment for chemical decomposition of solid waste.

The term "recycling residue" means the residue remaining after a recycling facility has processed its recyclables from incoming waste which no longer contains economic value from a recycling point of view.

The term "sludge" means any solid, semisolid, or liquid generated from a municipal, commercial, or industrial wastewater treatment plant or process, water supply treatment plant, air pollution control facility or any other such waste having similar characteristics and effects.

The term "solid waste" means unwanted or discarded solid material with insufficient liquid content to be free flowing, including but not limited to rubbish, garbage, scrap materials, junk, refuse, inert fill material, and landscape refuse, but does not include hazardous waste, biomedical waste, septic tank sludge, or agricultural wastes, but does not include animal manure and absorbent bedding used for soil enrichment or solid or dissolved materials in industrial discharges. The fact that a solid waste, or constituent of the waste, may have value, be beneficially used, have other use, or be sold or exchanged, does not exclude it from this definition.

The term "steam/carbon ratio" (S/C) means the ratio of total moles of steam injected into the gasifier/combustor divided by the total moles of carbon feed stock. The steam/carbon ratio, "S/C," can be represented by the following equation:

$$S/C = \frac{\text{Total moles of steam}}{\text{Total moles of carbon in feed stock}}$$

The term "thermal efficiency" (also known as cold gas efficiency) means the ratio of the total HHV contained in the resulting product gas divided by the total HHV that was contained in the fuel input. Thermal efficacy, "Eff," can be represented by the following equation;

$$Eff = \frac{\text{Total } HHV \text{ of synthesis gas}}{\text{Total } HHV \text{ of fuel input}} \times 100$$

The term "volatile materials" (also known as volatile organic compounds) means the organic chemical compounds that have high enough vapor pressures under normal conditions to significantly vaporize and enter the atmosphere. Non-limiting examples of volatile materials include aldehydes, ketones, methane, and other light hydrocarbons.

Described herein are novel engineered fuel feed stocks comprising MSW, the feed stocks having any of a number of desired chemical molecular characteristics, including but not limited to carbon content, hydrogen content, oxygen content, nitrogen content, ash content, sulfur content, moisture content, chlorine content, and HHV content. This feed stock is useful for a variety of chemical conversion processes. Also described are processes for producing an engineered fuel feed stock and methods of making same.

One abundant source of engineered fuel feed stock is MSW. MSW is solid waste generated at residences, commercial or industrial establishments, and institutions, and includes all processable wastes along with all components of construction and demolition debris that are processable, but excluding hazardous waste, automobile scrap and other motor vehicle waste, infectious waste, asbestos waste, contaminated soil and other absorbent media and ash other than ash from household stoves. It does include garbage, refuse, and other discarded materials that result from residential, commercial, industrial, and community activities. The composition of MSW varies widely depending on time of collection, season of the year of collection, the types of customers from which the MSW is collected on any given day, etc. MSW may contain a very wide variety of waste or discarded material. For instance, the waste may include biodegradable waste, non-biodegradable waste, ferrous materials, non-ferrous metals, paper or cardboard in a wide variety of forms, a wide range of plastics (some of which may contain traces of toxic metals used as catalysts, stabilizers or other additives), paints, varnishes and solvents, fabrics, wood products, glass, chemicals including medicines, pesticides and the like, solid waste of various types and a wide range of other materials. The waste includes household waste and industrial waste. Industrial waste contemplated for use herein is low in toxic or hazardous materials. However, MSW is processed in order to remove non-processable components prior to engineering the engineered fuel feed stocks described herein.

Processed MSW has been sorted or inventoried according to types of MSW components. Types of MSW components include, but are not limited to, plastics, fibers, paper, yard waste, rubber, leather, wood, and also recycling residue, a residual component containing the non-recoverable portion of recyclable materials remaining after municipal solid waste has been processed with a plurality of components being sorted from the municipal solid waste. Processed MSW contains substantially no glass, metals, grit, or non-combustibles. Grit includes dirt, dust, granular wastes such as coffee grounds and sand, and as such the processed MSW contains substantially no coffee grounds. The term "substantially no" as used herein means that no more than 0.01% of the material is present in the MSW components.

Another fuel source for use in an engineered fuel feed stock is FOGs. FOGs are commonly found in such things as meats, sauces, gravy, dressings, deep-fried foods, baked goods, cheeses, butter and the like. Many different businesses generate FOG wastes by processing or serving food, including; eating and drinking establishments, caterers, hospitals, nursing homes, day care centers, schools and grocery stores. FOGs have been a major problem for municipalities. Studies have concluded that FOGs are one of the primary causes of sanitary sewer blockages which result in sanitary sewer system overflows (SSOs) from sewer collection systems. These SSOs have caused numerous problems in some municipalities including overflow out of the sewage lines out of maintenance (manhole) holes and into storm drains. The water in storm drains flows into the water ways and eventually into the ocean. SSOs pose a threat to public health, adversely affect aquatic life, and are expensive to clean up. The most prevalent cause of the SSOs is FOG accumulation in the small to medium sewer lines serving food service establishments. Thus a use as fuel would provide a means of disposal of FOGs without the prevalence of SSOs occurring due to the discharge of FOGs into the waste water.

Present methods of discarding FOGs, besides directly into the sewer systems, include landfills. While these types of wastes are generally considered nuisances, they contain a high carbon content that can be transformed into a source of fuel.

Other types of oils and greases useful in the present invention are petroleum waste products. Nonliming examples of petroleum waste products include discarded engine oil.

Yet another type of waste useful in the production of engineered fuel feed stock is biomass waste, also known as biogenic waste. Biomass refers to living and recently dead biological material that can be used as fuel or for industrial production. Most commonly, biomass refers to plant matter grown for use as biofuel, but it also includes plant or animal matter used for production of fibers, chemicals or heat. Biomass may also include biodegradable wastes that can be burnt as fuel. It excludes organic material which has been transformed by geological processes into substances such as coal or petroleum. Nonlimiting types of biomass waste include woods, yard wastes, plants, including miscanthus, switchgrass, hemp, corn, poplar, willow, sugarcane and oil palm (palm oil), coconut shells, and shells of nuts.

Yet another type of waste useful in the production of engineered fuel feed stock is sludge. Sludge is a mixture of solid wastes and bacteria removed from the wastewater at various stages of the treatment process. It can be categorized as "primary sludge" and "secondary sludge". Primary sludge is about 4% solids and 96% water. It consists of the material which settles out of wastewater in the primary sedimentation tanks, before bacterial digestion takes place. Secondary or activated sludge is much more liquid—about 1% solids and 99% water. Secondary sludge consists of bacteria and organic materials on which the bacteria feed. About 30% of the secondary sludge produced is returned to the aeration tanks to assist with the biological process of sewage treatment. The remaining 70% must be disposed of.

The sludge contemplated for use in the present invention is municipal sludge a.k.a. biosolids. Municipal sludge does not include papermill or other industrial/agricultural sludge. The key determinants of the caloric or BTU value of a sludge are its dryness expressed as Total Solids on a wet weight basis (or inversely as water content) and its volatile solids content (Total Volatile Solids or TVS expressed on a dry weight basis). There are two distinct types of sludge—1) raw sludge (sludge treated only with primary and secondary aerobic clarifiers) and 2) digested sludge (add anaerobic digestion to number 1). Anaerobic sludge is typically 60%

TVS and raw sludge is typically 75-80% TVS. The TS of sludge cake (dewatered sludge) varies depending on the method used by the treatment plant to dewater the sludge, and ranges from 10% to 97+%. One pound of Volatile Solids has about 10,000-12,000 BTU, e.g., it requires 1,200 BTU to drive off 1 lb of water as steam.

Other types of materials useful in the production of engineered feed stocks described herein are animal wastes such as manures, animal biomass (meat and bone tissue), poultry litter, fossil fuels such as coal, coal by products, petroleum coke, black liquor, and carbon black.

Chemical compositions of fuel are known to affect reactor performance, whether for combustion or gasification, and therefore the production of, and quality of, syngas. Most gasifiers are constructed so as to be able to efficiently burn one type of fuel—a homogeneous fuel, such as wood pellets or coal, for example. Although the natural fuels such as wood or coal are homogeneous and provide the reactor with a constant supply of predictable fuel, these fuels do not allow the reactors to function optimally due to their suboptimal chemical molecular characteristics.

Furthermore, syngas, which results from the gasification process, can be used to produce, for example, diesel distillates and liquid fuels. Syngas useful in the production of such products should contain at least a certain amount energy expressed usually in BTU/ft$^3$ in order to be used efficiently in liquid fuel production, while other syngas requirements for this process may also include an appropriate ratio of hydrogen to carbon monoxide ($H_2$/CO), as well as syngas purity.

Engineered fuel feed stock is described herein which comprises at least one component derived from a processed MSW waste stream and embodies predetermined chemical molecular characteristics that cause the fuel to perform optimally for a particular thermal conversion process. By selecting waste components from MSW so as to remove contaminating wastes that do not contribute to the gasification processor create hazardous emissions (such as dioxins, mercury, sulfur and chlorine, etc.), and optionally adding other materials that enhance the gasification or combustion process, material useful for production of engineered fuel feed stock with the appropriate chemical molecular characteristics is achieved.

FIG. 1 shows commonly available feed stock materials, such as, for example, coal, FOGs, wood, sludge, black liquor, rubber and MSW streams, positioned in terms of their hydrogen content to carbon content ratio (H/C) (lb/lb) and oxygen content to carbon content (O/C) (lb/lb) ratio. When these natural feed stocks are surrounded on the graph by a solid line, an envelope is formed, which indicates the range of H/C and O/C for naturally occurring materials. FIG. 1 also plotted the carbon boundary temperature against the O/C ratio, with variations with H/C indicated by a slashed area. The carbon boundary temperature is the temperature obtained when exactly enough oxygen is added to achieve complete carbon conversion. For biomass gasification the typical temperature is about 850° C. and for dry coal gasification the typical temperature is about 1,500° C. Fuels such as anthracite, semianthracite, high- and low-volatile bituminous all have low H/C ratios from about 0.03 to 0.07 and low O/C content ratios from about 0.05 to about 0.12. These fuels require high temperatures due to the low O/C ratio and normally require steam injection to promote complete conversion of the carbon during gasification. Other feed stocks such as various woods, magazines, mixed paper, and corrugated cardboard all have relatively high H/C content ratios of about 0.1 to about 0.14 and O/C content ratios of about 0.8 to about 1.0, which in practice require low gasification temperatures. For feed stocks to be fully gasified at about 850° C., it is seen from FIG. 1 that the O/C ratio in feed stock should be about 0.55 to 0.6. For woody biomass feed stocks which have a O/C ratio of about 0.75 to 0.90, over-oxidizing (or increased oxidation) may occur at this temperature, and thus a higher $CO_2$ in the syngas would be expected. Therefore, it is an advantage of the engineered feedstock that fuel O/C and H/C ratios can be adjusted to allow for optimal gasification operation and performance to be achieved.

In FIG. 1, it can also be observed that $H_2$/CO production will vary according to H/C content, but only slightly with increasing O/C content. Also, FIG. 1 shows that Heating Value and $H_2$+CO production rate both increase with increasing H/C ratios and with decreasing O/C ratios.

Figure 2:
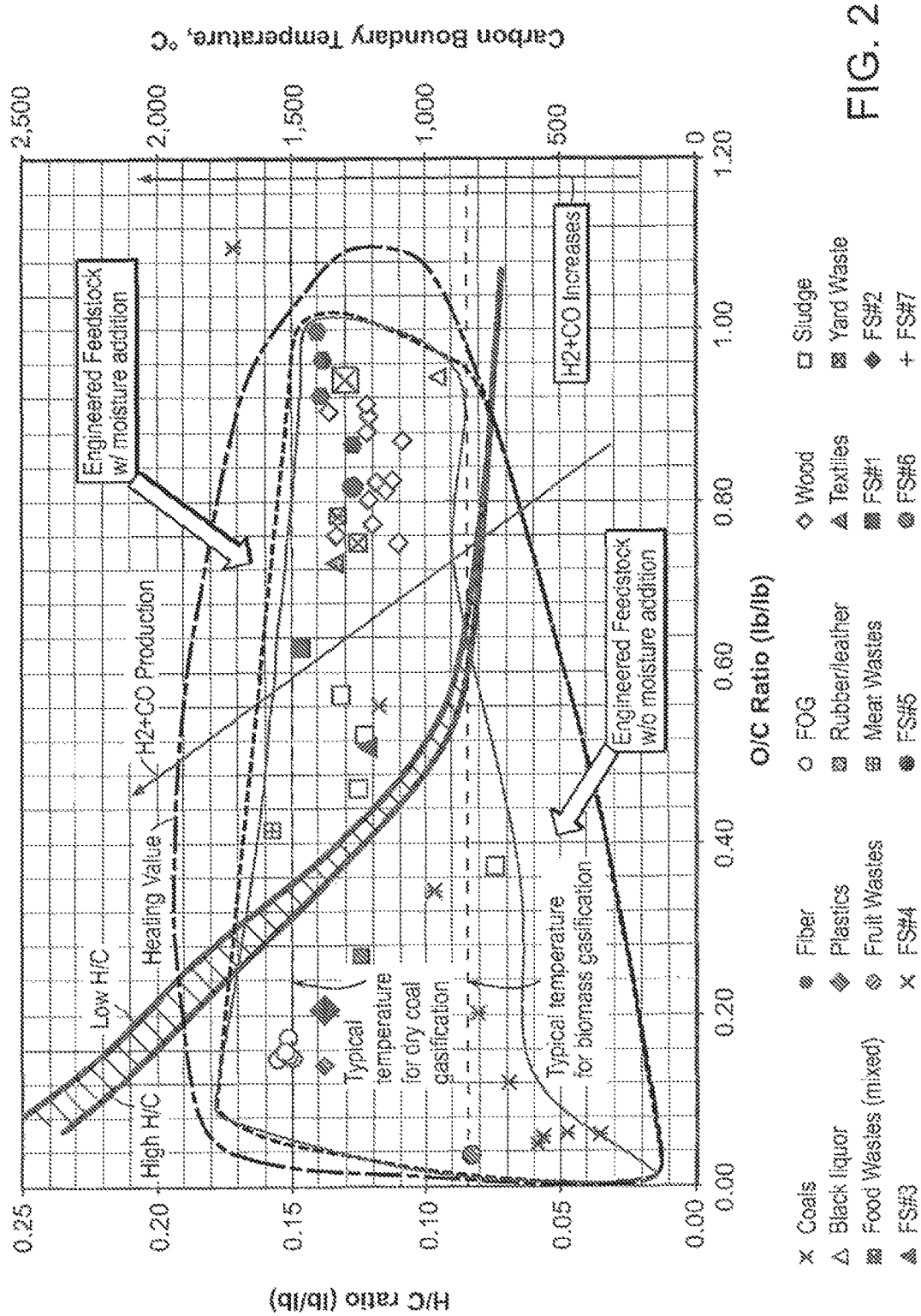
FIG. 2 shows some novel engineered fuel feed stocks produced by selecting known engineered fuel feed stocks within the dotted line and directly mixing the selected feed stocks, and in some cases increasing or decreasing the moisture content.

By judiciously selecting engineered fuel feed stocks based on, for example, their H/C ratio, O/C ratio, ash content and moisture content, the present inventors have discovered novel engineered fuel feed stocks that can both simulate naturally occurring fuels, such as for example wood and coal, as well as populate the carbon boundary with heretofore unknown novel engineered fuel feed stocks that have different gasification profiles as compared to known engineered fuel feed stocks. FIG. 2 shows some novel engineered fuel feed stocks produced by selecting known engineered fuel feed stocks within the dotted line and directly mixing the selected feed stocks, and in some cases increasing or decreasing the moisture content. These novel feed stocks populate areas within the solid lined area within the carbon temperature boundary. Engineered fuel feed stock can be designed by selecting types of feed stock characteristics identified within the carbon boundary of the graph based on, for example, $H_2$/CO content in the product syngas, $H_2$+CO production rate and Heating Value of the syngas, which would indicate the H/C ratio and O/C ratio required for a particular engineered fuel that should be best suited for a particular application. For various applications, such as, for example, gasification for energy production, gasification for Fischer-Tropsch fuel production, pyrolysis, and combustion different HHV contents, CO+H2 production rates or $H_2$/CO ratios may be required.

Chemical Properties of Fuel that Affect Gasification and Combustion of the Fuel

The combustion and gasification processes use fuel containing sufficient energy that upon firing the fuel releases the stored chemical energy. This energy stored in the fuel can be expressed in terms of percent carbon, hydrogen, oxygen, along with the effects of other components such as sulfur, chlorine, nitrogen, and of course moisture in the form of $H_2O$.

As a possible fuel source, MSW can be characterized by its chemical molecular make up, such as, for example, the amount of carbon, hydrogen, oxygen, and ash present. However, MSW normally consists of a variety of components that can individually or collectively be characterized themselves for fuel purposes by a variety of parameters including, without limitation, carbon content, hydrogen content, moisture content, ash content, sulfur content, chlorine content, and HHV content. Although heterogeneic in nature, the many components of MSW can serve as raw materials for engineering various engineered fuel feed stocks useful for a variety of different thermal conversion processes. Such materials can be engineered to create engineered fuel feed stocks that embody the chemical characteristics of known fuels, for example, wood and coal, while other feed stocks can be engineered to create fuels that are not observed in nature and provide unique combustion and gasification profiles. For example, the carbon and hydrogen content of most biomasses such as wood is given in Table 1. From Table 1 it can be readily observed that the range of carbon in biomass such as wood varies only slightly, as does the hydrogen content.

TABLE 1

| Name WOOD | C % | H % | O % | N % | S % | Ash % | Volatiles % | HHV BTU/lb |
|---|---|---|---|---|---|---|---|---|
| Beech | 51.64 | 6.26 | 41.45 | 0.00 | 0.00 | 0.65 | — | 8,762 |
| Black Locust | 50.73 | 5.71 | 41.93 | 0.57 | 0.01 | 0.80 | 80.94 | 8,474 |
| Douglas Fir | 52.30 | 6.30 | 40.50 | 0.10 | 0.00 | 0.80 | 81.50 | 9,050 |
| Hickory | 47.67 | 6.49 | 43.11 | 0.00 | 0.00 | 0.73 | — | 8,672 |
| Maple | 50.64 | 6.02 | 41.74 | 0.25 | 0.00 | 1.35 | — | 8,581 |
| Ponderosa Pine | 49.25 | 5.99 | 44.36 | 0.06 | 0.03 | 0.29 | 82.54 | 8,607 |
| Poplar | 51.64 | 6.26 | 41.45 | 0.00 | 0.00 | 0.65 | — | 8,921 |
| Red Alder | 49.55 | 6.06 | 43.78 | 0.13 | 0.07 | 0.40 | 87.10 | 8,298 |
| Redwood | 53.50 | 5.90 | 40.30 | 0.10 | 0.00 | 0.40 | 83.50 | 9,041 |
| Western Hemlock | 50.40 | 5.80 | 41.10 | 0.10 | 0.10 | 2.20 | 84.80 | 8,620 |
| Yellow Pine | 52.60 | 7.00 | 40.10 | 0.00 | 0.00 | 1.31 | — | 9,587 |
| White Fir | 49.00 | 5.98 | 44.75 | 0.05 | 0.01 | 0.25 | 83.17 | 8,577 |
| White Oak | 49.48 | 5.38 | 43.13 | 0.35 | 0.01 | 1.52 | 81.28 | 8,349 |
| Madrone | 48.94 | 6.03 | 44.75 | 0.05 | 0.02 | 0.20 | 87.80 | 8,388 |

Likewise the carbon content of most coats does not vary widely as seen in Table 2, and most examples of coat have similar if not identical carbon and hydrogen content.

TABLE 2

| Name | C | H | O | S | Volatiles | Heat content BTU/lb |
|---|---|---|---|---|---|---|
| Lignite[1] | 60-75 | 6.0-5.8 | 34-17 | 0.5-3 | 45-65 | <12,240 |
| Flame coal | 75-82 | 6.0-5.8 | >9.8 | ~1 | 40-45 | <14,130 |
| Gas flame coal | 82-85 | 5.8-5.6 | 9.8-7.3 | ~1 | 35-40 | <14,580 |
| Gas coal | 85-87.5 | 5.6-5.0 | 7.3-4.5 | ~1 | 28-35 | <15,030 |
| Fat coal | 87.5-89.5 | 5.0-4.5 | 4.5-3.2 | ~1 | 19-28 | <15,210 |
| Forge coal | 89.5-90.5 | 4.5-4.0 | 3.2-2.8 | ~1 | 14-19 | <15,210 |
| Non baking coal | 90.5-91.5 | 4.0-3.7 | 2.8-3.5 | ~1 | 10-14 | <15,210 |
| Anthracite | >91.5 | <3.75 | <2.5 | ~1 | 7-12 | <15,210 |

[1]Lindner, E., Chemie für Ingenieure, Lindner Verlag Karlsruhe, (2007) p. 258.

When used us a fuel source, for example, in gasification, the carbon and hydrogen content have a significant effect on the chemical characteristics of the syngas. Thus, because the carbon and hydrogen content of, for example, wood does not vary greatly, the process of gasification must be varied so that the chemical characteristics of the syngas can be varied. In contrast, the present invention allows engineered fuel feed stocks to be engineered that not only contain the carbon content of wood or coal, but also amounts of carbon and hydrogen not contained in biomasses such as wood or in fuels such as coal, thereby providing new fuels for gasification and combustion reactions. Thus, the present invention provides for engineered fuel feed stocks to be engineered to contain a variety of carbon and hydrogen amounts beyond what is contained in naturally occurring fuels.

Effect of Feed Stock Moisture on Gasification and Combustion

Combustion Applications

It is generally true that as moisture content increases in feed stock, the efficiency of the combustor or burner is reduced since some part of the heat released from feed stock will be consumed by evaporating the water. However, in order to understand the impact of feed stock moisture on the efficiency of the combustion, an overall systems perspective must be developed.

Figure 3:
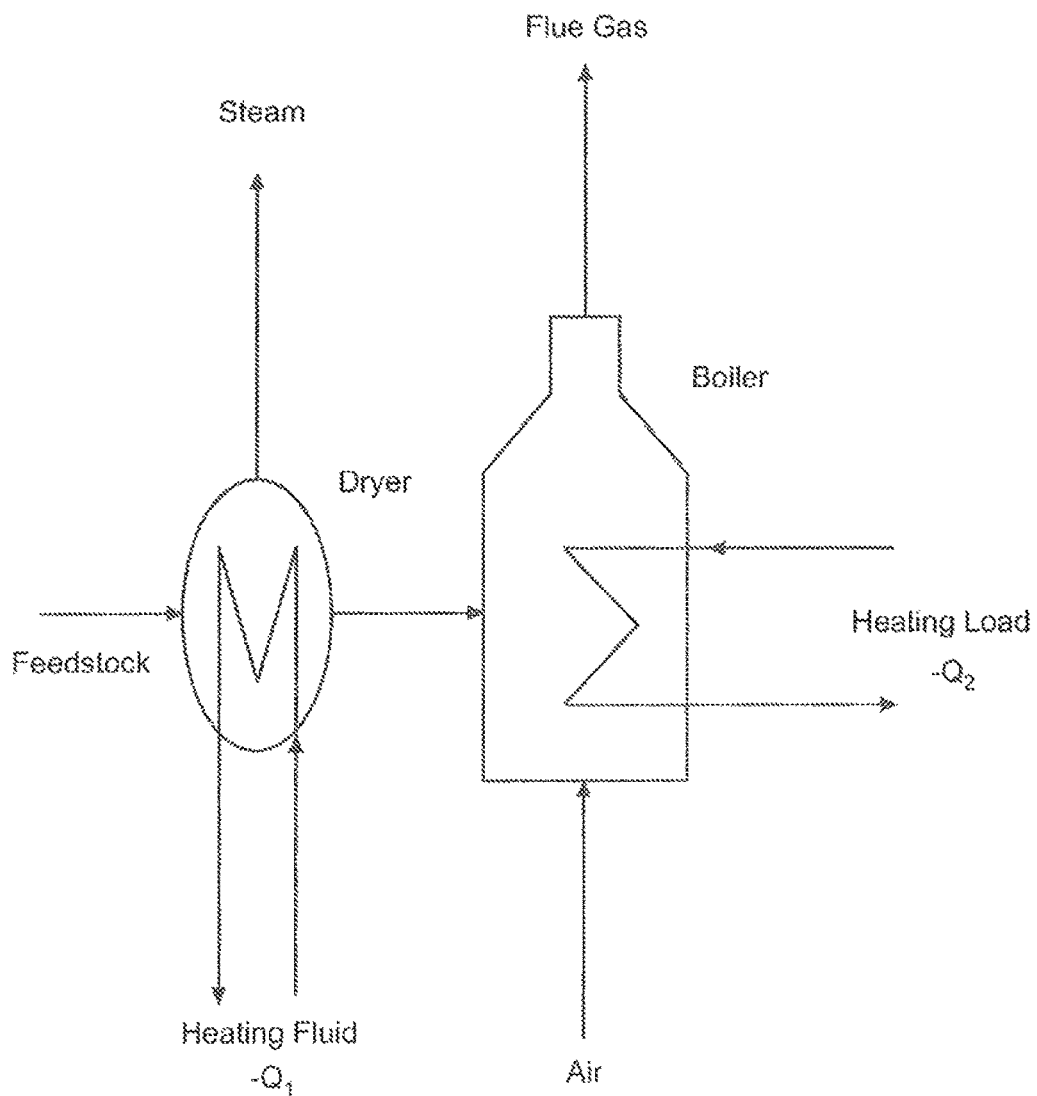
FIG. 3 shows a schematic with direct combustion of feed stock.

The prior art has understood that moisture should, if not, must be reduced to low levels, such as below 10%, in order to have fuels that will allow for efficient firing of combustion reactors (see for example U.S. Pat. No. 7,252,691). However, consider a process (FIG. 3) in which the wet fuel is first dried using an energy stream $Q_1$, which is generally equal to the heat needed for vaporization of the water in the fuel and a sensible heat change resulting from the difference between the feed stock inlet and outlet temperatures, in addition to heat losses from the dryer. After drying, the water vapor is vented and the feed stock with reduced moisture content is sent to the combustor or boiler, where a heating load $Q_2$ is applied. The total net available energy is then $Q_{net}=Q_2-Q_1$, which represents the effect of the additional energy needed from the entire system for reducing the moisture content of the fuel.

Figure 4:
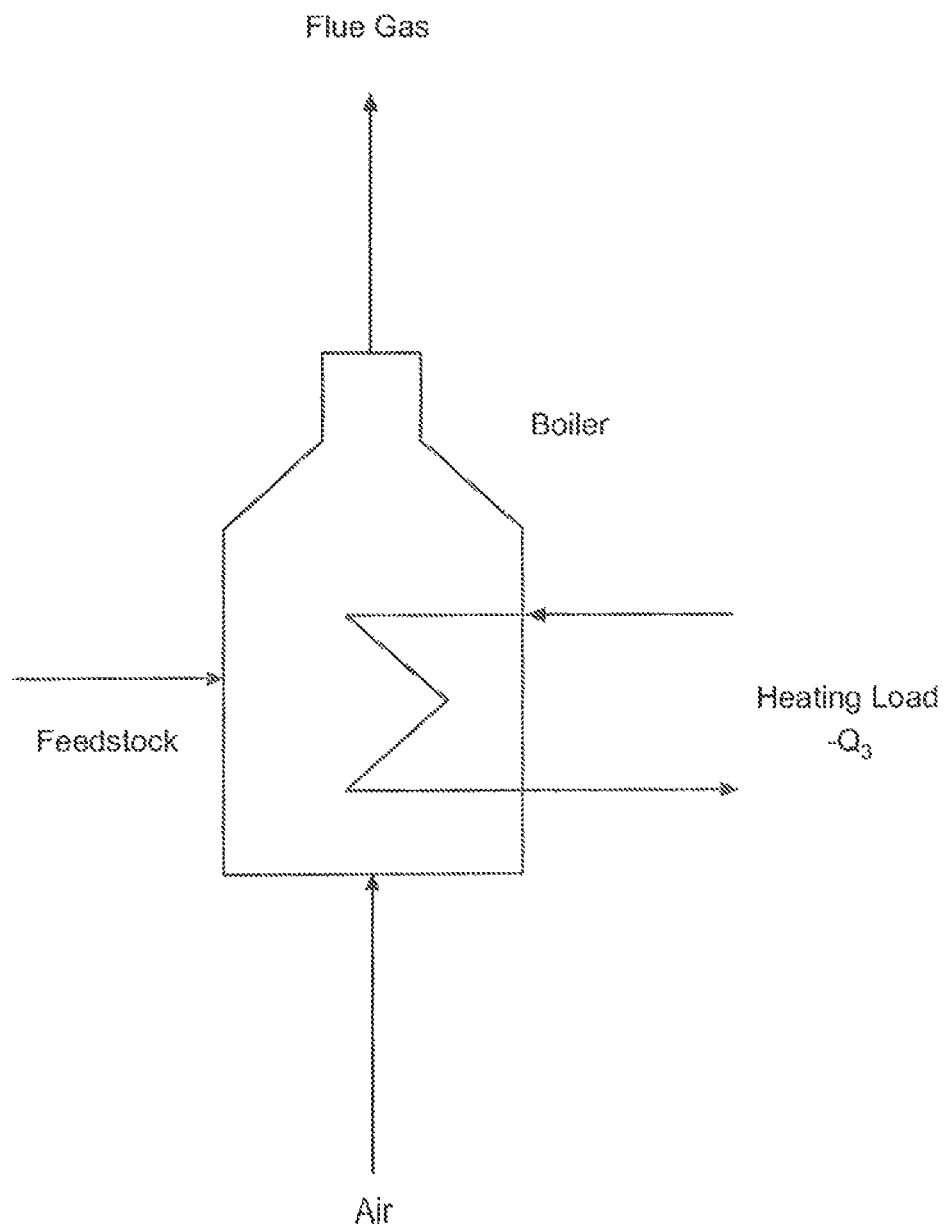
FIG. 4 shows a schematic with direct combustion of wet feed stock, without reducing its moisture content.

By comparison, FIG. 4 shows a schematic with direct combustion of wet feed stock, without reducing its moisture content. The available heat utilization is $Q_3$. In order to understand the impact of moisture on the engineered fuel feed stock a simulation using HYSYS (AspenTech, Inc., Burlington, Mass.) was performed under the following parameters. Feed stock with a moisture content of either 30 wt % or 40 wt %, was dried at a rate of one tone per hour to a moisture content of 10 wt %, i.e. 445 lbs/hr or 667 lbs/hr of water removed (vaporized by heating to about 250° F. This requires an input of energy of approximately 0.64 mmBTU/hr or 0.873 mmBTU/hr, respectively. The feed stock at a moisture content of 10 wt % is then combusted in a boiler assuming the heating load is adjusted to control the flue gas temperature to a predetermined temperature. Depending on the boiler or heat exchanger design, this predetermined temperature could be higher (non-condensation, 150° F.) or lower (condensation, 100° F.) than the temperature of water in flue gas. The results are tabulated below in Table 3 and Table 4:

TABLE 3

| | Process with feed stock drying | Process w/o feed stock drying |
|---|---|---|
| Initial feed stock moisture (wt %) | 30 | 30 |
| Final feed stock moisture | 10 | 30 |
| Water vapor removed (lb/h) | 445 | 0 |
| Heat required for drying (mmBTU/h) | 0.640 | 0 |
| Heat utilization from boiler (mmBTU/h) | 9.571 (non-condensation) 9.949 (condensation) | 8.972 (non-condensation) 9.825 (condensation) |
| Net heat utilization (mmBTU/h) | 8.931(non-condensation) 9.309 (condensation) | 8.972 (non-condensation) 9.825 (non-condensation) |
| Heat utilization efficiency (%) | 71.3 (non-condensation) 74.3 (condensation) | 71.6 (non-condensation) 78.4 (condensation) |
| Flue gas mass flow rate (lb/h) | 12,642 | 13,087 |
| Adiabatic flame temperature (° F.) | 2,725 | 2,445 |
| Thermal equilibrium CO production (ppm) | 71 | 11 |
| Thermal equilibrium $NO_x$ production (ppm) | 2,311 | 1,212 |
| Vapor content in flue gas (%) | 8.9 | 13.8 |
| $CO_2$ in flue gas (%) | 13.7 | 13.0 |

Assumptions:
(1): the feed stock is assumed to have properties similar to wood
(2): the combustion air is adjusted to have 8% $O_2$ in flue gas.

TABLE 4

| | Process with feed stock drying | Process w/o feed stock drying |
|---|---|---|
| Initial feed stock moisture (wt %) | 40 | 40 |
| Final feed stock moisture | 10 | 40 |
| Water vapor removed (lb/h) | 667 | 0 |
| Heat required for drying (mmBTU/h) | 0.873 | 0 |
| Heat utilization from boiler (mmBTU/h) | 8.203 (non-condensation) 8.527 (condensation) | 7.385 (non-condensation) 8.420 (condensation) |
| Net heat utilization (mmBTU/h) | 7.330 (non-condensation) 7.654 (condensation) | 7.385 (non-condensation) 8.420 (condensation) |
| Heat utilization efficiency (%) | 66.5 (non-condensation) 69.5 (condensation) | 67.0 (non-condensation) 76.4 (condensation) |
| Flue gas mass flow rate (lb/h) | 10,842 | 11,509 |
| Adiabatic flame temperature (° F.) | 2,723 | 2,273 |
| Thermal equilibrium CO production (ppm) | 71 | 2.9 |
| Thermal equilibrium NOx production (ppm) | 2,306 | 764 |
| Vapor content in flue gas (%) | 8.9 | 17.3 |
| CO2 in flue gas (%) | 13.7 | 12.5 |

Assumptions:
(1): the feed stock is assumed to have properties similar to wood
(2): the combustion air is adjusted to have 8% $O_2$ in flue gas.

The data in Tables 3 and 4 show the following.
(1) Without feed stock drying, the process generally provides better overall heat utilization. When heat losses from dryer and combustor are considered, the process without feed stock drying will be even better, because a larger heat loss would be expected when employing the dryer and combustor, since separate units will be in use, that together will have a larger heat loss due to the increased surface area as compared to just the combustor.
(2) With a higher water vapor presence in flue gas, the connective heat transfer can be improved due to increased mass flow rate of the convective gas (flue gas), which improves the heat utilization.
(3) With a higher water vapor and lower $CO_2$ concentration, the radiation heat transfer between flue gas and heat transfer surface may also be increased due to increased emissivity.
(4) Due to high water content in feed stock in case of without drying, the flame temperature is low compared to the case w/ drying. As a result, the CO and NOx productions may be greatly reduced if the wet feed stock is directly combusted.
(5) When a feed stock dryer is utilized, the overall capital and operating costs are increased.

Thus, the effect of moisture on combustion processes must be evaluated in the overall system approach. Drying a feed stock prior to combustion does not necessarily result in savings or improvements in overall usable energy, or increasing the overall energy utilization efficiency. In addition, adding the extra step of reducing the moisture content of fuel also adds extra capital costs and operation and management costs. Burning a dry feed stock increases the potentials of air pollutant productions including CO and NOx. This is consistent with the common counter measure seen in the industry whereby water is sprayed into the burner to lower the flame temperature so as to reduce slagging (formation of ash) and the negative effects of, among other things, the production of CO and NOx.

Conversely, if the moisture content in the fuel is too high (e.g. greater than about 50 wt %), the difficulty in maintaining stable combustion significantly increases. Therefore, a moisture content of about 10 wt % to about 40 wt % has been found to be optimal for balancing efficiency and reactor operation.

Gasification Applications

Moisture can effect gasification in a variety of ways. For example, if moisture is removed from the feed stock prior to being gasified, gasification performance may, or may not, be improved, depending upon which parameter of gasification is observed. In terms of energy utilization efficiency, drying may not improve the overall efficiency of gasification, unlike the effect of drying the feed stock upon combustion applications as discussed above.

Depending upon the gasification application, oxidants such as air, pure oxygen or steam can be used. In the case of oxygen large scale coal gasification which operates at temperatures of typically 1500° C., the oxygen consumption is high, which makes slagging and melting of ash an operational challenge. The challenge in this case is operating the gasification with a minimum amount of gasifying feed stock required because this reduces the amount of oxygen per unit product gas. This reduction is oxygen translates into a larger savings during the gasification. However, with the reduction in oxygen as the oxidant, more steam is then necessary. Since more moisture is necessary, it can either be introduced into the gasification unit or as in the present invention the necessary moisture is present in the feed stock. This increase in moisture in the feed stock, both reduces the amount of oxygen needed during gasification as well as allows more control of the gasification temperature, which increases carbon conversion, and thus improves the overall gasification performance.

Furthermore, the thermodynamics and kinetics of the gasification reaction are effected by the amount of moisture during the gasification reaction. Two reactions that occur during the gasification reaction are given below:

$$C + \tfrac{1}{2}O_2 = CO \qquad (a):$$

$$C + H_2O = CO \pm H_2 \qquad (b):$$

Though the thermodynamics and kinetics dictate that most of the gasification will be accomplished via reaction (a), the reaction given in (b) allows every carbon that is gasified via steam yields two molecules of synthesis gas per atom of carbon with steam, which is less extensive in comparison with only one carbon in reaction (a) via oxygen, which is much more expensive. To force reaction (b) to predominate during gasification the presence of sufficient moisture is important.

It is obvious that a process that produces a syngas containing a relatively high methane content and therefore a high cold gas efficiency will be useful in a power application. However, such a syngas composition may not be the optimum choice for a different syngas application in which syngas requires an optimum $H_2/CO$ yield. By varying the moisture content in feed stock the syngas production rate and composition can be enhanced in order to favor or disfavor one particular application. The effect of moisture can have on gasifier performance and syngas properties also varies according to the characteristics of the feed stock. For example, the chemically bonded moisture and carbon content are two parameters that can influence of moisture on the feed stock during gasification. For a high carbon content fuel, such as dry coal, in which chemically bonded moisture is low, increasing the moisture content improves syngas production rate by stimulating reaction (b) above, and improves syngas heating value. In contrast, for feed stock having high chemically bonded moisture, such as wood, further increasing the moisture content results in a lower gasification efficiency, although it increases the hydrogen production and thus $H_2/CO$ ratio, by promoting the water-gas shift reaction (reaction (b) above). At lower gasification temperatures the moisture content may also increase methane production which results in a syngas suitable for power generation applications. In the presence of moisture at high gasification temperatures, methane production will be reduced.

Figure 5:
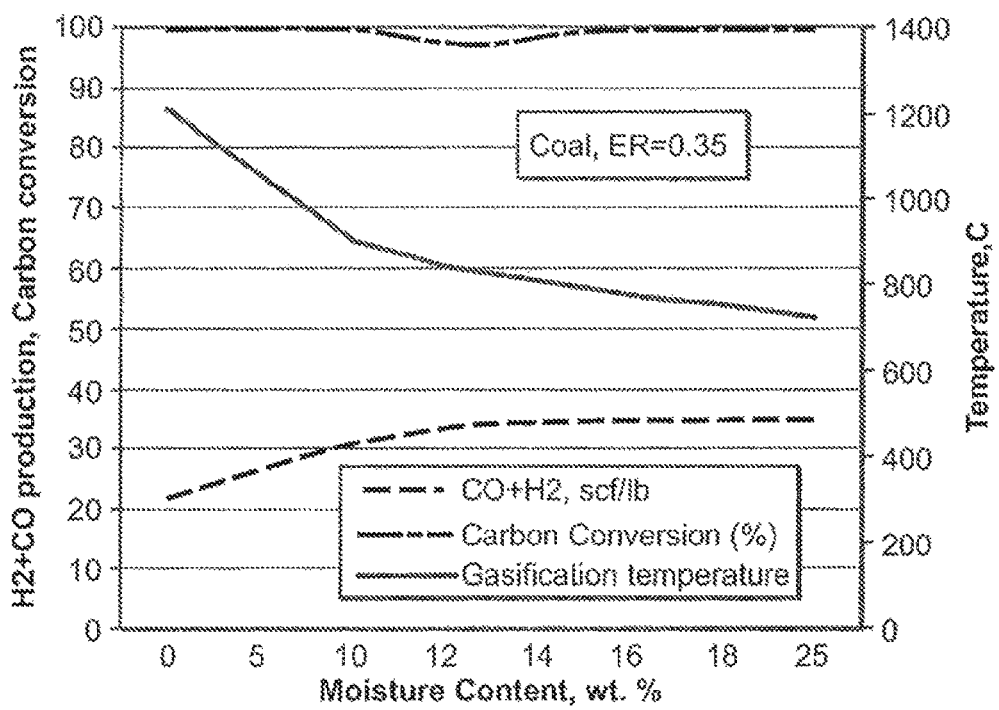
FIG. 5 shows the predicted effect of moisture on gasification temperature, carbon conversion and $H_2$+CO production rate for a typical coal feed stock at a constant air equivalence (ER) ratio (ER=0.34).

Thus, the appropriate moisture content in gasification feed stock, like steam injection into gasifiers, is a useful and economic gasification moderator, which can achieve at least one of the following;

(a) controlling the gasifier temperature:

FIG. 5 shows the predicted effect of moisture on gasification temperature, carbon conversion and $H_2$+CO production rate for a typical coal feed stock at a constant air equivalence (ER) ratio (ER=0.34). Higher moisture containing feed stock, when gasified, can lower the gasification temperature which allows higher ash content feed stocks to be gasified. Operation of the gasifier at tower temperatures is preferred for such engineered fuel feed stocks due to their propensity for slagging or ash fusion. Presence of moisture in feed stock also increases the conversion of carbon, making tow temperature operation of the gasification possible while still being capable of reducing the potential risk of ash slagging, fusion.

Figure 6:
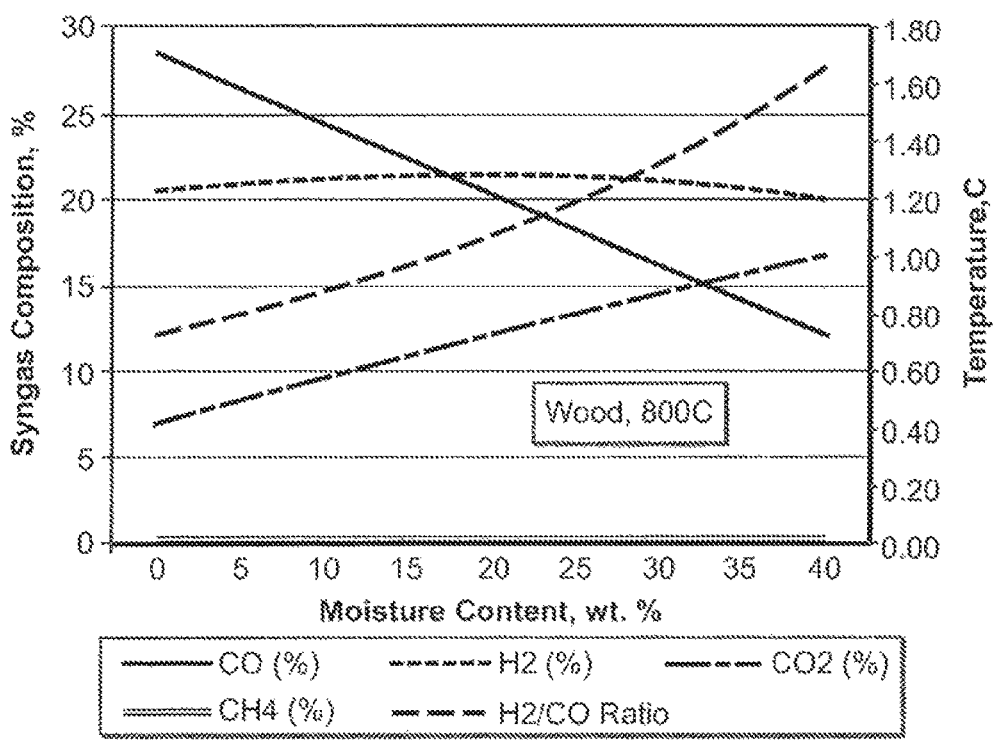
FIG. 6 shows the predicted variation of syngas compositions with feed stocks of different moisture contents for a typical wood feed stock at 800° C.

(b) alternating the syngas production:

As steam injection is often needed to control the gasification temperature, and condition the syngas compositions, particularly methane production and $H_2/CO$ ratio to suit for particular syngas applications (for power generation or chemical synthesis). FIG. 6 shows the predicted variation of syngas compositions with feed stocks of different moisture contents for a typical wood feed stock at 800° C.

Figure 7:
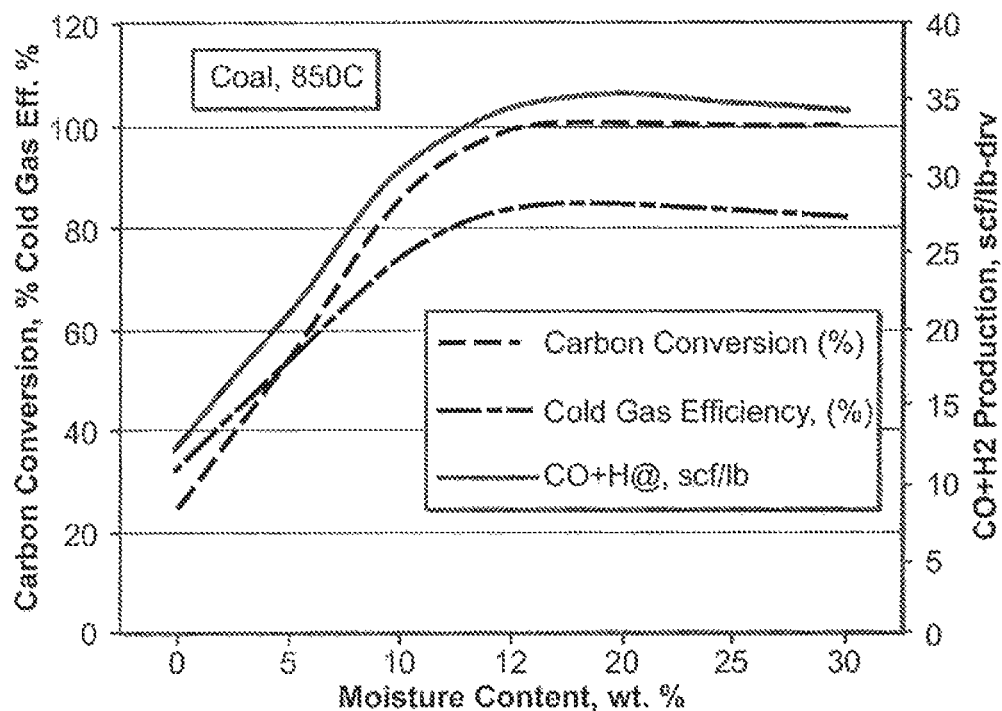
FIG. 7 shows the predicted effect of fuel moisture content on carbon conversion, cold gas efficiency and CO+$H_2$ production rate for a typical coal feed stock at 850° C.
Figure 8:
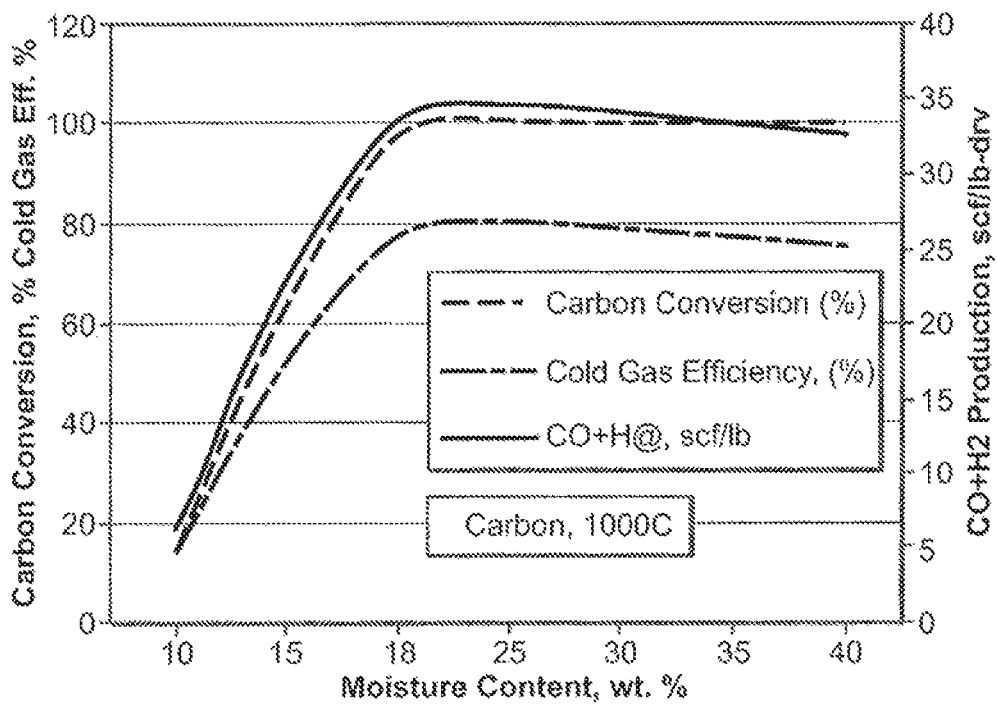
FIG. 8 shows the predicted effect of fuel moisture content on carbon conversion, cold gas efficiency and CO+$H_2$ production rate for pure carbon at 1000° C.

(c) increasing carbon conversion:

Due to promotion of the water-gas shift reaction (CO+$H_2O$=$CO_2$+$H_2$), higher or complete carbon conversion can be achieved at reduced gasification temperatures. This not only allows the lower temperature operation, but also improves the CO+$H_2$ production rate, and gasification efficiency. However, when the moisture is too high, the CO+$H_2$ production rate and cold gas efficiency may decline because of increased combustion (to provide heat necessary for attaining the same gasification temperature). FIG. 7 shows the predicted effect of fuel moisture content on carbon conversion, cold gas efficiency and CO+$H_2$ production rate for a typical coal feed stock at 850° C. FIG. 8 shows the predicted effect of fuel moisture content on carbon conversion, cold gas efficiency and CO+$H_2$ production rate for pure carbon at 1000° C.

Figure 9:
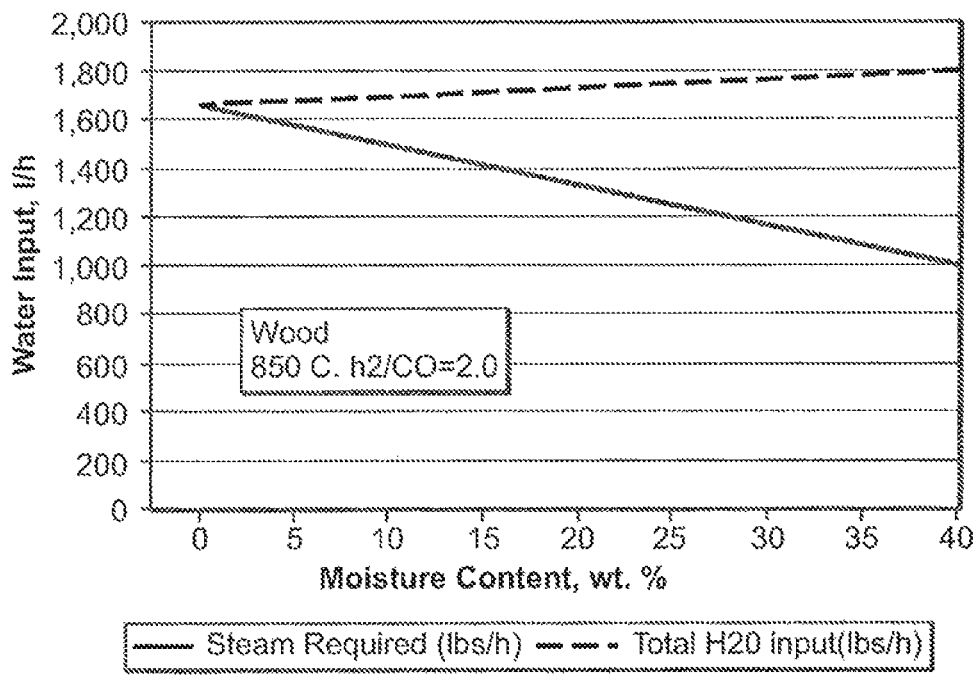
FIG. 9 shows the predicted total and external water supply required to produce a syngas of $H_2$/CO=2.0 at 850° C. for a typical wood feed stock.
Figure 10:
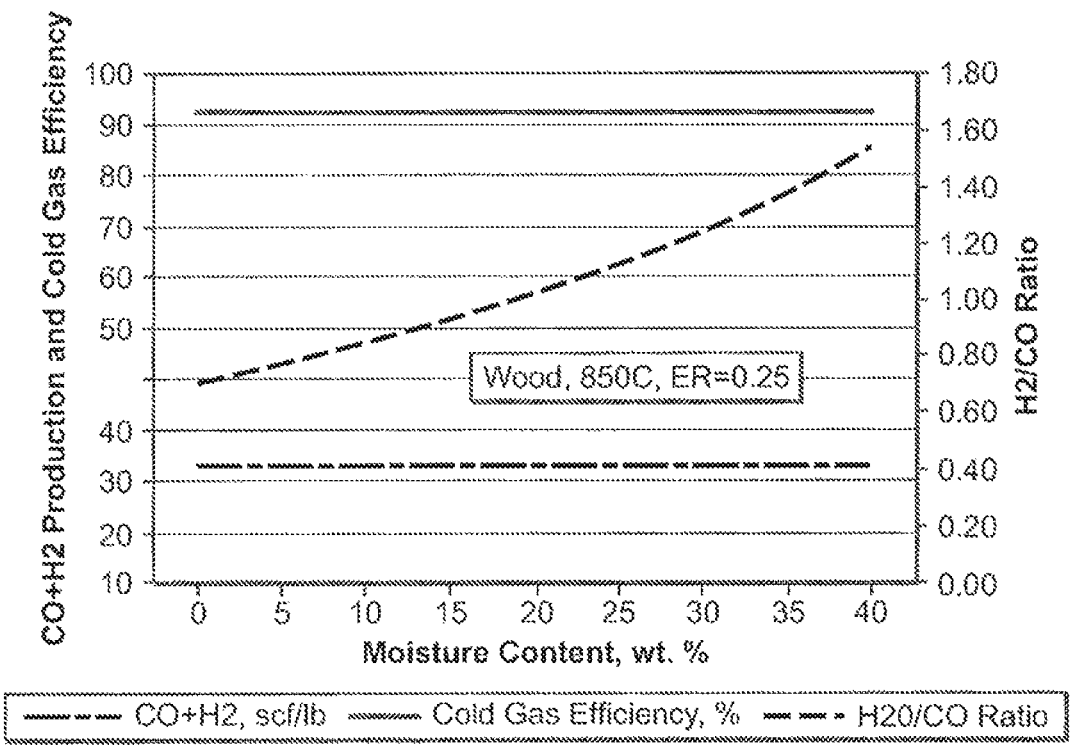
FIG. 10 shows the predicted CO+$H_2$ production rate, cold gas efficiency and $H_2$/CO ratio at 850° C. and an ER=0.30 for a typical wood feed stock.

(d) as an oxidant:

FIG. 9 shows the predicted total and external water supply required to produce a syngas of $H_2/CO$=2.0 at 850° C. for a typical wood feed stock. Moisture in feed stock can replace the external steam supply in case steam is used as oxidant, which is often the case when external heal is available, and/or saving oxygen is desired. By replacing air or oxygen as the oxidant, by water from feed stock, a high BTU syngas can be produced due to reduced dilution of nitrogen, and increased water-gas reaction (b). In addition to increasing the $H_2/CO$ ratio, the $H_2$+CO production rate and cold gas efficiency will be slightly increased with increasing moisture when operating at a constant gasification temperature and air-equivalence ratio (FIG. 8). FIG. 10 shows the predicted CO+$H_2$ production rate, cold gas efficiency and $H_2/CO$ ratio at 850° C. and an ER=0.30 for a typical wood feed stock.

By judiciously selecting for components of MSW according to, for example, parameters discussed above, and negatively or positively selecting the components from the MSW waste stream, followed by blending of the components, and optionally any other additives deemed necessary, in the correct proportions, engineered fuel feed stocks can be engineered for a specified use. For example, Table 5 lists some common components found in MSW, along with their C, H, O, N, S, ash, and HHV content, as well as the ER required for complete combustion. The components can be sorted into any different number of classes, according to, for example, their carbon content. For example, MSW can be sorted into two, three, four, five or even more classes. In one embodiment, Table 5a lists four separate classes; class #1 has a carbon content of about 45%, class #2 has a carbon content of about 55%, class #3 has a carbon content of about 60%, and class #4 has a carbon content of about 75%.

TABLE 5

| Sorted Waste | C | H | O | N | S | A | HHV (BTU/lb) | Air at ER = 1 (lb/lb) |
|---|---|---|---|---|---|---|---|---|
| Wood | 49.5 | 6 | 42.7 | 0.2 | 0.1 | 1.5 | 8,573 | 5.9 |
| Food waste | 48 | 6.4 | 37.6 | 2.6 | 0.4 | 5 | 8,714 | 6.1 |
| Paper | 43.5 | 6 | 44 | 0.3 | 0.2 | 6 | 7,595 | 5.2 |
| Cardboard | 44 | 5.9 | 44.6 | 0.3 | 0.2 | 5 | 7,585 | 5.2 |
| Yard waste | 47.8 | 6 | 38 | 3.4 | 0.3 | 4.5 | 8,387 | 5.9 |
| Textiles | 55 | 6.6 | 31.2 | 4.6 | 0.15 | 2.5 | 10,093 | 7.2 |
| Plastics | 60 | 7.2 | 22.8 | 0 | 0 | 10 | 11,795 | 8.4 |
| Leather | 60 | 8 | 11.6 | 10 | 0.4 | 10 | 12,340 | 9.1 |
| Rubber | 78 | 10 | 0 | 2 | 0 | 10 | 17,154 | 12.4 |

⇩ FOUR CLASSES

TABLE 5a

| Waste Class | C | H | O | N | S | A | HHV (BTU/lb) | Air at ER = 1 (lb/lb) |
|---|---|---|---|---|---|---|---|---|
| Class #1 | 45.0 | 6.1 | 41.4 | 1.4 | 0.2 | 4.4 | 8171 | 5.6 |
| Class #2 | 55.0 | 6.6 | 31.2 | 4.6 | 0.2 | 2.5 | 10,093 | 7.2 |
| Class #3 | 60.0 | 7. | 617.2 | 5.0 | 0.2 | 10.0 | 12,067 | 8.7 |
| Class #4 | 75.0 | 10.0 | 0.0 | 2.0 | 0.0 | 10.0 | 17,154 | 12.4 |

In order to engineer a fuel possessing certain specified parameters, equation 1 can be used to select from, and assign the amounts from, the four classes listed in Table 5a.

$$f(x) = \sqrt{\begin{array}{l} f_c(\sum x_i C_i - C_w)^2 + f_h(\sum x_i H_i - H_w)^2 + f_o(\sum x_i O_i - O_w)^2 + \\ f_n(\sum x_i N_i - N_w)^2 + f_z(\sum x_i S_i - S_w)^2 + F_z(\sum x_i A_i - A_w)^2 \end{array}} \quad \text{eq. 1}$$

where $$0 \ll X_i \ll 1 \text{ and } \sum x_i = 1$$

$$\sum_{i=1}^{n} x_i C_i + \sum_{i=1}^{n} x_i H_i + \sum_{i=1}^{n} x_i S_i +$$

$$\sum_{i=1}^{n} x_i A_i + \sum_{i=1}^{n} x_i O_i + \sum_{i=1}^{n} x_i N_i = 100$$

For example, an engineered fuel feed stock made from MSW can be designed to have the same chemical composition as natural woodchips. Natural woodchips have the chemical composition listed in Table 6. The precise amounts of the different classes of sorted MSW listed in Table 5 needed for engineering a synthetic fuel of the same chemical composition as natural woodchips were determined according to eq. 1 to be 88.1% from class #1 and 11.9% from class #2. No components from classes #3 and #4 were required for this particular synthetic engineered fuel feed stock.

TABLE 6

| | C | H | O | N | S | A | HHV (BTU/lb) | Air at ER = 1 (lb/lb) | Molecular Weight | Chemical Formula |
|---|---|---|---|---|---|---|---|---|---|---|
| Engineered Fuel Simulating Woodchips | 47.6 | 6.1 | 40.2 | 1.7 | 0.2 | 4.2 | 8,400 | 5.8 | 24.2 | $CH_{1.54}O_{0.66}N_{0.031}$ |
| Wood chips | 49.5 | 6.0 | 42.7 | 0.2 | 0.1 | 1.5 | 8,573 | 5.9 | 23.7 | $CH_{1.45}O_{0.63}N_{0.033}$ |

The ultimate and proximate chemical analysis of woodchips and FS#4 are tabulated in Table 7.

TABLE 7

| | Wood Wood pellets | | FS #4 82% Newsprints, 18% Plastics | |
|---|---|---|---|---|
| | AR | MF | AR | MF |
| Moisture | 6.51 | | 3.64 | |
| Ash | 0.54 | 0.58 | 9.62 | 9.98 |
| Volatile | 82.03 | 87.74 | 77.26 | 80.18 |
| Fixed Carbon | 10.92 | 11.68 | 9.48 | 9.84 |
| S | 0 | 0.01 | 0.08 | 0.01 |
| H | 5.39 | 5.77 | 5.45 | 5.66 |
| C | 45.58 | 48.75 | 41.81 | 43.39 |
| N | 0.01 | 0.01 | 0.07 | 0.07 |
| O | 41.98 | 44.90 | 39.33 | 40.82 |
| Cl | | | | |
| H/C | 0.12 | 0.12 | 0.13 | 0.13 |
| O/C | 0.92 | 0.92 | 0.94 | 0.94 |
| HHV (BTU/lb) | 7,936 | 8,489 | 7,296 | 7,572 |
| HHV (BTU/lb), Calculated | | 8,225 | | 7,520 |
| Density (lb/cu. ft) | 41.8 | | 33.7 | |

Gasification tests were performed at a laboratory scale stratified downdraft gasifier. The gasifier has an inside diameter of 4 inches and a height of 24 inches above a perforated grate. There are four Type-K thermocouples installed along the gasifier, 1", 7", 19" above the grate and 4" below the grate. The real-time temperatures are recorded by a data logger thermometer (OMEGA, HH309A). A syngas sampling train, consisting of two water scrubbers, and a vacuum pump is used for taking syngas samples, which is analyzed by a HP5890A gas chromotograph to obtain volumetric fractions of H2, N2, CO, CO2 and CH4. A dry gas test meter is installed in the air entrance to measure the air intake rate. The tests with two wood and simulated wood were conduced with air as oxidant at similar operating conditions. The results are listed in Table 8.

TABLE 8

| Parameter | Wood | Simulated Wood (FS#4) |
|---|---|---|
| H2 | 20.3 | 19.8 |
| N2 | 44.8 | 46.4 |
| CO | 24.1 | 24.7 |
| CH4 | 2.0 | 1.2 |
| CO2 | 8.7 | 8.0 |

TABLE 8-continued

| Parameter | Wood | Simulated Wood (FS#4) |
|---|---|---|
| H2/CO | 0.84 | 0.80 |
| BTU/scf | 167.4 | 159.2 |

As can be observed in Table 8, the amounts of $H_2$, $N_2$, CO, $CH_4$, $CO_2$ produced from the gasification of woodchips are very similar to those produced from the gasification of feed stock #4. In addition, the ratio of $H_2$/CO and the BTU/scf is within about 5%. This engineered fuel feed stock demonstrates that by using the methods described herein, feed stocks can be engineered that approximate a natural fuel such as wood.

Fuels of Similar Energy Content do not Necessarily Demonstrate Similar Gasification or Combustion Profiles However is does not follow that two fuels possessing the same energy content (for example HHV or BTU/lb) will combust or gasify with the same reactivity or produce the same thermal conversion profile. For example, two feed stocks were prepared containing approximately 14,000 BTU/lb. Feed stock #2 (FS#2) has an energy content of 13,991 BTU/lb and feed stock #7 (FS#7) has an energy content of 14,405 BTU/lb, a difference of about 3%. The chemical molecular characteristics of the two feed stocks are listed in Table 9. The moisture content, carbon content, hydrogen content, oxygen content, and ratios of H/C and O/C are very different compared to each other.

TABLE 9

| | FS#2 36% Magazines, 64% Plastics | | FS#7 80% Rubber, 20% Paper + 13% water | |
|---|---|---|---|---|
| | AR | MF | AR | MF |
| Moisture | 0.94 | | 13.1 | |
| Ash | 6.53 | 6.59 | 3.84 | 4.42 |
| Volatile | 92.48 | 93.36 | 61.94 | 71.28 |
| Fixed Carbon | 0.05 | 0.05 | 21.12 | 24.30 |
| S | 0.05 | 0.01 | 1.28 | 0.01 |
| H | 9.51 | 9.60 | 5.87 | 6.75 |
| C | 68.85 | 69.50 | 75.12 | 86.44 |
| N | 0.01 | 0.01 | 0.03 | 0.03 |

TABLE 9-continued

| | FS#2 36% Magazines, 64% Plastics | | FS#7 80% Rubber, 20% Paper + 13% water | |
|---|---|---|---|---|
| | AR | MF | AR | MF |
| O | 14.12 | 14.25 | 0.77 | 0.89 |
| Cl | | | 0.076 | 0.09 |
| C/H | 7.2 | 7.2 | 12.8 | 12.8 |
| C/O | 4.9 | 4.9 | 97.6 | 97.6 |
| HHV (BTU/lb) | 13,991 | 14,124 | 14,405 | 16,577 |
| HHV (BTU/lb), Calculated | | 15,064 | | 16,574 |
| Density (lb/cu. ft) | | | | |

The feed stocks were gasified using the following procedure. Gasification tests were performed at a laboratory scale stratified downdraft gasifier. The gasifier has an inside diameter of 4 inches and a height of 24 inches above a perforated grate. There are four Type-K thermocouples installed along the gasifier, 1", 7", 19" above the grate and 4" below the grate. The real-time temperatures are recorded by a data logger thermometer (OMEGA, HH309A). A syngas sampling train, consisting of two water scrubbers, and a vacuum pump is used for taking syngas samples, which is analyzed by a HP5890A gas chromotograph to obtain volumetric fractions of $H_2$, $N_2$, CO, $CO_2$ and $CH_4$. A dry gas test meter is installed in the air entrance to measure the air intake rate. The tests with two wood and simulated wood were conduced with air as oxidant at similar operating conditions. The results are listed in the following table. It can be seen that syngas composition, $H_2$/CO ratio and syngas HHV are fairly close between the two engineered fuel feed stocks. The results of the gasification of feed stocks FS#2 and FS#7 are listed in Table 10.

TABLE 10

| Parameter | FS#2 | FS#7 | Difference % |
|---|---|---|---|
| $H_2$ % | 21.9 | 28.6 | 30.4 |
| $N_2$ % | 45.6 | 45.2 | 0.8 |
| CO % | 18.9 | 15.6 | 17.2 |
| $CH_4$ % | 6.4 | 2.7 | 57.3 |
| $CO_2$ % | 7.3 | 7.9 | 8.6 |
| $H_2$/CO | 1.16 | 1.83 | 57.4 |
| Syngas HHV (BTU/scf) | 200.21 | 173.8 | 13.2 |
| CO + $H_2$ % | 40.8 | 44.2 | 8.4 |

From the data in Table 10, if can be seen that although, the two fuels have very similar energy content (a difference of only about 3%), the difference in syngas composition is very different. There is a greater than 30% difference in $H_2$ vol. % and $CH_4$ vol. % and an over 50% difference in the ratio of $H_2$/CO between the two feed stocks, which means that the synthesis gases from these two fuels could not be used for the production of similar Fischer-Tropsch fuels. There is a 13% difference in the energy content of the synthesis gas and a 17% difference in the amount of CO produced between the two feed stocks. This experiment demonstrates that consideration of only the BTU/lb value of feed stocks does not give a true indication of what type of syngas profile the feed stock will have.

Combustion

The same calculation was performed on theoretical feed stocks except the condition were under combustion rather than gasification. All feed stocks were assumed to have the same HHV of 10,000 BTU/lb, and then changes to the combinations of carbon content, hydrogen content, oxygen content, ash content and moisture content were introduced. The results are tabulated in Table 11.

TABLE 11

| | #1 | #2 | #3 | #4 | #5 |
|---|---|---|---|---|---|
| BTU Value/lb | 10,000 | 10,000 | 10,000 | 10,000 | 10,000 |
| Moisture | 5 | 5 | 5 | 5 | 5 |
| Ash | 5 | 5 | 5 | 5 | 5 |
| S | 0.1 | 0.1 | 0.1 | 0.1 | 0.1 |
| H | 13.3 | 10.1 | 6.9 | 3.7 | 0.5 |
| C | 30 | 40 | 50 | 60 | 70 |
| N | 0.1 | 0.1 | 0.1 | 0.1 | 0.1 |
| O | 46.6 | 39.7 | 32.9 | 26.1 | 19.3 |
| C/H | 2.3 | 4.0 | 7.3 | 16.4 | 147.3 |
| C/O | 0.6 | 1.0 | 1.5 | 2.3 | 3.6 |
| Stoich. Air (scf/lb) | 78.8 | 83.2 | 87.7 | 92.2 | 96.7 |
| Combustion Products | | | | | |
| Excess Air Ratio | 28.5% | 29.5% | 30.0% | 31.0% | 32.0% |
| O2 (scf/lb) | 4.7 | 5.2 | 5.5 | 6.0 | 6.5 |
| N2 (scf/lb) | 80.0 | 85.2 | 90.1 | 95.4 | 100.8 |
| CO2 (scf/lb) | 9.5 | 12.7 | 15.8 | 19.0 | 22.1 |
| H2O (scf/lb) | 26.2 | 20.1 | 14.1 | 8.0 | 2.0 |
| SO2 (scf/lb) | 0.012 | 0.012 | 0.012 | 0.012 | 0.012 |
| Total (scf/lb) | 120.4 | 123.1 | 125.5 | 128.4 | 131.4 |
| Flue Gas (dry %) | | | | | |
| O2 (dry vol. %) | 5.0 | 5.0 | 5.0 | 5.0 | 5.0 |
| N2 (dry vol. %) | 84.9 | 82.7 | 80.8 | 79.2 | 77.9 |
| CO2 (dry vol. %) | 10.1 | 12.3 | 14.2 | 15.8 | 17.1 |
| SO2 (dry, ppmv) | 126 | 115 | 106 | 99 | 92 |

As can be seen in Table 11, theoretical feed stocks #1 to #5 all have the same HHV of 10,000 BTU/lb, but the carbon content varies from 30% to 70% (H and O will also vary accordingly). From the numbers listed the stoichiometric air requirement for complete combustion varies from 78.8 to 96.7 scf per lb of feed stock. Due to this difference, combustion products will vary, and noticeably the excess air ratio must be adjusted in actual combustion operation if the operator is monitoring stack $O_2$. In the above calculations, excess air has to be adjusted from 28.5% for feed stock #1 to 32% for feed stock #5 if the target $O_2$ in stack is at 5%.

TABLE 12

|  | #3 | #8 | #9 | #10 |
|---|---|---|---|---|
| BTU Value/lb |  |  |  |  |
| Moisture | 5 | 10 | 15 | 20 |
| Ash | 5 | 5 | 5 | 5 |
| S | 0.1 | 0.1 | 0.1 | 0.1 |
| H | 6.9 | 5.6 | 4.4 | 3.2 |
| C | 50 | 50 | 50 | 50 |
| N | 0.1 | 0.1 | 0.1 | 0.1 |
| O | 32.9 | 29.2 | 25.4 | 21.6 |
| C/H | 7.3 | 8.9 | 11.3 | 15.6 |
| C/O | 1.5 | 1.7 | 2.0 | 2.3 |
| Stoich. Air (scf/lb) | 87.7 | 84.3 | 81.0 | 77.6 |
| Combustion Products |  |  |  |  |
| Excess Air Ratio | 30.0% | 30.5% | 31.0% | 31.0% |
| O2 (scf/lb) | 5.5 | 5.4 | 5.3 | 5.0 |
| N2 (scf/lb) | 90.1 | 86.9 | 83.8 | 80.3 |
| CO2 (scf/lb) | 15.8 | 15.8 | 15.8 | 15.8 |
| H2O (scf/lb) | 14.1 | 12.8 | 11.6 | 10.3 |
| SO2 (scf/lb) | 0.012 | 0.012 | 0.012 | 0.012 |
| Total (scf/lb) | 125.5 | 121.0 | 116.4 | 111.4 |
| Flue Gas (dry %) |  |  |  |  |
| O2 (dry vol. %) | 5.0 | 5.0 | 5.0 | 5.0 |
| N2 (dry vol. %) | 80.8 | 80.4 | 79.9 | 79.4 |
| CO2 (dry vol. %) | 14.2 | 14.6 | 15.1 | 15.6 |
| SO2 (dry, ppmv) | 106 | 110 | 113 | 117 |

In Table 12 the theoretical feed stocks each have an energy value of 10,000 BTU/lb box the moisture content was varied from between 5% to 20%. The stoichiometric air requirement for complete combustion varies from 87.7 for #3 (5% moisture) to 77.6 for #10 (20% moisture) scf per lb of feed stock. Thus, for combustion operation, consideration of only the BTU content of a feed stock is insufficient to know what the combustion profile will be. Feed stocks possessing the same BTU value but different chemical molecular characteristics will exhibit different combustion behavior and require different combustion controls. It is also anticipated that the combustor temperature will also vary even with feed stocks containing the same BTU value yet having different chemical molecular characteristics.

Design of High BTU Fuels

To design the maximum BTU containing fuel while minimizing the risk of slagging, a limit on the amount of ash present must be taken into account. For biomass fuels, it has been reported that fuels comprising less than about 5% ash appear not to slag as much as fuels containing more than about 5% ash (see Reed, T. B., and A. Das, *Handbook of Biomass Downdraft Gasifier Engine Systems*. Golden: SERI, 1988). Ashes can cause a variety of problems particularly in up or downdraft gasifiers. Slagging or clinker formation in the reactor, caused by melting and agglomeration of ashes, at the best will greatly add to the amount of labor required to operate the gasifier. If no special measures are taken, slagging can lead to excessive tar formation and/or complete blocking of the reactor.

Whether or not slagging occurs depends on the ash content of the fuel, the melting characteristics of the ash, and the temperature pattern in the gasifier. Local high temperatures in voids in the fuel bed in the oxidation gone, caused by bridging in the bed and maldistribution of gaseous and solids flows, may cause slagging even using feels with a high ash melting temperature. In general, no slagging is observed with fuels having ash contents below 5-6 percent. Severe slagging can be expected for fuels having ash contents of 12 percent and above. For fuels with ash contents between 6 and 12 percent, the slagging behavior depends to a large extent on the ash melting temperature, which is influenced by the presence of trace elements giving rise to the formation of low melting point eutectic mixtures. Equation 2 below gives the relationship between the energy content of the fuel (HHV) and the amount of ash contained in the engineered fuel feed stock.

Maximize $$HHV_{fuel} = 146.4\sum_{i=1}^{n} x_iC_i + 588.8\sum_{i=1}^{n} x_iH_i + \\ 29.4\sum_{i=1}^{n} x_iS_i - 6.6\sum_{o=2}^{n} x_iA_i - 51.5\left(\sum_{i=1}^{n} x_iO_i + \sum_{i=1}^{n} x_iN_i\right)$$ eq. 2

$$\sum_{i=1}^{n} x_iA_i < 5 \text{ (to minimize risk of slagging)}$$

$$\sum_{i=1}^{n} x_iS_i \text{ (less than a predetermined value)}$$

$$\sum_{i=1}^{n} x_iC_i + \sum_{i=1}^{n} x_iH_i + \sum_{i=1}^{n} x_iS_i + \\ \sum_{i=1}^{n} x_iA_i + \sum_{i=1}^{n} X_i + O_i + \sum_{i=1}^{n} x_iN_i + 100$$

By use of the above equations an engineered fuel feed stock with a HHV of about 10,000 BTU/lb can be designed whereby the ash is held to a minimum amount, for example, less than about 5% ash, or less than about 4% ash. The components of MSW used to engineer the fuels of about 10,000 BTU/lb were selected from the four classes of MSW components derived from MSW listed in Table 5. Table 13 lists the amounts of the components of MSW used for engineering these fuels and their corresponding carbon, hydrogen, sulfur, and ash contents as well as the HHV value for the engineered fuel.

TABLE 13

|  | C | H | O | N | S | Ash | HHV (BTU/lb) |
|---|---|---|---|---|---|---|---|
| Ash content <4% (80% Class #2, 20% Class #3) | 56.0 | 6.8 | 28.4 | 4.6 | 0.2 | 4.0 | 10,493 |
| Ash content <5% (67% Class #2, 33% Class #3) | 56.7 | 6.9 | 26.5 | 4.7 | 0.2 | 5.0 | 10,756 |

Design of Engineered Fuel Feed Stock based on Target Syngas Composition for Downstream Fischer-Tropsch Chemistry In some embodiments, during production of the densified form of the engineered fuel feed stock, it is determined that the chemical molecular characteristic of the densified form is lower than that required for a particular gasifier, the amount of other materials that enhance the gasification process may be increased during the process thereby bringing the chemical molecular characteristics of the densified form of the engineered fuel feed stock within the desired fuel specification. In other embodiments, other materials that enhance the gasification process may be added before or during the compression to adjust the chemical molecular characteristics of the resulting densified form of the engineered fuel feed stock. In some embodiments the other material added to the feed stock is a FOG. Table 16 lists the heat contain of certain FOGs and their carbon and hydrogen contents.

TABLE 16

| Type of FOG | BTU/lb | Carbon Content | Hydrogen Content |
|---|---|---|---|
| Tallow | 16,920 | 76.6% | 11.9% |
| Chicken Fat | 16,873 | 75.3% | 11.4% |
| Yellow Grease | 16,899 | 76.4% | 11.6% |
| Choice White Grease | 16,893 | 76.5% | 11.5% |
| Waste Motor Oil | 16,900 | Not available | Not available |

Another type of material that can be added to the feed stock is sludge. Table 17 gives the carbon and hydrogen content of sludge.

TABLE 17

| Elemental Analysis | Primary | Secondary | Mixed | Digested |
|---|---|---|---|---|
| Carbon | 60.0 | 53.0 | 57.0 | 67.0 |
| Hydrogen | 7.5 | 7.0 | 7.0 | 5.0 |
| Oxygen | 28.0 | 30.5 | 30.0 | 25.0 |
| Nitrogen | 3.0 | 9.0 | 5.0 | 2.2 |
| Sulfur | 1.5 | 0.5 | 1.0 | 0.8 |
| Total | 100 | 100 | 100 | 100 |

The best-known technology for producing hydrocarbons synthesis gas is the Fischer-Tropsch synthesis. This technology was first demonstrated in Germany in 1902 by Sabatier and Senderens when they hydrogenated carbon monoxide (CO) to methane, using a nickel catalyst. In 1926 Fischer and Tropsch were awarded a patent for the discovery of a catalytic technique to convert synthesis gas to liquid hydrocarbons similar to petroleum.

The basic reactions in the Fischer-Tropsch synthesis are:
Paraffins:

$$(2n+1)H_2 + nCO \rightarrow C_nH_{2n+2} + nH_2O$$

Olefins:

$$2n\,H_2 + nCO \rightarrow C_nH_{2n} + n\,H_2O$$

Alcohols:

$$2nH_2 + nCO \rightarrow C_nH_{2n+1}OH + (n-1)H_2O$$

Other reactions may also occur during the Fischer-Tropsch synthesis, depending on the catalyst employed and the conditions used:

Water-Gas Shift:

$$CO + H_2O \rightarrow CO_2 + H_2$$

Boudouard Disproportionation:

$$2CO \rightarrow C(s) + CO_2$$

Surface Carbonaceous Deposition:

$$\left(\frac{2x+y}{2}\right)H_2 + xCO \rightarrow C_xH_y + xH_2O$$

Catalyst Oxidation-Reduction:

$$yH_2O + xM \rightarrow M_xO_y + yH_2$$

$$yCO_2 + xM \rightarrow M_xO_y + yCO$$

Bulk Carbide Formation:

$$yC + xM \rightarrow M_xC_y$$

where M represents a catalytic metal atom.

The production of hydrocarbons using traditional Fischer-Tropsch catalysts is governed by chain growth or polymerization kinetics. Equation 3 describes the production of hydrocarbons, commonly referred to as the Anderson-Schulz-Flory equation.

$$\log\left(\frac{W_2}{n}\right) + \log\alpha + \log\left[\frac{(1-\alpha)^2}{\partial}\right] \quad \text{eq. 3}$$

where $W_n$=weight fraction of products with carbon number n, and $\alpha$=chain growth probability, i.e, the probability that a carbon chain on the catalyst surface will grow by adding another carbon atom rather than terminating. In general, $\alpha$ is dependent on concentrations or partial pressures of CO and H2, temperature, pressure, and catalyst composition but independent of chain length. As $\alpha$ increases, the average carbon number of the product also increases. When $\alpha$ equals 0, only methane is formed. As $\alpha$ approaches 1, the product becomes predominantly wax.

Figure 11:
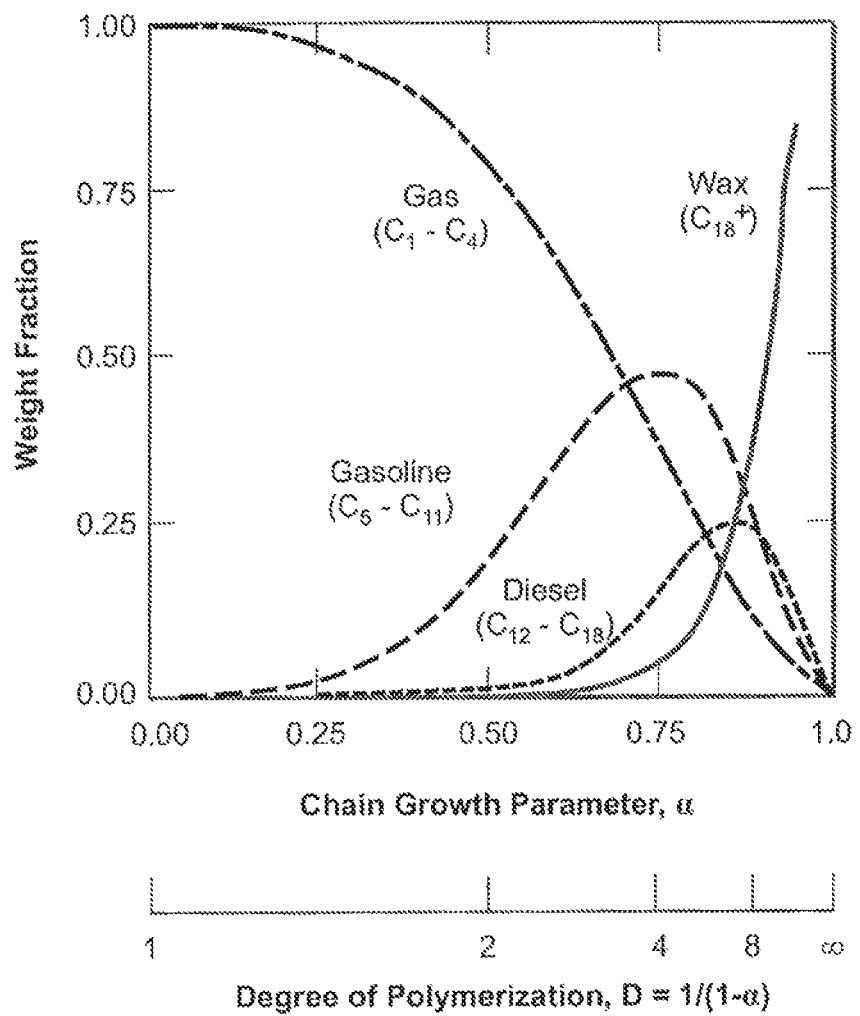
FIG. 11 provides a graphical representation of eq. 2 showing the weight fraction of various products as a function of the chain growth parameter α.

FIG. 11 provides a graphical representation of eq. 2 showing the weight fraction of various products as a function of the chain growth parameter $\alpha$. FIG. 11 shows that there is a particular $\alpha$ that will maximize the yield of a desired product, such as gasoline or diesel fuel. The weight fraction of material between carbon numbers m and n, inclusive, is given by equation 4:

$$W_{mn} = m\alpha^{m-1} - (m-1)\alpha^m - (n+1)\alpha^n + n\alpha^{n+1} \quad \text{(eq. 4)}$$

The $\alpha$ to maximize the yield of the carbon number range from m to n is given by equation 5.

$$\alpha_{opt} = \left(\frac{m^2 m}{n^2 + n}\right)^{\frac{1}{n-m+1}} \quad \text{(eq. 5)}$$

Additional gasoline and diesel fuel can be produced through further refining, such as hydrocracking or catalytic cracking of the wax product.

Figure 12:
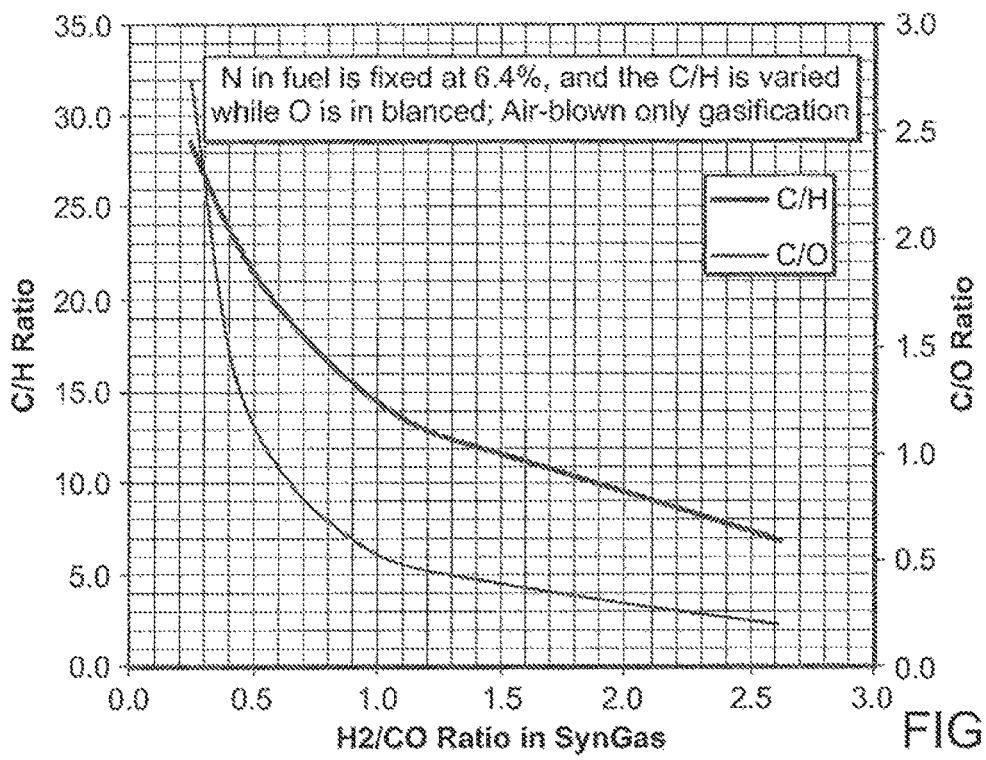
FIG. 12 provides predicted C/H and C/O ratios needed in feed stock for the production of syngas with varying $H_2$/CO ratios.

For each of the targeted product derived from syngas the corresponding appropriate $H_2/CO$ ratio is needed. One way to produce such $H_2/CO$ ratio is to control the amount of C, H, and O in the feed stock used to produce the syngas. For example, FIG. 12 shows the predicted C/H and C/O ratios needed in the feed stock in order to produce a syngas of the requisite $H_2/CO$ ratio.

TABLE 14

| Product | Basic Chemical Reaction | $H_2/CO$ Ratio |
|---|---|---|
| FT Liquid fuels | $2nH_2 + nCO \rightarrow C_nH_{2n} + nH_2O$;<br>$(2n + 1)H_2 + nCO \rightarrow C_nH_{2n+1} + nH_2O$ | 2:0-2.1 |
| Methanol | $2H_2 + CO = CH_3OH$;<br>$CO_2 + 3H_2 \rightarrow CH_3OH + H_2O$ | 2.0 |

TABLE 14-continued

| Product | Basic Chemical Reaction | $H_2/CO$ Ratio |
|---|---|---|
| Ethanol | $2CO + 4H_2 \rightarrow C_2H_5OH + H_2O$ | 2.0 |
| Higher alcohols | $nCO + 2nH_2 \rightarrow C_nH_{2n+1}OH + (n-1)H_2O$ | 2.0 |
| Dimethyl ether | $2CO + 4H_2 \rightarrow CH_3OCH_3 + H_2O$ | 2.0 |
| Acetic Acid | $2CO + 2H_2 \rightarrow CH_3COOH$ | 1.0 |
| Ethylene | $2CO + 4H_2 \rightarrow C_2H_4 + 2H_2O$ | 2.0 |
| Ethylene Glycol | $2CO + 3H_2 \rightarrow C_2H_6O_2$ | 1.5 |
| $Ac_2O$ | $4CO + 4H_2 \rightarrow (CH_3CO)_2O + H_2O$ | 1.0 |
| Ethyl Acetate | $4CO + 6H_2 \rightarrow CH_3COOC_2H_5 + 2H_2O$ | 1.50 |
| Vinyl Acetate | $4CO + 5H_2 \rightarrow CH_3COOCH=CH_2 + 2H_2O$ | 1.25 |

By first selecting the $H_2/CO$ ratio desired in the product syngas, the proper ratio of H/C and O/C in the composition of the engineered feed stock can be determined, along with the proper amount of moisture and ash content. Once these ratios have been determined then the proper MSW components can be selected and combined together to form feed stocks that upon gasification will yield a syngas with the desired $H_2/CO$ ratio.

Physical Properties that Affect Efficient Gasification or Combustion of Fuel Particles Up and downdraft gasifiers are limited in the range of fuel size acceptable in the feed stock. Fine grained and/or fluffy feed stock may cause flow problems in the bunker section of the gasifier as well as an inadmissible pressure drop over the reduction zone and a high proportion of dust in the gas. Large pressure drops will lead to reduction of the gas load of downdraft equipment, resulting in low temperatures and tar production. Excessively large sizes of particles or pieces give rise to reduced reactivity of the fuel, resulting in startup problems and poor gas quality, and to transport problems through the equipment. A large range in size distribution of the feed stock will generally aggravate the above phenomena. Too large particle sizes can cause gas channeling problems, especially in updraft gasifiers. Acceptable fuel sizes fox gasification systems depend to a certain extent on the design of the units.

Particle size distribution in fuel influences aspects of combustor and gasifier operations including the rate at which fuel reacts with oxygen and other gases. Smaller particles of fuel tend to be consumed faster than bigger ones. Particle size is based on area-volume average ($d_{pv}$) (eq. 6). The distribution of particle sizes in a population of particles is given by $d_{pv}$ (eq. 7):

$$d_p = \left(\frac{6V_p}{\pi}\right) \quad \text{(eq. 6)}$$

$$d_p = \frac{1}{\sum_{i=1}^{n} \frac{w_i}{d_{pv,i}}} \quad \text{(eq. 7)}$$

The shape of the engineered fuel feed stock particles and the densified form of the engineered fuel feed stock also strongly influence the rates of gas-solid reactions and momentum transfers between the particles and the gas stream that carries them. One parameter used to describe the shape of a particle is sphericity, which affects the fluidity of the particles during the gasification/combustion process. Fluidity is important in avoiding channeling and bridging by the particles in the gasifier, thereby reducing the efficiency of the conversion process. Sphericity can be defined by the following formula:

$$\varphi p = \frac{\text{Surface area of spherical particle}}{\text{Surface area of particle with same volume of the spherical one}}$$

Particle size, $d_{pv}$, and sphericity, $\varphi_p$ together in the relationship $\varphi_p \cdot d_{pv}$, influence hydrodynamic characteristics of particles while in a combustor or gasifier. These hydrodynamic characteristics include among others pressure drop, minimum fluidization velocity, terminal velocity and momentum transfer. By way of example, particles of coal, limestone, and sand, present with sphericity that ranges from 0.6 to 0.9. Woodchips particles, for example, present with a sphericity of about 0.2.

The rates of gas-solids reactions depend on the available surface area of the particle. Therefore, for particles of similar volumes, the particle with the higher surface area will be consumed faster and more efficiently and therefore effect the gasification process. Equations 8 and 9 describe the volume of a sphere and cylinder, respectively.

$$d_p = \frac{S_p}{V_p} = \frac{6}{d_{pv}}; \quad \text{(eq. 8)}$$

$$\alpha_p = \frac{S_p}{V_p} = \frac{2\frac{1}{4}\pi d^2 + \pi dh}{\frac{1}{4}\pi d^2 h} \quad \text{(eq. 9)}$$

Table 15 below lists different cylinders and a sphere that all have the same volume (0.524 in$^3$), yet possessing different surface areas (in$^2$) and specific surface areas (in$^2$/in$^3$).

TABLE 15

| | Characteristic dimensions | Average diameter | Surface area (in$^2$) | Volume (in$^3$) | Specific surface area (in$^2$/in$^3$) | Sphericity |
|---|---|---|---|---|---|---|
| Sphere | φ1" | φ1" | 3.142 | 0.524 | 6.0 | 1 |
| Cylindrical | φ0.5" × 2.667" | φ1" | 4.518 | 4.518 | 8.75 | 0.686 |
| Cylindrical | 0.87" × 0.88" | φ1" | 3.596 | 3.596 | 6.87 | 0.874 |
| Cylindrical | φ1.0" × 0.667" | φ1" | 3.665 | 3.665 | 7.0 | 0.857 |
| Cylindrical | φ1.5" × 0.296" | φ1" | 4.931 | 4.931 | 9.471 | 0.637 |

Figure 13:
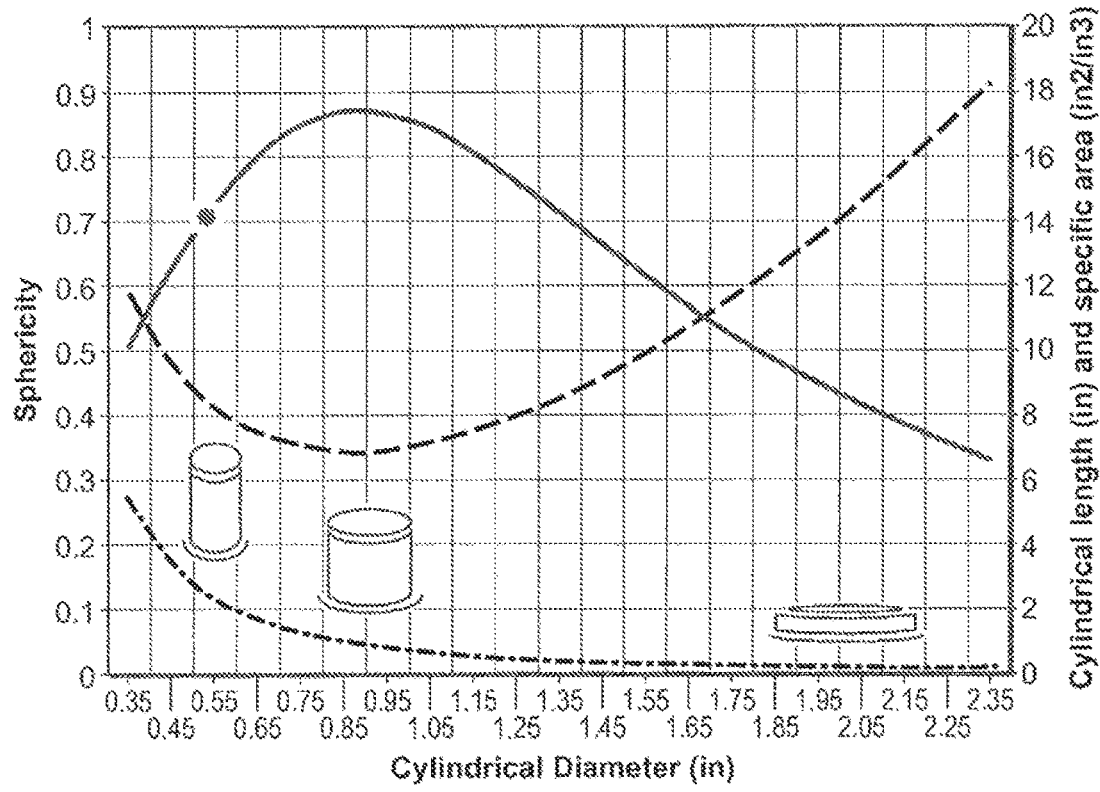
FIG. 13 provides a graph showing cylindrical diameter plotted against the sphericity, the cylindrical length and specific area.

For shapes with the same volume such as cylinders and spheres, spheres have the lowest specific surface area. As the sphericity of a cylinder approaches 1 it behaves more like a sphere in the gasification/combustion process. However, the surface area for the corresponding volume is not maximized in the shape of a sphere which means the conversion process will not be optimally efficient. There is a minimum specific surface area and highest sphericity for a cylindrical shape depending on its diameter and length. This shape when determined for the engineered fuel is optimal for the conversion process for which the fuel is used. FIG. 13 shows that when the cylindrical diameter is plotted against the sphericity and the cylindrical length and specific area, the optimal size of the pellet can be determined.

For a given equivalent diameter, (FIG. 13), there is a minimum in specific surface area corresponding to a maximum sphericity when the cylindrical diameter almost equals its length. Away from this point, the sphericity decreases but the specific surface area increases which means that while the fluidity is declining, the rates of gas-solid reactions becomes favored. The optimal pellet dimensions have a maximum possible specific surface area while maintaining a sphericity value high enough to ensure excellent fluidity. This parameter minimizes or even prevents bridging and channeling of pellets inside the gasifiers, which decreases the efficiency of the conversion process.

As described above, the engineered feed stock should provide maximum surface area for the same volume in order to favor gas-solid reactions which is determined by maximization of αp in eq. 10.

$$\text{maximize } \alpha_p = \frac{2\frac{1}{4}\pi d^2 + \pi dh}{\frac{1}{4}\pi d^2 h} \quad \text{(eq. 10)}$$

The maximization of αp for a particular feed stock provides better hydrodynamic performance during the conversion process and cost effectiveness in preparation (size reduction and pelletizing) of the engineered fuel as compared to other natural fuels.

For further optimization of combustion or gasification performance, the size and shape, and in some embodiments, the sphericity, of the engineered fuel feed stock can be determined. For example, to engineer a fuel having a densified form that will produce similar results as compared with, for example, natural woodchips in gasification and combustion processes, the sphericity of natural woodchips provides a natural starting point. Natural woodchips have a sphericity ($\varphi_p$) of about 0.2. An engineered fuel particle was designed with a sphericity of 0.25, a slightly better sphericity than natural woodchips yet containing the same HHV. Equation 11 describes the size of the engineered fuel particle and Table 18 lists the possible dimensions for such an engineered particle:

$$\phi_p = \frac{\pi(6V_p/\pi)}{S_p} \geq \text{a predetermined value} \quad \text{(eq. 11)}$$

$\phi_p d_{pv} \geq$ a predetermined value

TABLE 18

| | | | |
|---|---|---|---|
| Overall particle size (in) | 1.0 | 1.5 | 2.0 |
| Diameter (in) | 0.83 | 1.35 | 1.91 |
| Length (in) | 1.67 | 1.93 | 2.21 |
| Specific Surface Area (ft²/ft³) | 72 | 48 | 36 |

From the values shown in Table 18, the smallest particle actually has the greatest specific surface area (72 ft²/ft³ versus 48 ft²/ft³ and 36 ft²/ft³, respectively).

The rate of gasification of the fuel pellets can be positively effected by a number of elements which act as catalysts, such as small quantities of potassium, sodium or zinc.

Bulk density is defined as the weight per unit volume of loosely tipped fuel. Fuels with high bulk density are advantageous because they represent a high energy-for-volume value. Low bulk density fuels sometimes give rise to insufficient flow under gravity, resulting in low gas heating values and ultimately in burning of the chair in the reduction zone. Average bulk densities of solid fuels such as wood, coal and peat ranges from about 10 lb/ft³ to about 30 lb/ft³. If bulk densities for some components used for the pellets of the invention are too low, the over all bulk density can be improved through pelletization. The bulk density varies significantly with moisture content and particle size of the fuel.

Exemplary ranges for specifications of a waste feed for a gasification system can include, but are not limited to: a diameter of between about 0.25 inches to about 1.5 inches; a length of between about 0.5 inch to about 6 inches; a surface to volume ration of between about 20:1 to about 3:1; a bulk density of about 10 lb/ft³ to about 75 lb/ft³; a porosity of between about 0.2 and about 0.6; an aspect ratio of between about 1 to about 10; a thermal conductivity of between about 0.023 BTU/(ft·hr·° F.) and about 0.578 BTU/(ft·hr·° F.); a specific heat capacity of between about 4.78× $10^{-5}$ to 4.78×$10^{-4}$ BTU/(lb·° F.); a thermal diffusivity of between about 1.08×$10^{-5}$ ft²/s to 2.16×$10^{-5}$ ft²/s; a HHV of between about 3,000 BTU/lb to about 15,000 BTU/lb; a moisture content of about 10% to about 30%; a volatile matter content of between about 40% to about 80%; a carbon content of between about 30% to about 80%; a hydrogen content of between about 3% to about 10%, a sulfur content of less than 2%; a chlorine content of less than 1%; and an ash content of less than about 10%.

Figure 14:
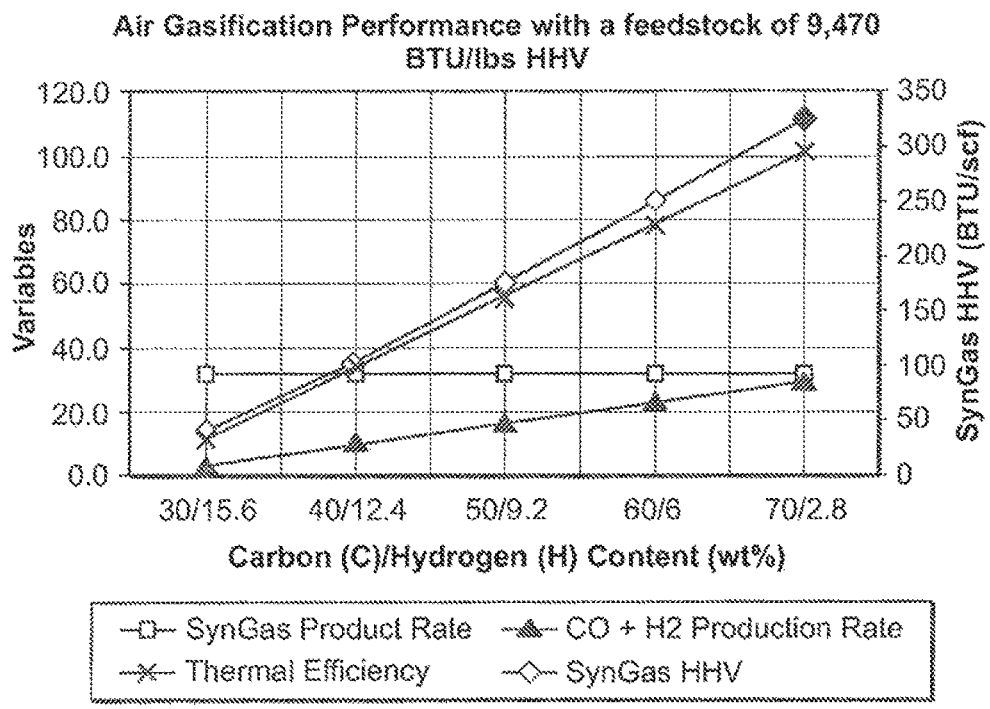
FIG. 14 provides a graph of feed stock containing different carbon and hydrogen contents and their predicted production of CO and $H_2$ during air gasification.
Figure 15:
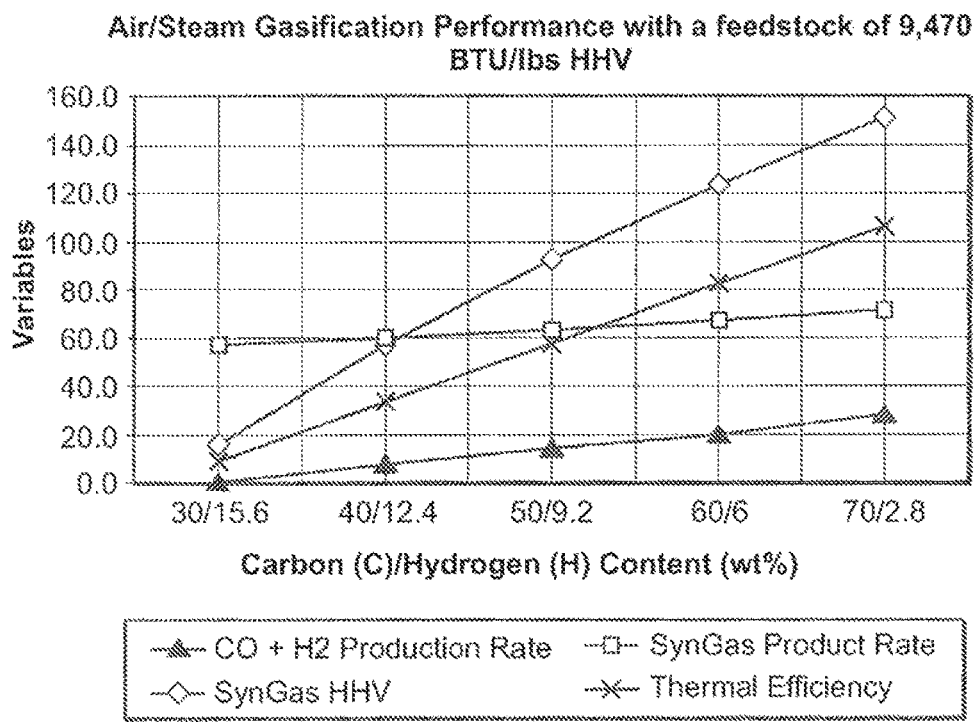
FIG. 15 provides a graph of feed stock containing different carbon and hydrogen contents and their predicted production of CO and $H_2$ during air/steam gasification.

From the results show in FIG. 14, MSW feed stock can be classified according to its carbon content and thus its potential for producing the amount of CO and $H_2$ in the resulting syngas upon thermal conversion. Table 19 shows one classification of types of fuels based on carbon content: low heat fuels (less than 45 wt % carbon); moderate heat fuels (45-60 wt % carbon); and high heat fuels (>60 wt % carbon).

TABLE 19

| | Low Heat Fuels | Moderate Heat Fuels | High Heat Fuels |
|---|---|---|---|
| Carbon content | <45 wt % | 45-60 wt % | >60 wt % |
| $H_2$ + CO Product | <10 scf/lbs | 10-20 scf/lbs | >20 scf/lbs |
| Air Equivalence ratio | >0.35 | 0.1-0.35 | <0.1 |
| Syngas HHV (dry basis) | <120 BTU/scf | 120-200 BTU/scf | >200 BTU/scf |
| Gasifier temperature | <850° C. | 800-900° C. | >900° C. |
| Performance | Incomplete C conversion, formation of CH4 and tars | Complete carbon conversion, minimal formation of CH4 and tars, low risk of slagging | Complete carbon conversion, no formation of CH4 and tars, high risk of slagging |

TABLE 19-continued

|  | Low Heat Fuels | Moderate Heat Fuels | High Heat Fuels |
| --- | --- | --- | --- |
| Applications | Syngas for combustion applications (engines), co-gasification w/ other fuels including moderate and high heat fuels as well as LFG | Syngas for all power, liquid fuel and chemicals applications | Syngas for all power, liquid fuel and chemicals applications |

The low heat fuels can be characterized as producing syngas containing CO and $H_2$ at less than about 10 scf/lbs and an HHV of less than about 120 BTU/scf. Because the gasifier requires an air equivalence ratio of more than 0.35 because of the low amount of carbon, the gasifier temperature will not rise above about 850° C. causing incomplete conversion of carbon and the formation of methane and tars. These feels can be used for production of syngas for all purposes, co-gasification with other fuels including moderate and high heat feels, as well as LFG.

The moderate heat fuels can be characterized as producing syngas containing CO and $H_2$ at about 10 to about 20 scf/lbs and an HHV of about 120 to about 200 BTU/scf. Because the gasifier requires an air equivalence ratio of about 0.1 to about 0.35 with a carbon content of about 45 wt % to about 60 wt %, the gasifier maintains a temperature of about 850° C. to about 900° C. causing complete conversion of carbon, minimal formation of methane and tars, and low risk of slagging. These fuels can be used for production of syngas for all applications, liquid fuels, and chemicals applications.

The high heat fuels can be characterized as producing syngas containing CO and $H_2$ at greater than about 20 scf/lbs and an HHV of greater than 200 BTU/scf. Because the gasifier requires an air equivalence ratio of only less than about 0.1 with a carbon content of greater than about 60 wt %, the gasifier's temperature is generally greater than about 900° C. causing complete conversion of carbon, no formation of methane and tars, but a high risk of slagging. These feels can be used for production of syngas for all applications, liquid fuels, and chemicals applications.

Therefore depending on the end use of the syngas to be produced, engineered fuel feed stocks of different carbon content can be selected and fuels can be engineered and synthesized for a particular end use. Such selection allows the fine tuning of the engineered fuels produced from differing heterogeneous feed stocks such as MSW, FOGS, sludges, etc. The engineered fuels can be used for producing syngas containing the desired CO and $H_2$ content.

The MSW can be processed by any method that allows for identification and separation of the component parts according to material type, such as by plastics, fibers, textiles, paper in all its forms, cardboard, rubber, yard waste, food waste, and leather. Methods of separation such as those disclosed in U.S. Pat. No. 7,431,136, U.S. 2006/0254957, U.S. 2008/0290006, U.S. 2008/0237093, the disclosures of which are hereby incorporated in their entirety, can be used for separating the components of waste.

It is understood that modifications may be made to the methods of separation disclosed above that allow for the recovery of the individual components of MSW for use in engineering engineered fuel feed stock as described herein.

In some embodiments, the component or components of the engineered feed stock are mixed. In some of the embodiments, the mixed components are reduced in size using known techniques such as shredding, grinding, crumbling and the like. Methods for the reduction in size of MSW components is well known and for example are described in U.S. Pat. No. 5,888,256, the disclosure of which is incorporated by reference in its entirety. In other embodiments, the individual components are first reduced in size prior to mixing with other components. In some embodiments, the mixed components of the engineered fuel feed stock are densified using known densification methods such as, for example, those described in U.S. Pat. No. 5,916,826, the disclosure of which is incorporated by reference in its entirety. In some embodiments, the densification forms pellets by the use of a pelletizer, such as a Pasadena hand press, capable of exerting up to 40,000 force-pounds.

In some embodiments, the FOGS component is added directly to the mixing tank. In other embodiments, the FOGS component is added after mixing just before the waste is placed into a pelletizing die.

By use of a pelletizer under appropriate conditions, pellets are produced having a range of dimensions. The pellets should have a diameter of at least about 0.25 inch, and especially in the range of about 0.25 inches to about 1.5 inches. The pellets should have a length of at least about 0.5 inch, and especially in the range of about 0.5 inches to about 6 inches.

By selection of the appropriate die to be used with the pelletizer, the pellets become scored on the surface of the encapsulation. This scoring may act as an identifying mark. The scoring can also affect the devolatization process such that the scored pellets volatile at a more efficient rate than the unscored pellets.

In some embodiments, the engineered fuel feed stock described herein is biologically, chemically and toxicologically inert. The term biologically inert, chemically inert, and toxicologically inert means that the engineered fuel feed stock described herein does not exceed the EPA's limits for acceptable limits on biological, chemical and toxicological agents contained within the engineered fuel feed stock. The terms also include the meaning that the engineered fuel feed stock does not release toxic products after production or upon prolonged storage. The engineered fuel feed stock does not contain, for example pathogens or live organisms, nor contain the conditions that would promote the growth of organisms after production or upon prolonged storage. For example, the engineered fuel feed stock in any form described herein can be designed so as to have a moisture content sufficient so as not to promote growth of organisms. The engineered fuel feed stock can be designed to be anti-absorbent, meaning it will not absorb water to any appreciable amount after production and upon prolonged storage. The engineered fuel feed stock is also air stable, meaning it will not decompose in the presence of air to give off appreciable amounts of volatile organic compounds. The engineered fuel feed stock described herein may be tested according to known methods in order to determine whether they meet the limits allowed for the definition of inert. For example, 40 CFR Parts 239 through 259 promulgated under Title 40—Protection of the Environment, contains all of the EPA's regulations governing the regulations for solid waster. The EPA publication SW-846, entitled Test Methods for Evaluating Solid Waste, Physical/Chemical Methods, is OSW's official compendium of analytical and sampling methods that have been evaluated and approved for use in complying with 40 CFR Parts 239 through 259, in relation to solid waste, which is incorporated by reference herein in its entirety.

EXAMPLES

Reference will now be made to specific examples some of which illustrate the invention. It is to be understood that the examples are provided to illustrate preferred embodiments and that no limitation to the scope of the invention is intended thereby.

General Synthetic Procedures

After components for the engineered feed stock were selected they were shredded in a low speed shredder and then mixed mechanically. Afterwards the mixture was densified using a pelletizer. If the moisture content needed to be increased, water was added daring the mixing step. A small sample of the feed stock was taken and dried in an temperature controlled and vented oven to confirm the moisture content. The mixed engineered feed stock was then subjected to gasification as described above.

| Feed Stock Wood (Control) | | |
|---|---|---|
| | Wood Wood pellets | |
| | AR | MF |
| Moisture | 6.51 | |
| Ash | 0.54 | 0.58 |
| Volatile | 82.03 | 87.74 |
| Fixed Carbon | 10.92 | 11.68 |
| S | 0 | 0.01 |
| H | 5.39 | 5.77 |
| C | 45.58 | 48.75 |
| N | 0.01 | 0.01 |
| O | 41.98 | 44.90 |
| Cl | | |
| C/H | 8.5 | 8.5 |
| C/O | 1.1 | 1.1 |
| HHV (BTU/lb) | 7,936 | 8,489 |
| HHV (BTU/lb), Calculated | | 8,225 |
| Density (lb/cu. ft) | 41.8 | |

| Feed Stock #1 | | |
|---|---|---|
| | Feed stock #1 (FS#1) 82% Newsprints, 18% Plastics | |
| | AR | MF |
| Moisture | 3.25 | |
| Ash | 4.51 | 4.66 |
| Volatile | 86.43 | 89.33 |
| Fixed Carbon | 5.81 | 6.01 |
| S | 0 | 0.01 |
| H | 7.57 | 7.82 |
| C | 51.88 | 53.62 |
| N | 0.06 | 0.06 |
| O | 32.65 | 33.75 |
| Cl | | |
| C/H | 6.9 | 6.9 |
| C/O | 1.6 | 1.6 |
| HHV (BTU/lb) | 9,552 | 9,873 |
| HHV (BTU/lb), Calculated | | 10,696 |
| Density (lb/cu. ft) | 20.3 | |

| Feed Stock #1 Gasifier Output | |
|---|---|
| Hydrogen, vol % | 14.9 |
| Nitrogen, vol % | 51.6 |
| Carbon Monoxide, vol % | 18.9 |
| Methane, vol % | 2.3 |
| Carbon Dioxide, vol % | 12.3 |
| Hydrogen/Carbon Monoxide | 0.79 |
| BTU/scf | 134.79 |
| Carbon Monoxide + Hydrogen | 33.8 |

| Feed Stock #2 | | |
|---|---|---|
| | FS#2 36% Magazines, 64% Plastics | |
| | AR | MF |
| Moisture | 0.94 | |
| Ash | 6.53 | 6.59 |
| Volatile | 92.48 | 93.36 |
| Fixed Carbon | 0.05 | 0.05 |
| S | 0.05 | 0.01 |
| H | 9.51 | 9.60 |
| C | 68.85 | 69.50 |
| N | 0.01 | 0.01 |
| O | 14.12 | 14.25 |
| Cl | | |
| C/H | 7.2 | 7.2 |
| C/O | 4.9 | 4.9 |
| HHV (BTU/lb) | 13,991 | 14,124 |
| HHV (BTU/lb), Calculated | | 15,064 |
| Density (lb/cu. ft) | | |

| Feed Stock #2 Gasifier Output | |
|---|---|
| Hydrogen, vol % | 21.9 |
| Nitrogen, vol % | 45.6 |
| Carbon Monoxide, vol % | 18.9 |
| Methane, vol % | 6.4 |
| Carbon Dioxide, vol % | 7.3 |
| Hydrogen/Carbon Monoxide | 1.16 |
| BTU/scf | 200.21 |
| Carbon Monoxide + Hydrogen | 40.8 |

| Feed Stock #3 | | |
|---|---|---|
| | FS#3 24.5% Other Papers, 75.5% Textiles | |
| | AR | MF |
| Moisture | 1.57 | |
| Ash | 7.57 | 7.69 |
| Volatile | 75.12 | 76.32 |
| Fixed Carbon | 15.74 | 15.99 |
| S | 0.37 | 0.01 |
| H | 5.85 | 5.94 |
| C | 48.12 | 48.89 |
| N | 8.38 | 8.51 |
| O | 28.14 | 28.59 |
| Cl | 3.44 | 3.49 |
| C/H | 8.2 | 8.2 |
| C/O | 1.7 | 1.7 |
| HHV (BTU/lb) | 9,629 | 9,783 |
| HHV (BTU/lb), Calculated | | 8,705 |
| Density (lb/cu. ft) | 21.9 | |

| Feed Stock #3 Gasifier Output | |
|---|---|
| Hydrogen, vol % | 6.5 |
| Nitrogen, vol % | 64.6 |
| Carbon Monoxide, vol % | 19.3 |
| Methane, vol % | 0.3 |
| Carbon Dioxide, vol % | 9.3 |
| Hydrogen/Carbon Monoxide | 0.3 |
| BTU/scf | 88.6 |
| Carbon Monoxide + Hydrogen | 25.7 |

| Feed Stock #4 | | |
|---|---|---|
| | FS#4 91.8% Newsprint, 2.2% Plastics, 6.0% Yard wastes | |
| | AR | MF |
| Moisture | 3.64 | |
| Ash | 9.62 | 9.98 |
| Volatile | 77.26 | 80.18 |
| Fixed Carbon | 9.48 | 9.84 |
| S | 0.08 | 0.01 |
| H | 5.45 | 5.66 |
| C | 41.81 | 43.39 |
| N | 0.07 | 0.07 |
| O | 39.33 | 40.82 |
| Cl | | |
| C/H | 7.7 | 7.7 |
| C/O | 1.1 | 1.1 |
| HHV (BTU/lb) | 7,296 | 7,572 |
| HHV (BTU/lb), Calculated | | 7,520 |
| Density (lb/cu. ft) | 33.7 | |

| Feed Stock #4 Gasifier Output | |
|---|---|
| Hydrogen, vol % | 19.8 |
| Nitrogen, vol % | 46.4 |
| Carbon Monoxide, vol % | 24.7 |
| Methane, vol % | 1.2 |
| Carbon Dioxide, vol % | 8.0 |
| Hydrogen/Carbon Monoxide | 0.80 |
| BTU/scf | 159.2 |
| Carbon Monoxide + Hydrogen | 44.5 |

| Feed Stock #5 | | |
|---|---|---|
| | FS#5 68% paper; 32% Rubber | |
| | AR | MF |
| Moisture | 1.35 | |
| Ash | 9.11 | 9.23 |
| Volatile | 77.18 | 78.24 |
| Fixed Carbon | 12.36 | 12.53 |
| S | 0.23 | 0.01 |
| H | 5.84 | 5.92 |
| C | 45.92 | 46.55 |
| N | 0.01 | 0.01 |
| O | 37.55 | 38.06 |
| Cl | 0.219 | 0.22 |
| C/H | 7.9 | 7.9 |
| C/O | 1.2 | 1.2 |
| HHV (BTU/lb) | 9,250 | 9,377 |
| HHV (BTU/lb), Calculated | | 8,288 |
| Density (lb/cu. ft) | | |

| Feed Stock #5 Gasifier Output | |
|---|---|
| Hydrogen, vol % | 14.9 |
| Nitrogen, vol % | 51.6 |
| Carbon Monoxide, vol % | 17.0 |
| Methane, vol % | 3.4 |
| Carbon Dioxide, vol % | 13.1 |
| Hydrogen/Carbon Monoxide | 0.88 |
| BTU/scf | 140.56 |
| Carbon Monoxide + Hydrogen | 31.8 |

| Feed Stock #6 | | |
|---|---|---|
| | FS#6 100% Rubber | |
| | AR | MF |
| Moisture | 0.06 | |
| Ash | 6.12 | 6.12 |
| Volatile | 68.46 | 68.50 |
| Fixed Carbon | 25.36 | 25.38 |
| S | 1.92 | 0.01 |
| H | 6.78 | 6.78 |
| C | 81.73 | 81.78 |
| N | 0.18 | 0.18 |
| O | 3.21 | 3.21 |
| Cl | | |
| C/H | 12.1 | 12.1 |
| C/O | 25.5 | 25.5 |
| HHV (BTU/lb) | 15,780 | 15,789 |
| HHV (BTU/lb), Calculated | | 15,768 |
| Density (lb/cu. ft) | 28.6 | |

| Feed Stock #6 Gasifier Output | |
|---|---|
| Hydrogen, vol % | 8.65 |
| Nitrogen, vol % | 68.2 |
| Carbon Monoxide, vol % | 14.5 |
| Methane, vol % | 0.71 |
| Carbon Dioxide, vol % | 6.9 |
| Hydrogen/Carbon Monoxide | 0.60 |
| BTU/scf | 83.7 |
| Carbon Monoxide + Hydrogen | 23.2 |

| Feed Stock #7 | | |
|---|---|---|
| | FS#7 80% Rubber, 20% Paper + 13% water | |
| | AR | MF |
| Moisture | 13.1 | |
| Ash | 3.84 | 4.42 |
| Volatile | 61.94 | 71.28 |
| Fixed Carbon | 21.12 | 24.30 |
| S | 1.28 | 0.01 |
| H | 5.87 | 6.75 |
| C | 75.12 | 86.44 |
| N | 0.03 | 0.03 |
| O | 0.77 | 0.89 |
| Cl | 0.076 | 0.09 |
| C/H | 12.8 | 12.8 |
| C/O | 97.6 | 97.6 |
| HHV (BTU/lb) | 14,405 | 16,577 |
| HHV (BTU/lb), Calculated | | 16,574 |
| Density (lb/cu. ft) | | |

| Feed Stock #7 Gasifier Output | |
|---|---|
| Hydrogen, vol % | 28.6 |
| Nitrogen, vol % | 45.2 |
| Carbon Monoxide, vol % | 15.6 |
| Methane, vol % | 2.7 |
| Carbon Dioxide, vol % | 7.9 |
| Hydrogen/Carbon Monoxide | 1.83 |
| BTU/scf | 173.8 |
| Carbon Monoxide + Hydrogen | 44.2 |

Example 1

| Test Method ASTM[1] # | Parameter | AS RECEIVED | AIR DRIED | DRY BASIS |
|---|---|---|---|---|
| D 3302, 5142 | Total Moisture, % wt | 21.04 | — | — |
| D 5142 | Residual Moisture, % wt | — | 7.04 | — |
| D 5142 | Ash, % wt | 12.91 | 15.20 | 16.35 |
| D 5142 | Volatile, % wt | 58.81 | 69.24 | 74.49 |
| Calculation | Fixed Carbon, % wt | 7.24 | 8.52 | 9.16 |
| | Total | 100.00 | 100.00 | 100.00 |
| D 4239 | Sulfur % | 0.18 | 0.21 | 0.23 |
| D 5865 | HHV Btu/lb (Gross) | 10890 | 12821 | 13792 |
| D 3176 | Hydrogen, % wt | 4.24 | 4.99 | 5.37 |
| D 3176 | Carbon, % wt | 33.84 | 39.84 | 42.86 |
| D 3176 | Nitrogen, % wt | 0.24 | 0.29 | 0.31 |
| Calculation | % Oxygen by difference | 27.55 | 32.42 | 34.88 |

[1]American Society for Testing and Materials

Example 2

| Test Method ASTM[1] # | Parameter | AS RECEIVED | AIR DRIED | DRY BASIS |
|---|---|---|---|---|
| D 3302, 5142 | Total Moisture, % wt | 13.26 | — | — |
| D 5142 | Residual Moisture, % wt | — | 6.09 | — |
| D 5142 | Ash, % wt | 14.39 | 15.58 | 16.59 |
| D 5142 | Volatile, % wt | 63.33 | 68.57 | 73.02 |
| Calculation | Fixed Carbon, % wt | 9.02 | 9.76 | 10.40 |
| | Total | 100.00 | 100.00 | 100.00 |
| D 4239 | Sulfur % | 0.20 | 0.22 | 0.23 |
| D 5865 | HHV Btu/lb (Gross) | 11165 | 12088 | 12872 |
| D 3176 | Hydrogen, % wt | 5.55 | 6.01 | 6.40 |
| D 3176 | Carbon, % wt | 41.68 | 45.12 | 48.05 |
| D 3176 | Nitrogen, % wt | 0.21 | 0.23 | 0.24 |
| Calculation | % Oxygen by difference | 24.71 | 26.75 | 28.49 |

[1]American Society for Testing and Materials

Example 3

| Test Method ASTM[1] # | Parameter | AS RECEIVED | AIR DRIED | DRY BASIS |
|---|---|---|---|---|
| D 3302, 5142 | Total Moisture, % wt | 15.06 | — | — |
| D 5142 | Residual Moisture, % wt | — | 4.16 | — |
| D 5142 | Ash, % wt | 11.67 | 13.17 | 13.74 |
| D 5142 | Volatile, % wt | 64.60 | 72.89 | 76.05 |
| Calculation | Fixed Carbon, % wt | 8.67 | 9.78 | 10.21 |
| | Total | 100.00 | 100.00 | 100.00 |
| D 4239 | Sulfur % | 0.09 | 0.11 | 0.11 |
| D 5865 | HHV Btu/lb (Gross) | 6188 | 6982 | 7285 |
| D 3176 | Hydrogen, % wt | 4.93 | 5.56 | 5.80 |
| D 3176 | Carbon, % wt | 34.90 | 39.38 | 41.09 |
| D 3176 | Nitrogen, % wt | 0.07 | 0.08 | 0.08 |
| Calculation | % Oxygen by difference | 33.28 | 37.55 | 39.18 |
| D4208 | Chlorine, % wt | 0.75 | 0.84 | 0.88 |

[1]American Society for Testing and Materials

Example 4

| Test Method ASTM[1] # | Parameter | AS RECEIVED | AIR DRIED | DRY BASIS |
|---|---|---|---|---|
| D 3302, 5142 | Total Moisture, % wt | 14.99 | — | — |
| D 5142 | Residual Moisture, % wt | — | 1.88 | — |
| D 5142 | Ash, % wt | 16.48 | 19.03 | 19.39 |
| D 5142 | Volatile, % wt | 62.84 | 72.53 | 73.92 |
| Calculation | Fixed Carbon, % wt | 5.69 | 6.56 | 6.70 |
| | Total | 100.00 | 100.00 | 100.00 |
| D 4239 | Sulfur % | 0.06 | 0.07 | 0.07 |
| D 5865 | HHV Btu/lb (Gross) | 6782 | 7828 | 7978 |
| D 3176 | Hydrogen, % wt | 4.48 | 5.17 | 5.27 |
| D 3176 | Carbon, % wt | 31.94 | 36.96 | 37.57 |
| D 3176 | Nitrogen, % wt | 0.08 | 0.09 | 0.09 |
| Calculation | % Oxygen by difference | 31.97 | 36.80 | 37.61 |
| D 4208 | Chlorine, % wt | 1.17 | 1.35 | 1.38 |

Example 5

| Test Method ASTM[1] # | Parameter | AS RECEIVED | DRY BASIS |
|---|---|---|---|
| | Pellet Composition: 80% Fiber/20% plastic | | |
| E 939 | Total Moisture, % wt | 13.26 | — |
| E 830 | Ash, % wt | 5.24 | 6.04 |
| E 897 | Volatile, % wt | 62.97 | 72.60 |
| D 3172 | Fixed Carbon, % wt | 18.53 | 21.36 |
| | Total | 100.00 | 100.00 |

-continued

| Test Method ASTM[1] # | Parameter | AS RECEIVED | DRY BASIS |
|---|---|---|---|
| D 4239 | Sulfur % | 0.15 | 0.17 |
| E 711 | HHV Btu/lb (Gross) | 8806 | 10152 |
| D 6373 | Hydrogen, % wt | 6.66 | 7.67 |
| D 6373 | Carbon, % wt | 48.4 | 55.8 |
| D 5373 | Nitrogen, % wt | 0.15 | 0.18 |
| Calculation | % Oxygen by difference | 26.14 | 30.14 |
| D 4208 | Chlorine, % wt | 0.06 | 0.07 |

[1]American Society for Testing and Materials

Example 6

| Test Method ASTM[1] # | Parameter | AS RECEIVED | DRY BASIS |
|---|---|---|---|
| | Pellet Composition: Plastics #2, and #4-7 | | |
| E 939 | Total Moisture, % wt | 2.1 | — |
| E 830 | Ash, % wt | 7.82 | 7.98 |
| E 897 | Volatile, % wt | 89.32 | 91.24 |
| D 3172 | Fixed Carbon, % wt | 0.76 | 0.78 |
| | Total | 100.00 | 100.00 |
| D 4239 | Sulfur % | 0.17 | 0.17 |
| E 711 | HHV Btu/lb (Gross) | 17,192 | 17,560 |
| D 6373 | Hydrogen, % wt | 13.57 | 13.86 |
| D 6373 | Carbon, % wt | 78.85 | 80.54 |
| D 5373 | Nitrogen, % wt | 0.01 | 0.01 |
| D 4208 | Chlorine, % wt | 0.33 | 0.34 |

[1]American Society for Testing and Materials

Example 7

| Test Method ASTM[1] # | Parameter | AS RECEIVED | DRY BASIS |
|---|---|---|---|
| | Pellet Composition: Paper | | |
| E 939 | Total Moisture, % wt | 5.16 | — |
| E 830 | Ash, % wt | 41.79 | 44.06 |
| E 897 | Volatile, % wt | 48.27 | 50.90 |
| D 3172 | Fixed Carbon, % wt | 4.78 | 5.04 |
| | Total | 100.00 | 100.00 |
| D 4239 | Sulfur % | 0.17 | 0.18 |
| E 711 | HHV Btu/lb (Gross) | 5146 | 5426 |
| D 6373 | Hydrogen, % wt | 3.65 | 3.85 |
| D 6373 | Carbon, % wt | 30.55 | 32.21 |
| D 5373 | Nitrogen, % wt | 0.43 | 0.45 |
| Calculation | % Oxygen by difference | 18.25 | 19.25 |
| D 4208 | Chlorine, % wt | 0.47 | 0.50 |

[1]American Society for Testing and Materials

Example 8

| Test Method ASTM[1] # | Parameter | AS RECEIVED | DRY BASIS |
|---|---|---|---|
| | Pellet Composition: 10% Fiber/90% plastic | | |
| E 939 | Total Moisture, % wt | 2.53 | — |
| E 830 | Ash, % wt | 12.64 | 12.97 |
| E 897 | Volatile, % wt | 83.50 | 85.67 |
| D 3172 | Fixed Carbon, % wt | 1.33 | 1.36 |
| D 4239 | Sulfur % | 0.17 | 0.17 |
| E 711 | HHV Btu/lb (Gross) | 15,482 | 15,885 |
| D5373 | Hydrogen, % wt | 12.16 | 12.48 |
| D5373 | Carbon, % wt | 71.99 | 73.86 |
| D5373 | Nitrogen, % wt | 0.07 | 0.07 |
| Calculation | % Oxygen by difference | 0.44 | 0.45 |
| D4208 | Chlorine, % wt | 0.35 | 0.36 |

[1]American Society for Testing and Materials

While particular embodiments described herein have been illustrated and described, it would be obvious to those skilled in the art that various other changes and modifications can be made without departing from the spirit and scope of the disclosure. It is therefore intended to cover in the appended claims all such changes and modifications that are within the scope of this invention.

We claim:

1. An engineered fuel feed stock, comprising at least one component derived from a processed waste stream, the engineered fuel feed stock comprising:
   a carbon content of between about 60 wt. % and about 70 wt. %;
   a hydrogen content of between about 3 wt. % and about 10 wt. %;
   a moisture content of less than about 30 wt. %;
   an ash content of less than about 10 wt. %; and
   wherein the engineered fuel feed stock contains substantially no glass, metals, grit, and noncombustibles.

2. The engineered fuel feed stock of claim 1, further comprising:
   a sulfur content of less than about 2 wt. %.

3. The engineered fuel feed stock of claim 1, further comprising:
   a chlorine content of less than about 1 wt. %.

4. The engineered fuel feed stock of claim 1, wherein the moisture content is between about 5 wt. % and about 30 wt. %.

5. The engineered fuel feed stock of claim 1, further comprising:
   an HHV of between about 11,000 BTU/lb and about 15,000 BTU/lb.

6. The engineered fuel feed stock of claim 1, further comprising:
   a volatile matter content of between about 40 wt. % and about 80 wt. %.

7. The engineered fuel feed stock of claim 1, further comprising:
   a volatile matter content of between about 80 wt. % and about 95 wt. %.

8. The engineered fuel feed stock of claim 1, further comprising:
   an H/C ratio of between about 0.07 (w/w) and about 0.16 (w/w).

9. The engineered fuel feed stock of claim 8, wherein the H/C ratio is between about 0.08 (w/w) and about 0.15 (w/w).

10. The engineered fuel feed stock of claim 9, wherein the H/C ratio is between about 0.11 to about 0.15.

11. The engineered fuel feed stock of claim 1, where in the hydrogen content is between about 6 wt. % and about 9 wt. %.

12. The engineered fuel feed stock of claim 1, further comprising:

an O/C ratio of between about 0.15 (w/w) to about 0.3 (w/w).

13. The engineered fuel feed stock of claim 1, wherein the processed waste stream is a processed MSW waste stream.

14. The engineered fuel feed stock of claim 13, wherein the processed MSW waste stream contains biodegradable and non-biodegradable waste.

15. The engineered fuel feed stock of claim 1, wherein the engineered fuel feed stock is in a densified form.

16. An engineered fuel feed stock, comprising at least one component derived from a processed MSW waste stream, the engineered fuel feed stock comprising:
    an H/C ratio of between about 0.025 (w/w) and about 0.20 (w/w);
    an O/C from about 0.15 (w/w) to about 0.3 (w/w);
    a moisture content of less than about 30 wt. %;
    an ash content of less than about 10 wt. %; and
    wherein the MSW waste stream contains biodegradable and non-biodegradable waste and the engineered fuel feed stock contains substantially no glass, metals, grit, and noncombustible waste.

17. The engineered fuel feed stock of claim 16, further comprising:
    a hydrogen content of between about 3 wt. % and about 10 wt. %.

18. The engineered fuel feed stock of claim 16, further comprising:
    a carbon content of between about 30 wt. % and about 80 wt. %.

19. The engineered fuel feed stock of claim 16, further comprising:
    an HHV of between about 11,000 BTU/lb and about 15,000 BTU/lb.

20. The engineered fuel feed stock of claim 16, wherein the engineered fuel feed stock is in a densified form.

21. An engineered fuel feed stock, comprising at least one component derived from a processed MSW waste stream, the engineered fuel feed stock comprising:
    a carbon content of between about 60 wt. % and about 70 wt. %;
    a hydrogen content of between about 3 wt. % and about 10 wt. %;
    an H/C ratio of between about 0.07 (w/w) and about 0.16 (w/w);
    an O/C ratio from about 0.15 (w/w) to about 0.3 (w/w);
    a moisture content of less than about 30 wt. %;
    an ash content of less than about 10 wt. %; and
    wherein the MSW waste stream contains biodegradable and non-biodegradable waste and the engineered fuel feed stock contains substantially no glass, metals, grit, and noncombustible waste.

22. The engineered fuel feed stock of claim 21, further comprising:
    an HHV of between about 11,000 BTU/lb and about 15,000 BTU/lb.

23. The engineered fuel feed stock of claim 21, wherein the engineered fuel feed stock is in a densified form.

* * * * *